US010076154B2

(12) United States Patent
Walker et al.

(10) Patent No.: US 10,076,154 B2
(45) Date of Patent: *Sep. 18, 2018

(54) ARTICLE OF FOOTWEAR WITH SOIL-SHEDDING PERFORMANCE

(71) Applicant: NIKE, INC., Beaverton, OR (US)

(72) Inventors: Jeremy D. Walker, Portland, OR (US); Caleb W. Dyer, Beaverton, OR (US); Zachary C. Wright, Beaverton, OR (US); Myron Maurer, West Linn, OR (US); Denis Schiller, Vancouver, WA (US); Hossein A. Baghdadi, Portland, OR (US)

(73) Assignee: NIKE, INC., Beaverton, OR (US)

( * ) Notice: Subject to any disclaimer, the term of this patent is extended or adjusted under 35 U.S.C. 154(b) by 169 days.

This patent is subject to a terminal disclaimer.

(21) Appl. No.: 14/814,097

(22) Filed: Jul. 30, 2015

(65) Prior Publication Data
US 2016/0058107 A1 Mar. 3, 2016

Related U.S. Application Data

(60) Provisional application No. 62/042,719, filed on Aug. 27, 2014, provisional application No. 62/042,736, (Continued)

(51) Int. Cl.
A43B 13/02 (2006.01)
A43B 13/16 (2006.01)
(Continued)

(52) U.S. Cl.
CPC ............ *A43B 13/02* (2013.01); *A43B 3/0036* (2013.01); *A43B 13/04* (2013.01); *A43B 13/122* (2013.01);
(Continued)

(58) Field of Classification Search
CPC ....... A43B 13/02; A43B 13/12; A43B 13/122; Y10T 428/24802
See application file for complete search history.

(56) References Cited

U.S. PATENT DOCUMENTS 2,920,983 A 1/1960 Bugosh
3,463,662 A 8/1969 Hodes
(Continued)

FOREIGN PATENT DOCUMENTS

CN 1890097 1/2007
CN 201157028 Y 12/2008
(Continued)

OTHER PUBLICATIONS

Invitation to Pay Additional Fees and Communication Relating to the Results of the Partial International Search for International Application No. PCT/US2015/047081, dated Nov. 26, 2015 (5 pages).
(Continued)

*Primary Examiner* — Gerard Higgins
(74) *Attorney, Agent, or Firm* — Thomas | Horstemeyer, LLP

(57) ABSTRACT

The disclosure relates to articles of footwear and components thereof, including outsoles, which can be used in conditions normally conducive to the accumulation of soil on the outsoles. In particular, the disclosure relates to articles of footwear and components thereof including an outsole with an external hydrogel film that compositionally includes crystalline regions and amorphous hydrophilic regions, where the amorphous regions are covalently bonded to the crystalline regions with carbamate linkages and/or polyamide linkages. The amorphous regions are present in the hydrogel at a ratio of at least 20:1, by weight, relative to the crystalline regions. The outsoles can prevent or reduce the accumulation of soil on the footwear during wear on
(Continued)

unpaved surfaces such as sporting fields. When the outsoles are wetted with water, the outsoles can become more compliant and/or can rapidly uptake and/or expel water, which can prevent soil from adhering to the outsole and/or can assist in shedding soil present on the outsole.

48 Claims, 22 Drawing Sheets

Related U.S. Application Data filed on Aug. 27, 2014, provisional application No. 62/042,750, filed on Aug. 27, 2014.

(51) Int. Cl.
| | | |
|---|---|---|
| *A43B 13/22* | (2006.01) | |
| *A43C 15/16* | (2006.01) | |
| *A43B 13/04* | (2006.01) | |
| *A43B 13/12* | (2006.01) | |
| *A43C 15/02* | (2006.01) | |
| *A43B 3/00* | (2006.01) | |
| *A43B 13/26* | (2006.01) | |
| *B29D 35/14* | (2010.01) | |

(52) U.S. Cl.
CPC .............. *A43B 13/16* (2013.01); *A43B 13/22* (2013.01); *A43B 13/26* (2013.01); *A43C 15/02* (2013.01); *A43C 15/16* (2013.01); *B29D 35/142* (2013.01); *Y10T 428/24802* (2015.01)

(56) References Cited

U.S. PATENT DOCUMENTS

| | | | |
|---|---|---|---|
| 3,637,001 | A | 1/1972 | Roberts et al. |
| 4,118,354 | A | 10/1978 | Harada et al. |
| 4,271,608 | A | 6/1981 | Tomuro |
| 4,501,591 | A | 2/1985 | Ucci et al. |
| 4,520,138 | A | 5/1985 | Himes |
| 4,523,005 | A | 6/1985 | Szycher |
| 4,924,608 | A | 5/1990 | Mogonye |
| 4,990,357 | A | 2/1991 | Karakelle et al. |
| 5,120,816 | A | 6/1992 | Gould et al. |
| 5,160,790 | A | 11/1992 | Elton |
| 5,480,377 | A | 1/1996 | Cartmell et al. |
| 5,576,072 | A | 11/1996 | Hostettler et al. |
| 5,591,779 | A | 1/1997 | Bleys et al. |
| 5,763,335 | A | 6/1998 | Hermann |
| 5,832,636 | A | 11/1998 | Lyden et al. |
| 5,943,792 | A | 8/1999 | Powell |
| 5,969,076 | A | 10/1999 | Lai et al. |
| 6,003,191 | A | 12/1999 | Sherry et al. |
| 6,011,104 | A | 1/2000 | Udy |
| 6,046,295 | A | 4/2000 | Frisch, Jr. et al. |
| 6,076,283 | A | 6/2000 | Boie |
| 6,112,380 | A | 9/2000 | Dolan et al. |
| 6,162,369 | A | 12/2000 | Allewaert et al. |
| 6,203,812 | B1 | 3/2001 | Ehrhard et al. |
| 6,335,392 | B1 | 1/2002 | Umezawa et al. |
| 6,367,167 | B1 | 4/2002 | Krstic et al. |
| 6,698,110 | B1 | 3/2004 | Robbins |
| 6,782,642 | B2 | 8/2004 | Knoche et al. |
| 6,855,743 | B1 | 2/2005 | Gvozdic |
| 6,874,251 | B2 | 4/2005 | Moretti |
| 6,922,918 | B2 | 8/2005 | Issler |
| 6,948,264 | B1 | 9/2005 | Lyden |
| 6,949,271 | B2 | 9/2005 | Shannon et al. |
| 7,020,988 | B1 | 4/2006 | Holden et al. |
| 7,169,720 | B2 | 1/2007 | Etchells et al. |
| 7,373,739 | B2 | 5/2008 | Doerer et al. |
| 7,451,511 | B2 | 11/2008 | Ellis et al. |
| 7,451,557 | B2 | 11/2008 | McDonald et al. |
| 7,594,345 | B2 | 9/2009 | Fusco |
| 7,752,775 | B2 | 7/2010 | Lyden |
| 7,785,521 | B1 | 8/2010 | Chen |
| 7,814,687 | B2 | 10/2010 | Cook et al. |
| 7,832,120 | B2 | 11/2010 | Jung |
| 7,845,096 | B2 | 12/2010 | Ellis et al. |
| 7,854,076 | B2 | 12/2010 | Keppler et al. |
| 8,110,242 | B2 | 2/2012 | Hawkins et al. |
| 8,291,617 | B2 | 10/2012 | Halberstadt et al. |
| 8,303,977 | B2 | 11/2012 | Kuzma et al. |
| 8,609,766 | B2 | 12/2013 | Bette |
| 8,791,200 | B2 | 7/2014 | Kocher et al. |
| 8,796,394 | B2 | 8/2014 | Messersmith et al. |
| 8,853,289 | B2 | 10/2014 | Smith et al. |
| 8,906,497 | B2 | 12/2014 | Marchgraber et al. |
| 9,139,684 | B2 | 9/2015 | Coneski et al. |
| 9,206,114 | B1 | 12/2015 | Coneski et al. |
| 9,392,841 | B2 | 7/2016 | Walker et al. |
| 2001/0053897 | A1 | 12/2001 | Frate et al. |
| 2002/0116843 | A1 | 8/2002 | Harrison |
| 2002/0188057 | A1 | 12/2002 | Chen |
| 2003/0074718 | A1 | 4/2003 | English |
| 2003/0213148 | A1 | 11/2003 | Knowles |
| 2003/0226283 | A1 | 12/2003 | Braunschweiler |
| 2004/0020080 | A1 | 2/2004 | Cox et al. |
| 2004/0147188 | A1 | 7/2004 | Johnson et al. |
| 2004/0255362 | A1 | 12/2004 | Soerens et al. |
| 2005/0288440 | A1 | 12/2005 | Chou et al. |
| 2006/0035030 | A1 | 2/2006 | Shannon et al. |
| 2006/0141186 | A1 | 6/2006 | Janssen et al. |
| 2007/0017124 | A1 | 1/2007 | Koo et al. |
| 2007/0124960 | A1 | 6/2007 | Friedman |
| 2007/0141306 | A1 | 6/2007 | Kasai et al. |
| 2008/0120869 | A1 | 5/2008 | Roy et al. |
| 2008/0155857 | A1 | 7/2008 | Rosen |
| 2008/0241371 | A1 | 10/2008 | Havelka et al. |
| 2008/0314287 | A1 | 12/2008 | Clark et al. |
| 2009/0084477 | A1 | 4/2009 | Sandstrom et al. |
| 2009/0090031 | A1 | 4/2009 | Jung |
| 2009/0234039 | A1 | 9/2009 | Schuette et al. |
| 2009/0313855 | A1 | 12/2009 | Skirrow |
| 2010/0048752 | A1 | 2/2010 | Vignola et al. |
| 2010/0083534 | A1 | 4/2010 | Howlett |
| 2010/0109200 | A1 | 5/2010 | Cox et al. |
| 2010/0113733 | A1 | 5/2010 | Cox et al. |
| 2010/0146824 | A1 | 6/2010 | Sensini |
| 2010/0154253 | A1 | 6/2010 | Imazato et al. |
| 2010/0215707 | A1 | 8/2010 | McDonald et al. |
| 2010/0323573 | A1* | 12/2010 | Chu .................... B01D 65/08 442/153 |
| 2011/0008612 | A1 | 1/2011 | Lee |
| 2011/0112236 | A1 | 5/2011 | Ding |
| 2011/0287929 | A1 | 11/2011 | Smith et al. |
| 2012/0088602 | A1 | 4/2012 | MorkenB |
| 2012/0151805 | A1 | 6/2012 | Polegato Moretti |
| 2012/0210608 | A1 | 8/2012 | Baker et al. |
| 2012/0216423 | A1 | 8/2012 | Lyden |
| 2012/0216424 | A1 | 8/2012 | Lyden |
| 2012/0260535 | A1 | 10/2012 | Tsang |
| 2012/0312192 | A1 | 12/2012 | Detty et al. |
| 2013/0109804 | A1 | 5/2013 | Kusaka et al. |
| 2013/0255103 | A1 | 10/2013 | Dua et al. |
| 2013/0260104 | A1 | 10/2013 | Dua et al. |
| 2013/0260629 | A1 | 10/2013 | Dua et al. |
| 2014/0024768 | A1 | 1/2014 | Coneski et al. |
| 2014/0075791 | A1 | 3/2014 | Smith et al. |
| 2014/0217636 | A1 | 8/2014 | Skaja et al. |
| 2015/0141539 | A1 | 5/2015 | Lee |
| 2015/0307745 | A1 | 10/2015 | Popa et al. |
| 2015/0353474 | A1 | 12/2015 | Coneski et al. |
| 2015/0353741 | A1 | 12/2015 | Liao |

FOREIGN PATENT DOCUMENTS

| | | |
|---|---|---|
| CN | 201360601 Y | 12/2009 |
| CN | 201445011 U | 5/2010 |
| CN | 101873812 | 10/2010 |
| CN | 101953525 A | 1/2011 |
| CN | 101953534 A | 1/2011 |
| CN | 102038315 A | 5/2011 |

(56) References Cited

FOREIGN PATENT DOCUMENTS

| | | |
|---|---|---|
| CN | 203952576 U | 11/2014 |
| CN | 104549961 A | 4/2015 |
| DE | 4138941 A1 | 6/1993 |
| DE | 29602823 U1 | 4/1996 |
| DE | 102013221204 | 4/2015 |
| EP | 1894482 A2 | 3/2008 |
| EP | 2030517 A1 | 3/2009 |
| EP | 2292113 A2 | 3/2011 |
| EP | 2462908 A1 | 6/2012 |
| GB | 2313537 A | 12/1997 |
| JP | H06253905 | 9/1994 |
| JP | H08258511 | 10/1996 |
| JP | H105005 | 1/1998 |
| JP | 2000166609 A | 6/2000 |
| JP | 2000308501 A | 11/2000 |
| JP | 2002325601 A | 11/2002 |
| JP | 2005111691 A | 4/2005 |
| JP | 2008260889 A | 10/2008 |
| JP | 2010099332 A | 5/2010 |
| JP | 4864227 B2 | 2/2012 |
| KR | 100750324 B1 | 8/2007 |
| KR | 20120124616 A | 11/2012 |
| KR | 101232846 B1 | 2/2013 |
| WO | 0043449 | 7/2000 |
| WO | WO 2005/000061 A1 | 1/2005 |
| WO | WO 2006/015325 A1 | 2/2006 |
| WO | WO 2007/090245 A1 | 8/2007 |
| WO | WO 2007/135069 A1 | 11/2007 |
| WO | WO 2013/106658 A1 | 7/2013 |
| WO | 2014025161 A1 | 2/2014 |

OTHER PUBLICATIONS

Search Report for related GB Application No. 1515179.8, dated Mar. 22, 2016 (4 pages).
Written Opinion of the International Searching Authority for related International Application No. PCT/US2015/047081, dated Mar. 22, 2016 (7 pages).
Notice of Allowance for U.S. Appl. No. 14/814,214, dated Aug. 10, 2016 (8 pages).
Notice of Allowance for U.S. Appl. No. 14/814,219, dated Mar. 31, 2016 (9 pages).
Alf et al., Chemical vapor deposition of conformal, functional, and responsive polymer films, Adv. Mater., 22(18):1993-2027 (2010).
Arkema, Pebax® Polyether Block Amides brochure, applicant's internal files Jun. 22, 2015.
Chen et al., An new avenue to nonfouling materials, Adv. Mater., 20(2):335-8 (2008).
International Search Report and Written Opinion for International Application No. PCT/US2015/047082, dated Nov. 26, 2015 (15 pages).
International Search Report and Written Opinion for International Application No. PCT/US2015/047083, dated Nov. 26, 2015 (15 pages).
International Search Report and Written Opinion for International Application No. PCT/US2015/047084, dated Nov. 27, 2015 (16 pages).
International Search Report and Written Opinion for International Application No. PCT/US2015/047086, dated Nov. 26, 2015 (15 pages).
International Search Report and Written Opinion for International Application No. PCT/US2015/047087, dated Dec. 8, 2015 (15 pages).
Jiang et al., Ultralow-fouling, functionalizable, and hydrolyzable zwitterionic materials and their derivatives for biological applications, Adv. Mater., 22(9):920-32 (2010).
Lee et al., Mechanical properties of amphiphilic urethane acrylate ionomer hydrogels having heterophasic gel structure, Coll. Polymer Sci., 277(2-3):265-9 (1999).
Lubrizol Corporation, "Medical Device Solutions," Brochure (2014).
Lubrizol Corporation, "Tecophilic Extrusion Grade," Technical Data Sheet (2013).
Lubrizol Corporation, "Tecophilic Hydrogel," Technical Data Sheet (2013).
Lubrizol Corporation, "Tecophilic Solution Grade," Technical Data Sheet (2013).
Lubrizol Corporation, Your Link to: Advanced Wound Care brochure (Sep. 2013).
Salerno-Kochan et al., "Materials Used in Functional Outerwear—Characteristics and Customer Preferences," in Science in Research and Practice, pp. 159-167 (Eds. Chochół Andrzej, Sep. 2014).
Shao et al., Difference in hydration between carboxybetaine and sulfobetained, J. Phys. Chem. B, 114(49):16625-31 (2010).
U.S. App. No. 14/813,548, "Soil-Shedding Article of Footwear, Components Thereof, and Methods of Making the Article", filed Jul. 30, 2015.
U.S. Appl. No. 14/813,553, "Soil-Shedding Article of Footwear, and Method of Using the Same", filed Jul. 30, 2015.
U.S. Appl. No. 14/814,208, "Article of Footwear with Soil-Shedding Performance", filed Jul. 30, 2015.
U.S. Appl. No. 14/814,089, "Article of Footwear with Soil-Shedding Performance", filed Jul. 30, 2015.
U.S. Appl. No. 14/814,214, "Article of Footwear with Soil-Shedding Performance", filed Jul. 30, 2015.
U.S. Appl. No. 14/814,107, "Article of Footwear with Soil-Shedding Performance", filed Jul. 30, 2015.
U.S. Appl. No. 14/814,123, "Article of Footwear with Soil-Shedding Performance", filed Jul. 30, 2015.
U.S. Appl. No. 14/814,131, "Article of Footwear with Soil-Shedding Performance", filed Jul. 30, 2015.
U.S. Appl. No. 14/814,191, "Article of Footwear with Soil-Shedding Performance", filed Jul. 30, 2015.
U.S. Appl. No. 14/814,195, "Article of Footwear with Soil-Shedding Performance", filed Jul. 30, 2015.
U.S. Appl. No. 14/814,198, "Article of Footwear with Soil-Shedding Performance", filed Jul. 30, 2015.
U.S. Appl. No. 14/814,204, "Article of Footwear with Soil-Shedding Performance", filed Jul. 30, 2015.
U.S. Appl. No. 14/814,219, "Article of Footwear with Soil-Shedding Performance", filed Jul. 30, 2015.
U.S. Appl. No. 14/814,248, "Article of Footwear with Soil-Shedding Performance", filed Jul. 30, 2015.
Wikipedia: "Glass transition," XP002751026, retrieved on Dec. 4, 2015, from https://en.wikipedia.org/wiki/Glass_transition, modified Oct. 3, 2015 (11 pages).
Yang et al., The effect of lightly crosslinked poly(carboxybetained) hydrogel coating on the performance of sensors in whole blood, Biomaterials, 33:7945-51 (2012).
Zwitter Technology: a new technology platform for biofouling control, Seattle, Washington, Jan. 10, 2014.
Garcia, M.A., "Patent Picks: Marine Coating Technologies," Chemical & Engineering News, 94(4):34 (Jan. 25, 2016).
Paleos, "What are Hydrogels?", 2012, p. 1-4, acquired from http://pittsburghplastics.com/assets/files/What%20Are%v 20Hydrogels.pdf.
Dyson, R.W. "Specialty Polymers" Blackie & Son Ltd. (1987).
Retrieved from the Internet: URL:https://en.wikipedia.org/wiki/Gel#Hydrogels [retrieved on Aug. 24, 2016].
Traubel, H. "New Materials Permeable to Water Vapor" Springer; DOI: 10.1007/978-3-642-59978-1.
Lubrizol Estane® MVT 70AT3 Thermoplastic Polyurethane, Moisture Vapor Transmission.

* cited by examiner

ARTICLE OF FOOTWEAR WITH SOIL-SHEDDING PERFORMANCE

CROSS-REFERENCE TO RELATED APPLICATION(S)

The present application claims priority to U.S. Provisional Patent Application No. 62/042,719, entitled "Water-Absorbing Compositions for Outsoles", and filed on Aug. 27, 2014; to U.S. Provisional Patent Application No. 62/042,736, entitled "Outsoles With Absorptive Thermoplastic Polyurethanes", and filed on Aug. 27, 2014; and to U.S. Provisional Patent Application No. 62/042,750, entitled "Outsoles With Absorptive Polyamides", and filed on Aug. 27, 2014, the disclosures of each of which are incorporated herein by reference to the extent that they do not conflict with the present disclosure.

FIELD

The present disclosure relates to articles of footwear. In particular, the present disclosure is directed to articles of footwear and components thereof, including outsoles, which are used in conditions conducive the accumulation of soil on the outsoles.

BACKGROUND

Articles of footwear of various types are frequently used for a variety of activities including outdoor activities, military use, and competitive sports. The outsoles of these types of footwear often are designed to provide traction on soft and slippery surfaces, such as unpaved surfaces including grass and dirt. For example, exaggerated tread patterns, lugs, cleats or spikes (both integral and removable), and rubber formulations which provide improved traction under wet conditions, have been used to improve the level of traction provided by the outsoles.

While these conventional means generally help give footwear improved fraction, the outsoles often accumulate soil (e.g., inorganic materials such as mud, dirt, sand and gravel, organic material such as grass, turf, and other vegetation, and combinations of inorganic and organic materials) when the footwear is used on unpaved surfaces. In some instances, the soil can accumulate in the tread pattern (when a tread pattern is present), around and between lugs (when lugs are present), or on shafts of the cleats, in the spaces surrounding the cleats, and in the interstitial regions between the cleats (when cleats are present). The accumulations of soil can weigh down the footwear and interfere with the traction between the outsole and the ground.

BRIEF DESCRIPTION OF THE DRAWINGS

For a more complete understanding of the disclosure, reference should be made to the following detailed description and accompanying drawings wherein.

Figure 1:
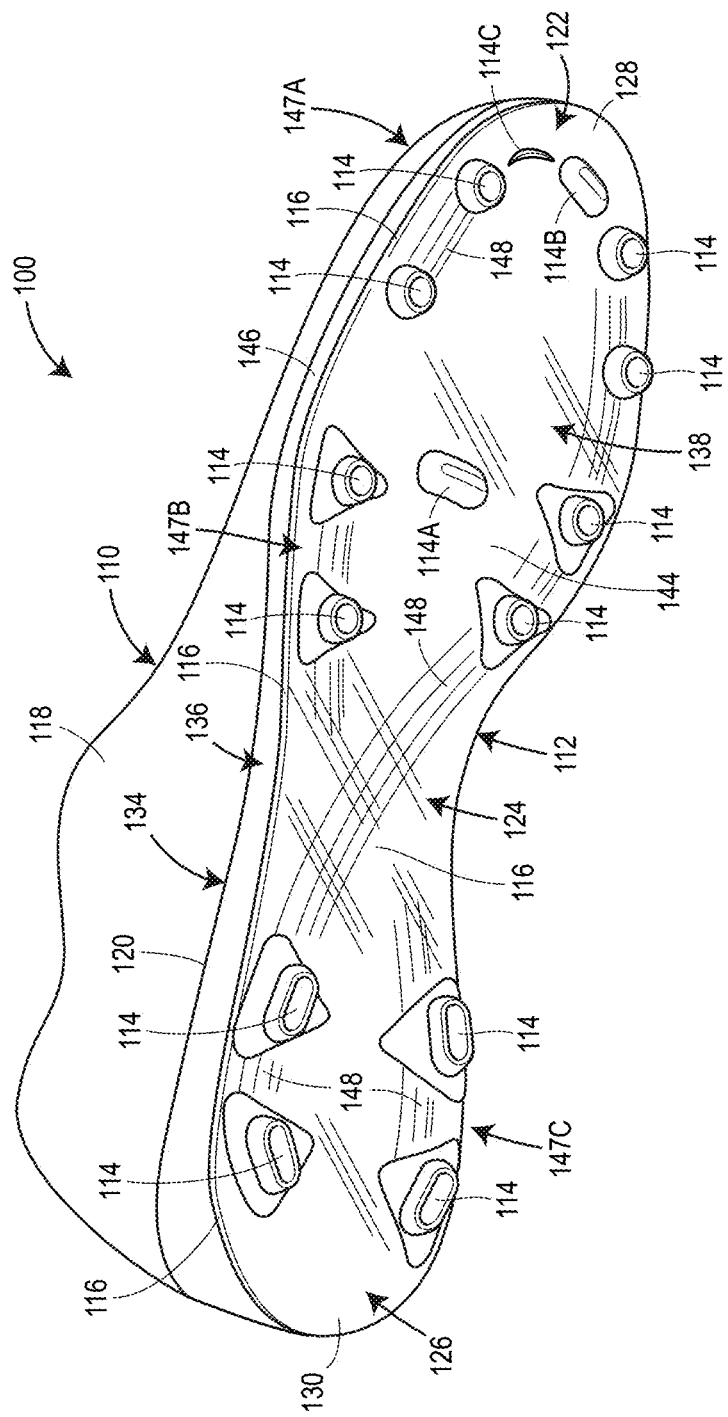
FIG. 1 is a bottom isometric view of an article of footwear in an embodiment of the present disclosure having an outsole including a material (e.g., a film) in accordance with the present disclosure.

The articles of footwear shown in the figures are illustrated for use with a user's right foot. However, it is understood that the following discussion applies correspondingly to left-footed articles of footwear as well.

DESCRIPTION

The present disclosure is directed to an article of footwear and footwear components thereof (e.g., footwear outsoles and the like) having outsole films comprising a hydrogel that includes crystalline regions and amorphous hydrophilic regions, wherein the amorphous regions are bonded to the crystalline regions through carbamate or amide linkages. As used herein, the terms "article of footwear" and "footwear" are intended to be used interchangeably to refer to the same article. Typically, the term "article of footwear" will be used in a first instance, and the term "footwear" may be subsequently used to refer to the same article for ease of readability. As used herein, the term "film" includes one or more layers disposed on at least a portion of a surface, where the layer(s) can be provided as a single continuous segment on the surface or in multiple discontinuous segments on the surface, and is not intended to be limited by any application process (e.g., co-extrusion, injection molding, lamination, spray coating, etc.).

As discussed below, it has been found these articles of footwear can prevent or reduce the accumulation of soil on the footwear during wear on unpaved surfaces. As used herein, the term "soil" can include any of a variety of materials commonly present on a ground or playing surface and which might otherwise adhere to an outsole or exposed midsole of a footwear article. Soil can include inorganic materials such as mud, sand, dirt, and gravel; organic matter such as grass, turf, leaves, other vegetation, and excrement; and combinations of inorganic and organic materials such as clay.

While not wishing to be bound by theory, it is believed that outsole films in accordance with the present disclosure, when sufficiently wetted with water (including water containing dissolved, dispersed or otherwise suspended materials) can provide compressive compliance and/or expulsion of uptaken water. In particular, it is believed that the compressive compliance of the wetted film, the expulsion of liquid from the wetted film, or more preferably both in combination, can disrupt the adhesion of soil at the outsole and cohesion of the soil particles to each other.

This disruption in the adhesion and/or cohesion of soil is believed to be a responsible mechanism for preventing (or otherwise reducing) the soil from accumulating on the footwear outsole (due to the presence of the wetted outsole film). As can be appreciated, preventing soil from accumulating on the bottom of footwear can improve the performance of traction elements present on the outsole during wear on unpaved surfaces, can prevent the footwear from gaining weight due to accumulated soil during wear, can preserve ball handling performance of the footwear, and thus can provide significant benefits to wearer as compared to an article of footwear with the film present on the outsole.

In one aspect, the present disclosure is directed to an outsole for use in an article of footwear, where the outsole includes an outsole substrate and a hydrogel secured to the outsole substrate and defining an external surface of the outsole. In this aspect, the hydrogel includes crystalline regions and amorphous hydrophilic regions. The amorphous regions are covalently bonded to the crystalline regions with carbamate linkages, and are present in the hydrogel at a ratio of at least 20:1 by weight relative to the crystalline regions.

Various refinements of the foregoing aspect are possible. For example, in some cases, the ratio of the one or more amorphous regions to the one or more crystalline regions ranges from 40:1 by weight to 110:1. In some embodiments, the crystalline regions of the hydrogel interact with each other to form physical crosslinks. In various cases, the hydrogel is secured to the outsole substrate as a film. In various embodiments, the film has a dry-state film thickness ranging from 0.1 millimeters to 1 millimeter. In some cases, the film has a saturated-state film thickness ranging from 0.25 millimeters to 2 millimeters. In some embodiments, at least a portion of the amorphous regions each include a backbone chain segment and one or more pendant polyether groups grafted to the backbone chain segment. In various cases, at least a portion of the amorphous hydrophilic regions each include a polyether segment, a polyester segment, a polyacrylic acid segment, a polylactone segment, or combinations thereof.

In another related aspect, the disclosure provides an outsole for an article of footwear, where the outsole includes an outsole substrate and a hydrogel secured to the outsole substrate and defining an external surface of the outsole. In this aspect, the hydrogel includes crystalline polyamide regions and amorphous hydrophilic regions. The amorphous regions are covalently bonded to the crystalline regions, and are present in the hydrogel at a ratio of at least 20:1 by weight relative to the crystalline polyamide regions. In some cases, the ratio of the one or more amorphous regions to the one or more crystalline regions ranges from 40:1 by weight to 110:1.

Various refinements of the foregoing aspect are possible. For example, in some cases, at least a portion of the amorphous hydrophilic regions each include a polyether segment, a polyester segment, a polyacrylic acid segment, a polylactone segment, or combinations thereof. In some embodiments, the hydrogel is secured to the outsole substrate as a film. In various cases, the film has a dry-state film thickness ranging from 0.1 millimeters to 1 millimeter. In some embodiments, the film has a saturated-state film thickness ranging from 0.25 millimeters to 2 millimeters.

In another related aspect, the disclosure provides an article of footwear that includes an outsole backing member, a plurality of traction elements operably secured to the outsole backing member, an upper secured to the outsole backing member, and a film secured to the outsole backing member and defining an external surface of the outsole. The film includes a hydrogel having crystalline regions and amorphous hydrophilic regions. The amorphous regions are covalently bonded to the crystalline regions, and are present in the hydrogel at a ratio of at least 20:1 by weight relative to the crystalline regions.

Various refinements of the foregoing aspect are possible. For example, in some cases, at least a portion of the amorphous regions each include a polyether. In some embodiments, the crystalline regions are derived from monomers including one or more multi-functional isocyanates and one or more chain extenders. In various cases, the crystalline regions include polyamide chains. In various cases, the hydrogel is substantially free of aromatic groups. Further, the film can be characterized by its swell thickness increase. In some cases, the film exhibits a swell thickness increase at 1 hour greater than 50%, as characterized by the Swelling Capacity Test with the Footwear Sampling Procedure described herein.

As used herein, the term "weight" refers to a mass value, such as having the units of grams, kilograms, and the like. Further, the recitations of numerical ranges by endpoints include the endpoints and all numbers within that numerical range. For example, a concentration ranging from 40% by weight to 60% by weight includes concentrations of 40% by weight, 60% by weight, and all water uptake capacities between 40% by weight and 60% by weight (e.g., 40.1%, 41%, 45%, 50%, 52.5%, 55%, 59%, etc. . . . ).

As used herein, the term "providing", such as for "providing an outsole", when recited in the claims, is not intended to require any particular delivery or receipt of the provided item. Rather, the term "providing" is merely used to recite items that will be referred to in subsequent elements of the claim(s), for purposes of clarity and ease of readability.

As used herein, the terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

As used herein, the terms "about" and "substantially" are used herein with respect to measurable values and ranges due to expected variations known to those skilled in the art (e.g., limitations and variability in measurements).

The article of footwear of the present disclosure may be designed for a variety of uses, such as sporting, athletic, military, work-related, recreational, or casual use. Primarily, the article of footwear is intended for outdoor use on unpaved surfaces (in part or in whole), such as on a ground surface including one or more of grass, turf, gravel, sand, dirt, clay, mud, and the like, whether as an athletic performance surface or as a general outdoor surface. However, the article of footwear may also be desirable for indoor applications, such as indoor sports including dirt playing surfaces for example (e.g., indoor baseball fields with dirt infields). As used herein, the terms "at least one" and "one or more of" an element are used interchangeably, and have the same meaning that includes a single element and a plurality of the elements, and may also be represented by the suffix "(s)" at the end of the element. For example, "at least one polyurethane", "one or more polyurethanes", and "polyurethane(s)" may be used interchangeably and have the same meaning.

In preferred embodiments, the article of footwear is designed use in outdoor sporting activities, such as global football/soccer, golf, American football, rugby, baseball, running, track and field, cycling (e.g., road cycling and mountain biking), and the like. The article of footwear can optionally include traction elements (e.g., lugs, cleats, studs, and spikes) to provide traction on soft and slippery surfaces. Cleats, studs and spikes are commonly included in footwear designed for use in sports such as global football/soccer, golf, American football, rugby, baseball, and the like, which are frequently played on unpaved surfaces. Lugs and/or exaggerated tread patterns are commonly included in footwear including boots design for use under rugged outdoor conditions, such as trail running, hiking, and military use.

FIGS. 1-4 illustrate an example article of footwear of the present disclosure, referred to as an article of footwear 100, and which is depicted as footwear for use in global football/soccer applications. As shown in FIG. 1, the footwear 100 includes an upper 110 and an outsole 112 as footwear article components, where outsole 112 includes a plurality of traction elements 114 (e.g., cleats) and an outsole film 116 at its external or ground-facing side or surface. While many of the embodied footwear of the present disclosure preferably include traction elements such as cleats, it is to be understood that in other embodiments, the incorporation of cleats is optional.

The upper 110 of the footwear 100 has a body 118 which may be fabricated from materials known in the art for making articles of footwear, and is configured to receive a user's foot. For example, the upper body 118 may be made from or include one or more components made from one or more of natural leather; a knit, braided, woven, or non-woven textile made in whole or in part of a natural fiber; a knit, braided, woven or non-woven textile made in whole or in part of a synthetic polymer, a film of a synthetic polymer, etc.; and combinations thereof. The upper 110 and components of the upper 110 may be manufactured according to conventional techniques (e.g., molding, extrusion, thermoforming, stitching, knitting, etc.). While illustrated in FIG. 1 with a generic design, the upper 110 may alternatively have any desired aesthetic design, functional design, brand designators, and the like.

The outsole 112 may be directly or otherwise operably secured to the upper 110 using any suitable mechanism or method. As used herein, the terms "operably secured to", such as for an outsole that is operably secured to an upper, refers collectively to direct connections, indirect connections, integral formations, and combinations thereof. For instance, for an outsole that is operably secured to an upper, the outsole can be directly connected to the upper (e.g., with an adhesive), the outsole can be indirectly connected to the upper (e.g., with an intermediate midsole), can be integrally formed with the upper (e.g., as a unitary component), and combinations thereof.

For example, the upper 110 may be stitched to the outsole 112, or the upper 110 may be glued to the outsole 112, such as at or near a bite line 120 of the upper 110. The footwear 100 can further include a midsole (not shown) secured between the upper 110 and the outsole 112, or can be enclosed by the outsole 112. When a midsole is present, the upper 110 may be stitched, glued, or otherwise attached to the midsole at any suitable location, such as at or below the bite line 120.

Figure 2:
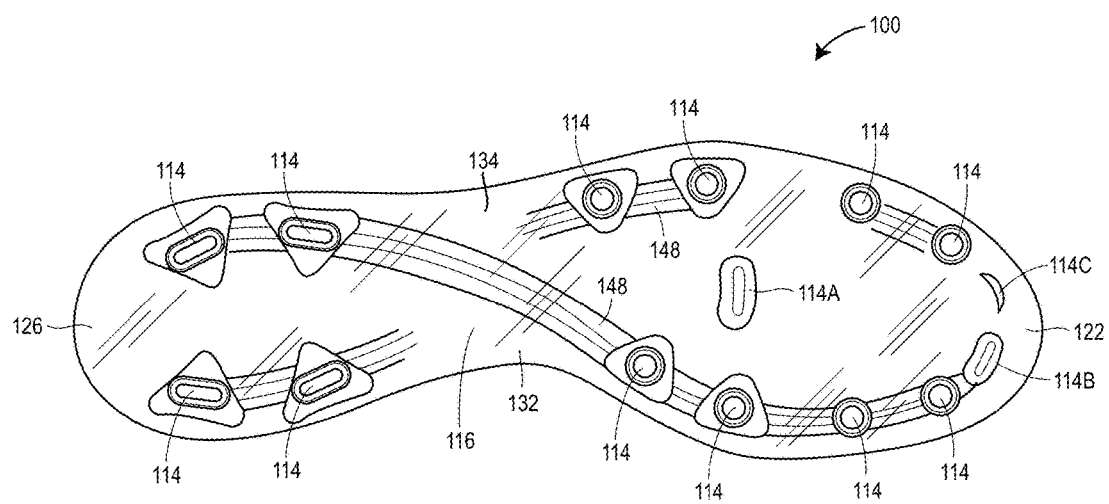
FIG. 2 is a bottom view of the outsole of the article of footwear shown in FIG. 1, where an upper of the footwear is omitted.

As further shown in FIGS. 1 and 2, the layout of outsole 112 can be segregated into a forefoot region 122, a midfoot region 124, and a heel region 126. The forefoot region 122 is disposed proximate a wearer's forefoot, the midfoot region 124 is disposed between the forefoot region 122 and the heel region 126, and the heel region 126 is disposed proximate a wearer's heel and opposite the forefoot region 122. The outsole 112 may also include a forward edge 128 at the forefoot region 122 and a rearward edge 130 at the heel region 126. In addition to these longitudinal designations, the left/right sides of outsole 112 can also be respectively designated by a medial side 132 and a lateral side 134.

Each of these designations can also apply to the upper 110 and more generally to the footwear 100, and are not intended to particularly define structures or boundaries of the footwear 100, the upper 110, or the outsole 112. As used herein, directional orientations for an article, such as "upward", "downward", "top", "bottom", "left", "right", and the like, are used for ease of discussion, and are not intended to limit the use of the article to any particular orientation. Additionally, references to "ground-facing surface", "ground-facing side", and the like refer to the surface or side of footwear that face the ground during normal use by a wearer as standing. These terms are also used for ease of discussion, and are not intended to limit the use of the article to any particular orientation.

The outsole 112 also includes a backing plate or 136, which, in the shown example, extends across the forefoot region 122, the midfoot region 124, and the heel region 126. The backing plate 136 is an example backing member or other outsole substrate for use in an article of footwear, and can provide structural integrity to the outsole 112. However, the backing plate 136 can also be flexible enough, at least in particular locations, to conform to the flexion of a wearer's foot during the dynamic motions produced during wear. For example, as shown in FIGS. 1 and 2, the backing plate 136 may include a flex region 138 at the forefoot region 122, which can facilitate flexion of the wearer's toes relative to the foot in active use of the footwear 100.

The backing plate 136 may have a top (or first) surface (or side) 142 (best shown in FIGS. 3 and 4), a bottom (or second) surface (or side) 144, and a sidewall 146, where the sidewall 146 can extend around the perimeter of the backing plate 136 at the forward edge 128, the rearward edge 130, the medial side 132, and the lateral side 134. The top surface 142 is the region of the backing plate 136 (and the outsole 112 more generally) that may be in contact with and operably secured to the upper 110 and/or to any present midsole or insole.

The bottom surface 144 is a ground-facing surface of the backing plate 136 that is covered (or at least partially covered) by the film 116 secured thereto, and would otherwise be configured to contact a ground surface, whether indoors or outdoors, if the film 116 were otherwise omitted. The bottom surface 144 is also the portion of outsole 112 that the traction elements 114 can extend from, as discussed below.

The backing plate 136 can be manufactured with one or more layers, may be produced from any suitable material(s), and can provide a good interfacial bond to the film 116, as discussed below. Examples of suitable materials for the backing plate 136 include one or more polymeric materials such as thermoplastic elastomers; thermoset polymers; elastomeric polymers; silicone polymers; natural and synthetic rubbers; composite materials including polymers reinforced with carbon fiber and/or glass; natural leather; metals such as aluminum, steel and the like; and combinations thereof.

In particular embodiments, the backing plate 136 is manufactured from one or more polymeric materials having similar chemistries to that of the film 116. In other words, the backing plate and the film can both comprise or consist essentially of polymers having the same or similar functional groups, and/or can comprise or consist essentially of polymers having the same or similar levels of polarity. For example, the backing plate and the film can both comprise or consist essentially of one or more polyurethanes (e.g., thermoplastic polyurethanes), one or more polyamides (e.g., thermoplastic polyamides), one or more polyethers (e.g., thermoplastic polyethers), one or more polyesters (e.g., thermoplastic polyesters), or the like. The similar chemistries can be beneficial for improving manufacturing compatibilities between the materials of the film 116 and the backing plate 136, and also for improving their interfacial bond strength. Alternatively, one or more tie layers (not shown) can be applied between the backing plate 136 and the film 116 in order to improve their interlayer bonding.

As used herein, the term "polymer" refers to a molecule having polymerized units of one or more species of monomer. The term "polymer" is understood to include both homopolymers and copolymers. The term "copolymer" refers to a polymer having polymerized units of two or more species of monomers, and is understood to include terpolymers. As used herein, reference to "a" polymer or other chemical compound refers one or more molecules of the polymer or chemical compound, rather than being limited to a single molecule of the polymer or chemical compound. Furthermore, the one or more molecules may or may not be identical, so long as they fall under the category of the chemical compound. Thus, for example, "a" polylaurolactam is interpreted to include one or more polymer molecules of the polylaurolactam, where the polymer molecules may or may not be identical (e.g., different molecular weights and/or isomers).

The traction elements 114 may each include any suitable cleat, stud, spike, or similar element configured to enhance traction for a wearer during cutting, turning, stopping, accelerating, and backward movement. The traction elements 114 can be arranged in any suitable pattern along the bottom surface 144 of the backing plate 136. For instance, the traction elements 114 can be distributed in groups or clusters along the outsole 112 (e.g., clusters of 2-8 traction elements 114). As best shown in FIGS. 1 and 2, the traction elements 114 can be grouped into a cluster 147A at the forefoot region 122, a cluster 147B at the midfoot region 124, and a cluster 147C at the heel region 126. In this example, six of the traction elements 114 are substantially aligned along the medial side 132 of the outsole 112, and the other six traction elements 114 are substantially aligned along the lateral side 134 of the outsole 112.

The traction elements 114 may alternatively be arranged along the outsole 112 symmetrically or non-symmetrically between the medial side 132 and the lateral side 134, as desired. Moreover, one or more of the traction elements 114 may be arranged along a centerline of outsole 112 between the medial side 132 and the lateral side 134, such as a blade 114A, as desired to enhance or otherwise modify performance.

Alternatively (or additionally), traction elements can also include one or more front-edge traction elements 114, such as one or more blades 114B, one or more fins 114C, and/or one or more cleats (not shown) operably secured to (e.g., integrally formed with) the backing plate 136 at a front-edge region between forefoot region 122 and cluster 147A. In this application, the film 116 can optionally extend across the bottom surface 144 at this front-edge region while maintaining good traction performance.

Furthermore, the traction elements 114 may each independently have any suitable dimension (e.g., shape and size). For instance, in some designs, each traction element 114 within a given cluster (e.g., clusters 147A, 147B, and 147C) may have the same or substantially the same dimensions, and/or each traction element 114 across the entirety of the outsole 112 may have the same or substantially the same dimensions. Alternatively, the traction elements 114 within each cluster may have different dimensions, and/or each fraction element 114 across the entirety of the outsole 112 may have different dimensions.

Examples of suitable shapes for the traction elements 114 include rectangular, hexagonal, cylindrical, conical, circular, square, triangular, trapezoidal, diamond, ovoid, as well as other regular or irregular shapes (e.g., curved lines, C-shapes, etc. . . . ). The traction elements 114 may also have the same or different heights, widths, and/or thicknesses as each other, as further discussed below. Further examples of suitable dimensions for the traction elements 114 and their arrangements along the backing plate 136 include those provided in soccer/global football footwear commercially available under the tradenames "TIEMPO", "HYPERVENOM", "MAGISTA", and "MERCURIAL" from Nike, Inc. of Beaverton, Oreg.

The traction elements 114 may be incorporated into the backing plate 136 by any suitable mechanism such that the traction elements 114 preferably extend from the bottom surface 144. For example, as discussed below, the traction elements 114 may be integrally formed with the backing plate 136 through a molding process (e.g., for firm ground (FG) footwear). Alternatively, the backing plate 136 may be configured to receive removable traction elements 114, such as screw-in or snap-in traction elements 114. In these embodiments, the backing plate 136 may include receiving holes (e.g., threaded or snap-fit holes, not shown), and the traction elements 114 can be screwed or snapped into the receiving holes to secure the traction elements 114 to the backing plate 136 (e.g., for soft ground (SG) footwear).

In further examples, a first portion of the traction elements 114 can be integrally formed with the backing plate 136 and a second portion of the traction elements 114 can be secured with screw-in, snap-in, or other similar mechanisms (e.g., for SG pro footwear). The traction elements 114 may also be configured as short studs for use with artificial ground (AG) footwear, if desired. In some applications, the receiving holes may be raised or otherwise protrude from the general plane of the bottom surface 144 of the backing plate 136. Alternatively, the receiving holes may be flush with the bottom surface 144.

The traction elements 114 can be fabricated from any suitable material for use with the outsole 112. For example, the traction elements 114 may include one or more of polymeric materials such as thermoplastic elastomers; thermoset polymers; elastomeric polymers; silicone polymers; natural and synthetic rubbers; composite materials including polymers reinforced with carbon fiber and/or glass; natural leather; metals such as aluminum, steel and the like; and combinations thereof. In embodiments in which the traction elements 114 are integrally formed with the backing plate 112 (e.g., molded together), the traction elements 114 preferably include the same materials as the backing plate 112 (e.g., thermoplastic materials). Alternatively, in embodiments in which the traction elements 114 are separate and insertable into receiving holes of the backing plate 112, the traction elements 114 can include any suitable materials that can secured in the receiving holes of the backing plate 112 (e.g., metals and thermoplastic materials).

The backing plate 136 (and more generally, the outsole 112) may also include other features other than the traction elements 114 that can provide support or flexibility to the outsole and/or for aesthetic design purposes. For instance, the backing plate 136 may also include ridges 148 that may be raised or otherwise protrude from the general plane of the bottom surface 144.

As shown, ridges 148 can extend along the arrangement pathways of the traction elements 114, if desired. These features (e.g., ridges 148) can be integrally formed into the backing plate 136, or alternatively, be removable features that are securable to the backing plate 136. Suitable materials for these features include those discussed above for the traction elements 114.

The backing plate 136 (and more generally, the outsole 112) may also include other features such as exaggerated tread patterns, lugs, and the like, which are configured to contact the ground or playing surface to increase traction, to enhance performance, or for aesthetic design purposes. These features can be present on the outsole in place of or in addition to the traction elements 114, and can be formed from the suitable materials discussed above for the traction elements 114.

Figure 3:
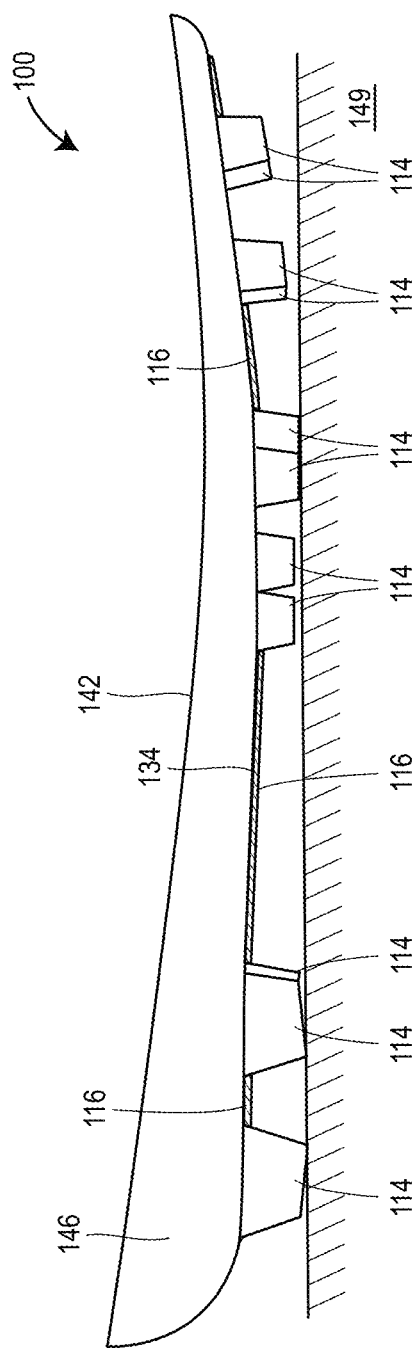
FIG. 3 is a lateral side view of the outsole shown in FIG. 2.
Figure 4:
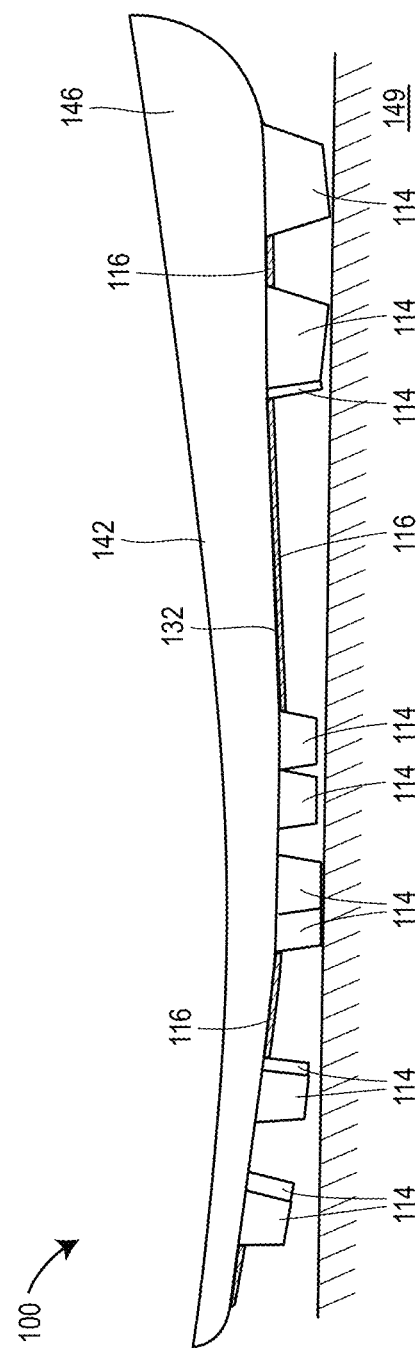
FIG. 4 is a medial side view of the outsole shown in FIG. 2.

As further shown in FIGS. 3 and 4, the traction elements 114 can be arranged such that when footwear 100 rests on a flat surface 149, the bottom surface 144 of backing plate 136 and the film 116 are offset from the flat surface 149. This offset is present even when the film 116 is fully saturated and swollen, as discussed below. As such, the traction elements 114 can receive the greatest levels of shear and abrasive contact with surfaces during use, such as by digging into soil during cutting, turning, stopping, accelerating, backward movements, and the like. In comparison, the film 116 at its offset location can remain partially protected from a significant portion of these shear and abrasive conditions, thereby preserving its integrity during use.

Figure 5:
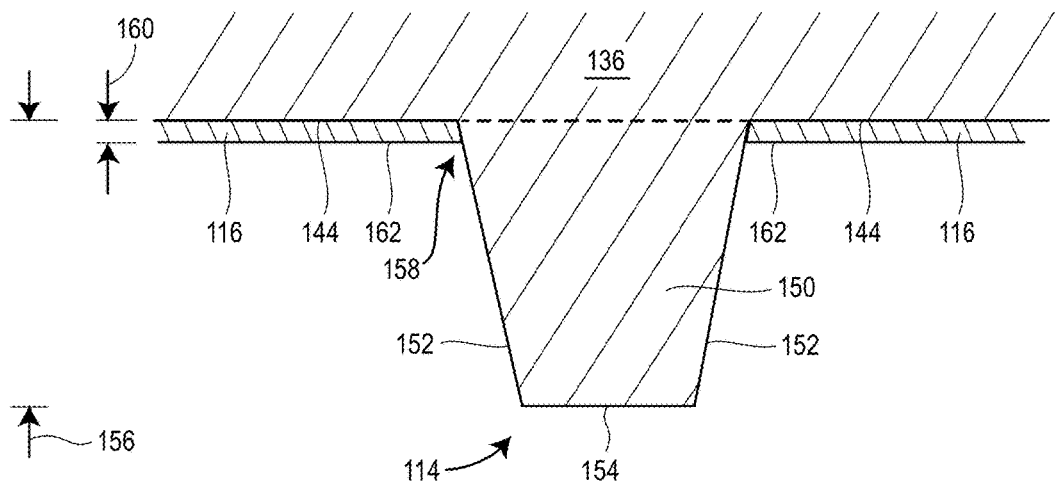
FIG. 5 is an expanded sectional view of a portion of the outsole, illustrating a material in accordance with the present disclosure in a dry state secured to a backing plate adjacent to a traction element (e.g., a cleat).

FIG. 5 is an expanded sectional view of the film 116 and the bottom surface 144 of the backing plate 136 at one of the traction elements 114. In this shown example, the traction element 114, which can be representative of one or more of the other traction elements 114, is integrally molded with the backing plate 136 and includes a shaft 150 that protrudes downward beyond the bottom surface 144 and the film 116. The shaft 150 itself may include an outer side surface 152 and a terminal edge 154. The terminal edge 154 of the shaft 150 is the distal end of the traction element 114, opposite from the bottom surface 144, and is the portion of the traction element 114 that can initially contact and penetrate into a playing or ground surface.

As mentioned above, the traction element 114 may have any suitable dimensions and shape, where the shaft 150 (and the outer side surface 152) can correspondingly have rectangular, hexagonal, cylindrical, conical, circular, square, triangular, trapezoidal, diamond, ovoid, as well as other regular or irregular shapes (e.g., curved lines, C-shapes, etc. . . . ). Similarly, the terminal edge 154 can have dimensions and sizes that correspond to those of the outer side surface 152, and can be substantially flat, sloped, rounded, and the like. Furthermore, in some embodiments, the terminal edge 154 can be substantially parallel to the bottom surface 144 and/or the film 116.

Examples of suitable average lengths 156 for each shaft 150 relative to bottom surface 144 range from 1 millimeter to 20 millimeters, from 3 millimeters to 15 millimeters, or from 5 millimeters to 10 millimeters, where, as mentioned above, each traction element 114 can have different dimensions and sizes (i.e., the shafts 150 of the various traction elements 114 can have different lengths).

In the example shown in FIGS. 1-5, the film 116 is present on the entire bottom surface 144 of the backing plate 136 between (and not including) the traction elements 114. For instance, as shown in FIG. 5, the film 116 can cover the bottom surface 144 at locations around the shaft 150 of each traction element 114, such that film 116 does not cover the outer side surface 152 or the terminal edge 154 of the traction element 114, other than optionally at a base region 158 of the shaft 150. This can preserve the integrity of the film 116 and preserve traction performance of the traction elements 114. In some embodiments, the film 116 does not cover or contact any portion of the outer side surface 152 of the shaft 150. In other embodiments, the base region 158 that the film 116 (in a dry state) covers and contacts the outer side surface 152 is less than 25%, less than 15%, or less than 10% of the length of the shaft 150, as an average distance measured from the bottom surface 144 at the traction element 114.

As can be seen in FIG. 5, the film 116 is preferably a thin film to minimize or otherwise reduce its impact on the traction elements 114. Examples of suitable average thicknesses for the film 116 in a dry state (referred to as a dry-state film thickness 160) range from 0.025 millimeters to 5 millimeters, from 0.5 millimeters to 3 millimeters, from 0.25 millimeters to 1 millimeter, from 0.25 millimeters to 2 millimeters, from 0.25 millimeters to 5 millimeters, from 0.15 millimeters to 1 millimeter, from 0.15 millimeters to 1.5 millimeters, from 0.1 millimeters to 1.5 millimeters, from 0.1 millimeters to 2 millimeters, from 0.1 millimeters to 5 millimeters, from 0.1 millimeters to 1 millimeter, or from 0.1 millimeters to 0.5 millimeters. As depicted, the thicknesses for the film 116 are measured between the interfacial bond at the bottom surface 144 of the backing plate 136 and an exterior surface of the film 116 (referred to as a film surface 162).

In some alternative embodiments, the film 116 can also (or alternatively) be present on one or more regions of the traction elements 114. These embodiments can be beneficial, for example, in applications where the traction element 114 has a central base with multiple shafts 150 that protrude from the periphery of the central base. In such embodiments, the film 116 can be present on at least the central base of the traction element 114. Furthermore, for some applications, the film 116 may also cover the entirety of one or more of the fraction elements 114 (e.g., on the shaft 150).

Presence of the film 116 on the ground-facing side of outsole 112 (i.e., on bottom surface 144) allows the film 116 to come into contact with soil, including wetted soil during use, which is believed to enhance the soil-shedding performance for the footwear 100, as explained below. However, the film 116 can also optionally be present on one or more locations of the sidewall 146 of the backing plate 136.

As briefly mentioned above, the film 116 can compositionally include a material that allows the film 116 to absorb or otherwise take up water. For example, the material can include a crosslinked polymeric network that can quickly take up water from an external environment (e.g., from mud, wet grass, presoaking, and the like).

Moreover, it is believed that this uptake of water by the film 116 causes the polymer network of the material to untwist and stretch under the pressure of the received water, while retaining its overall structural integrity through its crosslinking (physical or covalent crosslinking) This stretching and expansion of the polymer network can cause the film 116 to swell and become more compliant (e.g., compressible, expandable, and stretchable). As used herein, the term "compliant" refers to the stiffness of an elastic material, and can be determined by the storage modulus of the material. The lower the degree of crosslinking in a material, or the greater the distance between crosslinks in a material, the more compliant the material.

Figure 5A:
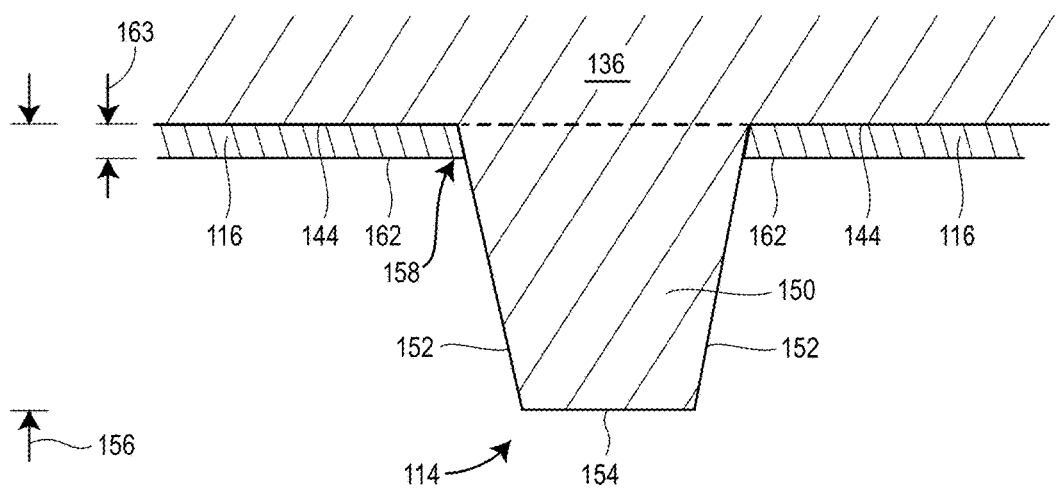
FIG. 5A is an expanded sectional view of the portion of the outsole shown in FIG. 5, where the material is partially saturated and swollen.
Figure 5B:
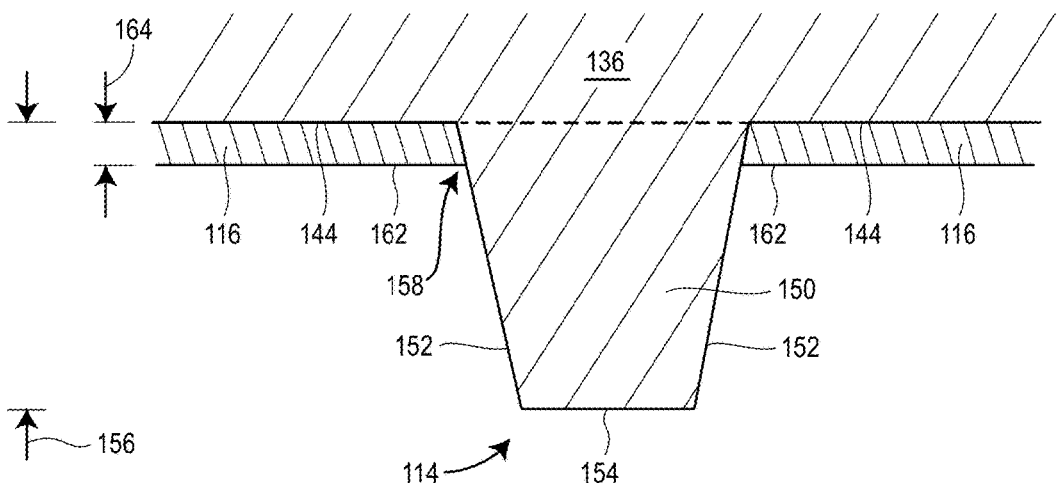
FIG. 5B is an expanded sectional view of the portion of the outsole shown in FIG. 5, where the material is fully saturated and swollen.

The swelling of the film 116 can be observed as an increase in film thickness from the dry-state thickness 160 of the film 116 (shown in FIG. 5), through a range of intermediate-state thicknesses (e.g., thickness 163, shown in FIG. 5A) as additional water is absorbed, and finally to a saturated-state thickness 164 (shown in FIG. 5B), which is an average thickness of the film 116 when fully saturated with water. For example, the saturated-state thickness 164 for the fully saturated film 114 can be greater than 150%, greater than 200%, greater than 250%, greater than 300%, greater than 350%, greater than 400%, or greater than 500%, of the dry-state thickness 160 for the same film 116.

In some embodiments, the saturated-state thickness 164 for the fully saturated film 114 range from 150% to 500%, from 150% to 400%, from 150% to 300%, or from 200% to 300% of the dry-state thickness 160 for the same film 116. Examples of suitable average thicknesses for the film 116 in a wet state (referred to as a saturated-state thickness 164) range from 0.2 millimeters to 10 millimeters, from 0.2 millimeters to 5 millimeters, from 0.2 millimeters to 2 millimeters, from 0.25 millimeters to 2 millimeters, or from 0.5 millimeters to 1 millimeter.

Preferably, the film 116 material can quickly take up water that is in contact with the film 116. For instance, the film 116 can take up water from mud and wet grass, such as during a warmup period prior to a competitive match. Alternatively (or additionally), the film 116 can be pre-conditioned with water so that the film 116 is partially or fully saturated, such as by spraying or soaking the outsole 112 with water prior to use.

The total amount of water that the film 116 can take up depends on a variety of factors, such as its composition (e.g., its hydrophilicity), its cross-linking density, its thickness, and its interfacial bond to the backing plate 136. For example, it is believed that a film material having a higher hydrophilicity and a lower cross-linking density can increase the maximum water uptake for the film 116. On the other hand, the interfacial bond between the film 116 and the bottom surface 144 of the backing plate 136 can potentially restrict the swelling of the film 116 due to its relatively thin dimensions. Accordingly, as described below, the maximum water uptake and the maximum percent swell of the film 116 can differ between the film 116 in a neat state (isolated film by itself) and the film 116 as present on the backing plate 136.

The water uptake capacity and the water uptake rate of the film 116 are dependent on the size and shape of its geometry, and are typically based on the same factors. However, it has been found that, to account for part dimensions when measuring water uptake capacity, it is possible to derive an intrinsic, steady-state material property. Therefore, conservation of mass can be used to define the ratio of water weight absorbed to the initial dry weight of the film 116 at very long time scales (i.e. when the ratio is no longer changing at a measurable rate.)

Conversely, the water uptake rate is transient and is preferably defined kinetically. The three primary factors for water uptake rate for a given part geometry include time, thickness, and the exposed surface area available for water flux. Once again, the weight of water taken up can be used as a metric of water uptake rate, but the water flux can also be accounted for by normalizing by the exposed surface area. For example, a thin rectangular film can be defined by $2 \times L \times W$, where L is the length of one side and W is the width. The value is doubled to account for the two major surfaces of the film, but the prefactor can be eliminated when the film has a non-absorbing, structural layer secured to one of the major surfaces (e.g., with an outsole backing plate).

Normalizing for thickness and time can require a more detailed analysis because they are coupled variables. Water penetrates deeper into the film as more time passes in the experiment, and therefore, there is more functional (e.g., absorbent) material available at longer time scales. One dimensional diffusion models can explain the relationship between time and thickness through material properties, such as diffusivity. In particular, the weight of water taken up per exposed surface area should yield a straight line when plotted against the square root of time.

However, several factors can occur where this model does not represent the data well. First, at long times absorbent materials become saturated and diffusion kinetics change due to the decrease in concentration gradient of the water. Second, as time progresses the material can be plasticized to increase the rate of diffusion, so once again the model do longer represents the physical process. Finally, competing processes can dominate the water uptake or weight change phenomenon, typically through surface phenomenon such as physisorption on a rough surface due to capillary forces. This is not a diffusion driven process, and the water is not actually be taken up into the film.

Even though the film 116 can swell as it takes up water and transitions between the different film states with corresponding thicknesses 160, 163, and 164, the saturated-state thickness 164 of the film 116 preferably remains less than the length 156 of the traction element 114. This selection of the film 116 and its corresponding dry and saturated thicknesses ensures that the traction elements 114 can continue to provide ground-engaging traction during use of the footwear 100, even when the film 116 is in a fully swollen state. For example, the average clearance difference between the lengths 156 of the traction elements 114 and the saturated-state thickness 164 of the film 116 is desirably at least 8 millimeters. For example, the average clearance distance can be at least 9 millimeters, 10 millimeters, or more.

As also mentioned above, in addition to swelling, the compliance of the film 116 may also increase from being relatively stiff (dry state) to being increasingly stretchable, compressible, and malleable (in partially and fully saturated states). The increased compliance accordingly can allow the film 116 to readily compress under an applied pressure (e.g., during a foot strike on the ground), which can quickly expel at least a portion of its retained water (depending on the extent of compression). While not wishing to be bound by theory, it is believed that this combination of compressive compliance and water expulsion can disrupt the adhesion and cohesion of soil at outsole 112, which prevents or otherwise reduces the accumulation of soil on outsole 112.

In addition to quickly expelling water, the compressed film 116 may also be capable of quickly re-absorbing water when the compression is released (e.g., liftoff from a foot strike during normal use). As such, during use in a wet or damp environment (e.g., a muddy or wet ground), the film 116 can dynamically expel and re-uptake water over successive foot strikes. As such, the film 116 can continue to prevent soil accumulation over extended periods of time (e.g., during an entire competitive match), particularly when there is ground water available for re-uptake.

FIGS. 6-9 illustrate an example method of using footwear 100 with a muddy or wet ground 166, which depict the believed mechanism for preventing soil accumulation on the outsole 112. It is known that the soil of the ground 166 can accumulate on an outsole (e.g., between the traction elements) during normal athletic or casual use, in particular when the ground 166 is wet. The soil is believed to accumulate on the outsole due to a combination of adhesion of the soil particles to the surface of the outsole and cohesion of the soil particles to each other. In order to break these adhesive/cohesive forces, the soil particles need to be subjected to stresses high enough to exceed their adhesive/cohesive activation energies. When this is achieved, the soil particles can then move or flow under the applied stresses, which dislodge or otherwise shed portions of the soil from the outsole.

However, during typical use of cleated footwear, such as during competitive sporting events (e.g., global football/soccer matches, golfing events, and American football games), the actions of walking and running are not always sufficient to dislodge the soil from the outsole. This can result in the soil sticking to the outsoles, particularly in the interstitial regions where compaction forces in the normal direction are maximized between the individual traction elements. As can be appreciated, this soil can quickly accumulate to increase the weight of the footwear and reduce the effectiveness of the traction elements (e.g., because they have less axial or normal extent capable of engaging with the ground 166), each of which can have a significant impact on athletic performance.

Figure 6:
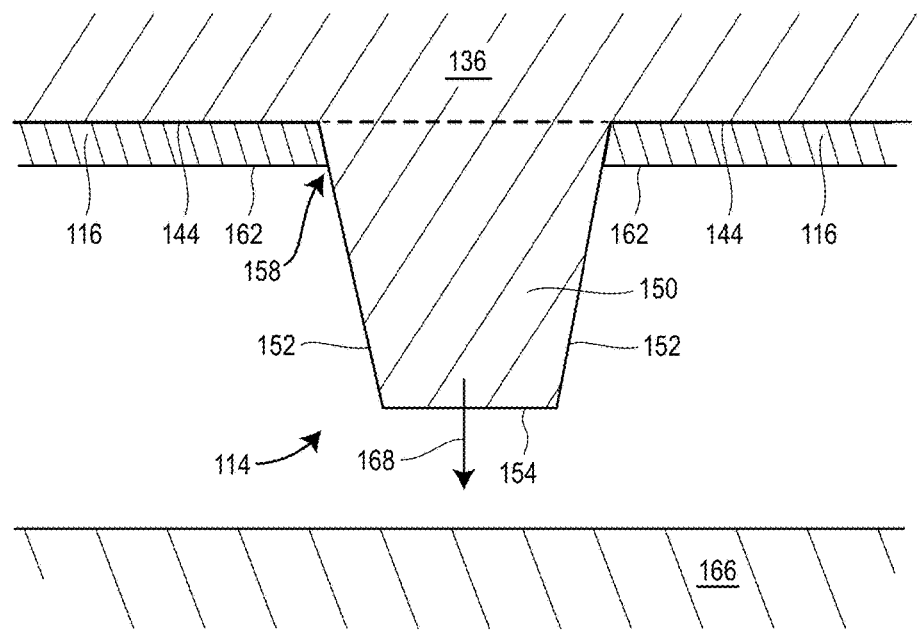
FIGS. 6-9 are expanded sectional views of the portion of the outsole shown in FIG. 5, illustrating the soil-shedding performance of the outsole during a foot strike motion on an unpaved surface.

The incorporation of the film 116 to the outsole 112, however, is believed to disrupt the adhesion and cohesion of soil at the outsole 112, thereby reducing the adhesive/cohesive activation energies otherwise required to induce the flow of the soil particles. As shown in FIG. 6, the footwear 100 can be provided in a pre-conditioned state where the film 116 is partially or fully saturated with water. This can be accomplished in a variety of manners, such as spraying the outsole 112 with water, soaking the outsole 112 in water, or otherwise exposing the film 116 to water in a sufficient amount for a sufficient duration. Alternatively (or additionally), when water or wet materials are present on the ground 166, footwear 100 can be used in a conventional manner on the ground 166 until the film 116 absorbs a sufficient amount of water from the ground 166 or wet materials to reach its pre-conditioned state.

Figure 7:
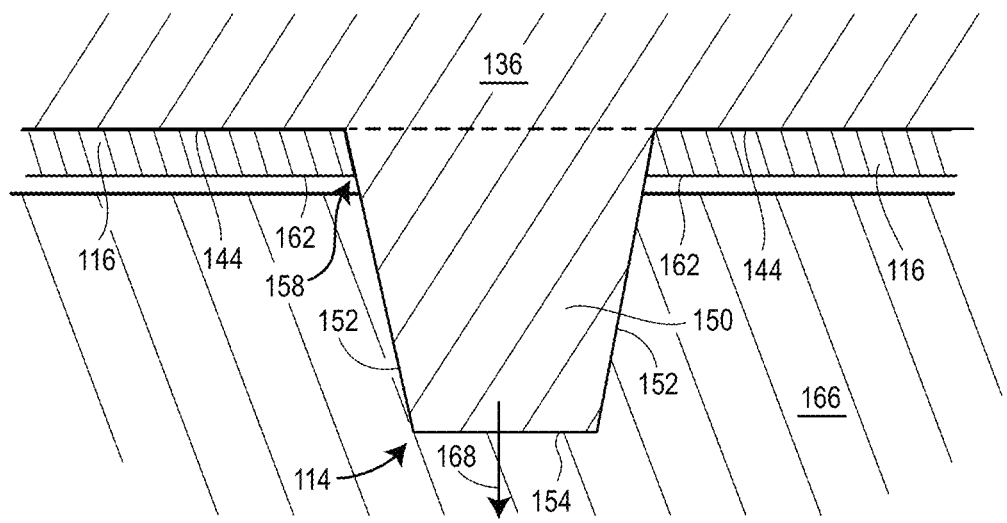
Figure 8:
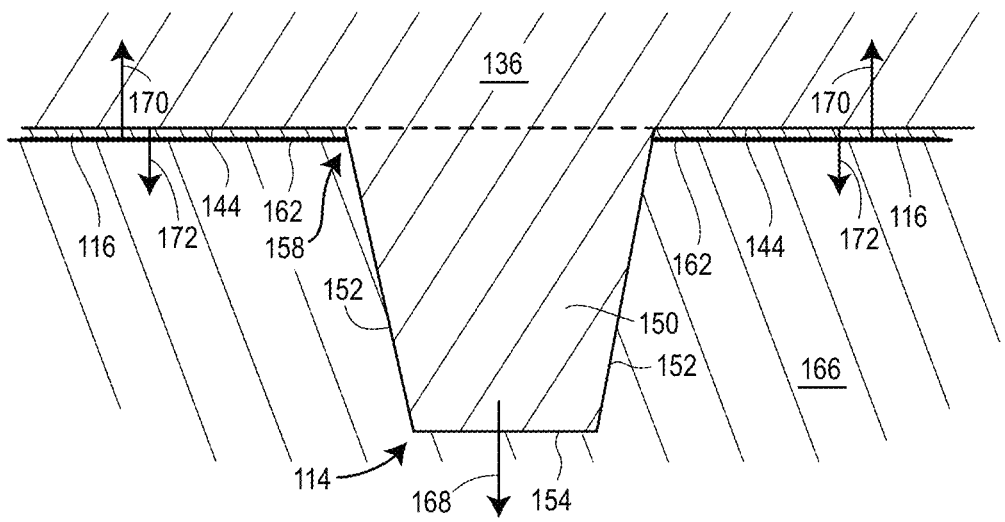

During a foot strike, the downward motion of the footwear 100 (illustrated by arrow 168) causes the traction element 114 to contact the ground 166. As shown in FIG. 7, the continued applied pressure of the foot strike can cause the traction element 114 to penetrate into the softer soil of the ground 166 until the film surface 162 of the film 116 contacts the ground 166. As shown in FIG. 8, further applied pressure of the foot strike can press the film 116 into the ground 166, thereby at least partially compressing the film 116 under the applied pressure (illustrated by arrows 170).

As can be seen, this compression of the film 116 into the soil of the ground 166 typically compacts the soil, increasing the potential for the soil particles to adhere to outsole 112 and to cohesively adhere to each other (clumping together). However, the compression of the film 116 may also expel at least a portion of its uptaken water into the soil of the ground 166 (illustrated by arrows 172). It is believed that as the water is expelled through the film surface 162 of the film 116, the pressure of the expelled water can disrupt the adhesion of the soil to the film surface 162 at this interface.

Additionally, once expelled into the soil, it is also believed that the water may also modify the rheology of the soil adjacent to the film surface 162 (e.g., watering down the soil to a relatively muddier or wetter state). This is believed to essentially spread out the soil particles in the water carrier and weaken their cohesive forces (e.g., mechanical/ionic/hydrogen bonds). Each of these mechanisms from the expelled water is believed to lower the required stresses need to disrupt the adhesion of the soil from the outsole 112. As such, the stresses typically applied during athletic performances (e.g., while running, handling the ball with the footwear, and kicking the ball) can exceed the cohesive/adhesive activation energies more frequently.

Figure 9:
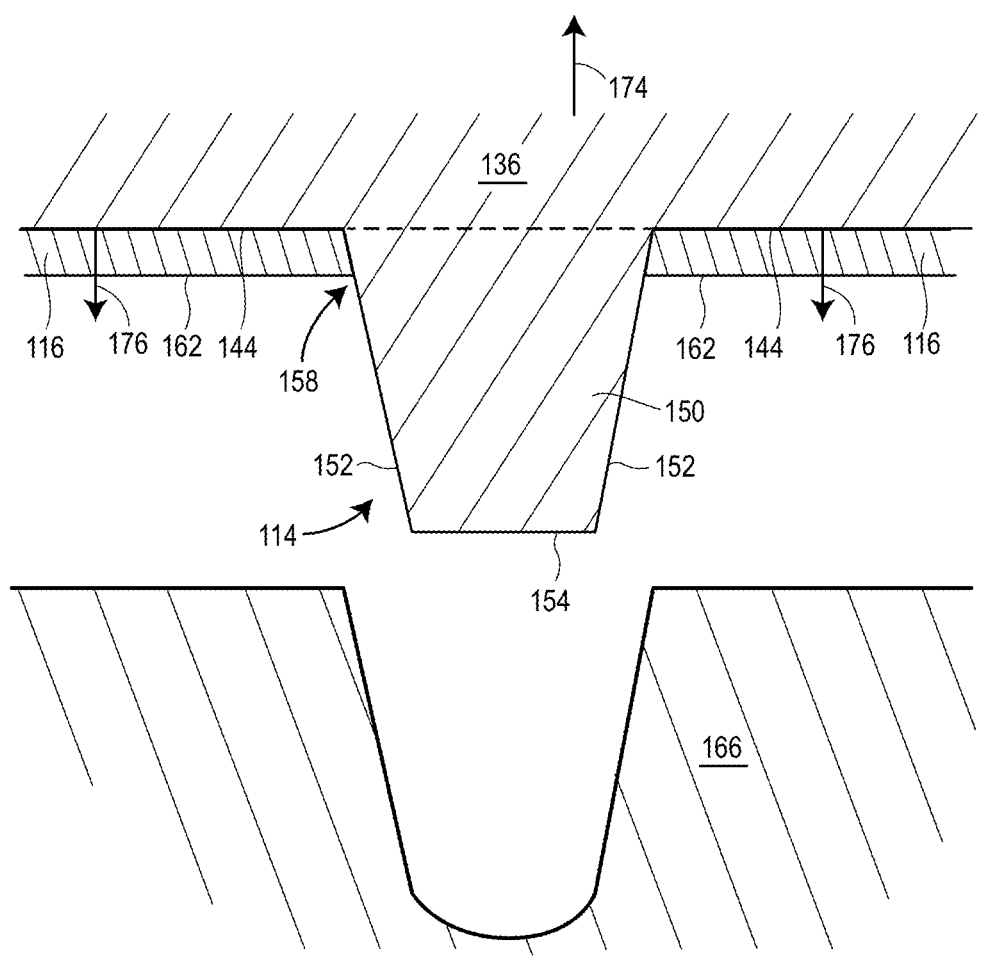

As shown in FIG. 9, when the footwear 100 is lifted following the foot strike (illustrated by arrow 174), it is believed that the compression applied to the film 116 is released, and so the film 116 can be free to expand. In some examples, it has been found that, when the outsole 112 is lifted apart from the ground 166, a thin water layer can remain in contact with the film surface 162, which can quickly re-uptake into the film 116. This quick re-uptake of water from the film surface 162 (after compression is removed (e.g., within about 1, 2, or 5 seconds) can quickly swell the film 116 back at least partially to its previously-swelled state (depending on the amount of water re-absorbed), as illustrated by arrows 176.

This cyclic compression and expansion from repeated, rapid, and/or forceful foot strikes during use of the footwear 100 can also mechanically disrupt the adhesion of any soil still adhered to the film surface 162, despite the relatively small thickness of the film 116 in any of its various states of water saturation (e.g., partially to fully saturated). In particular, the increased compliance is believed, under some conditions, to lead to inhomogeneous shear states in the soil when compressed in the normal or vertical direction, which can also lead to increased interfacial shear stresses and a decrease in soil accumulation.

Figure 19:
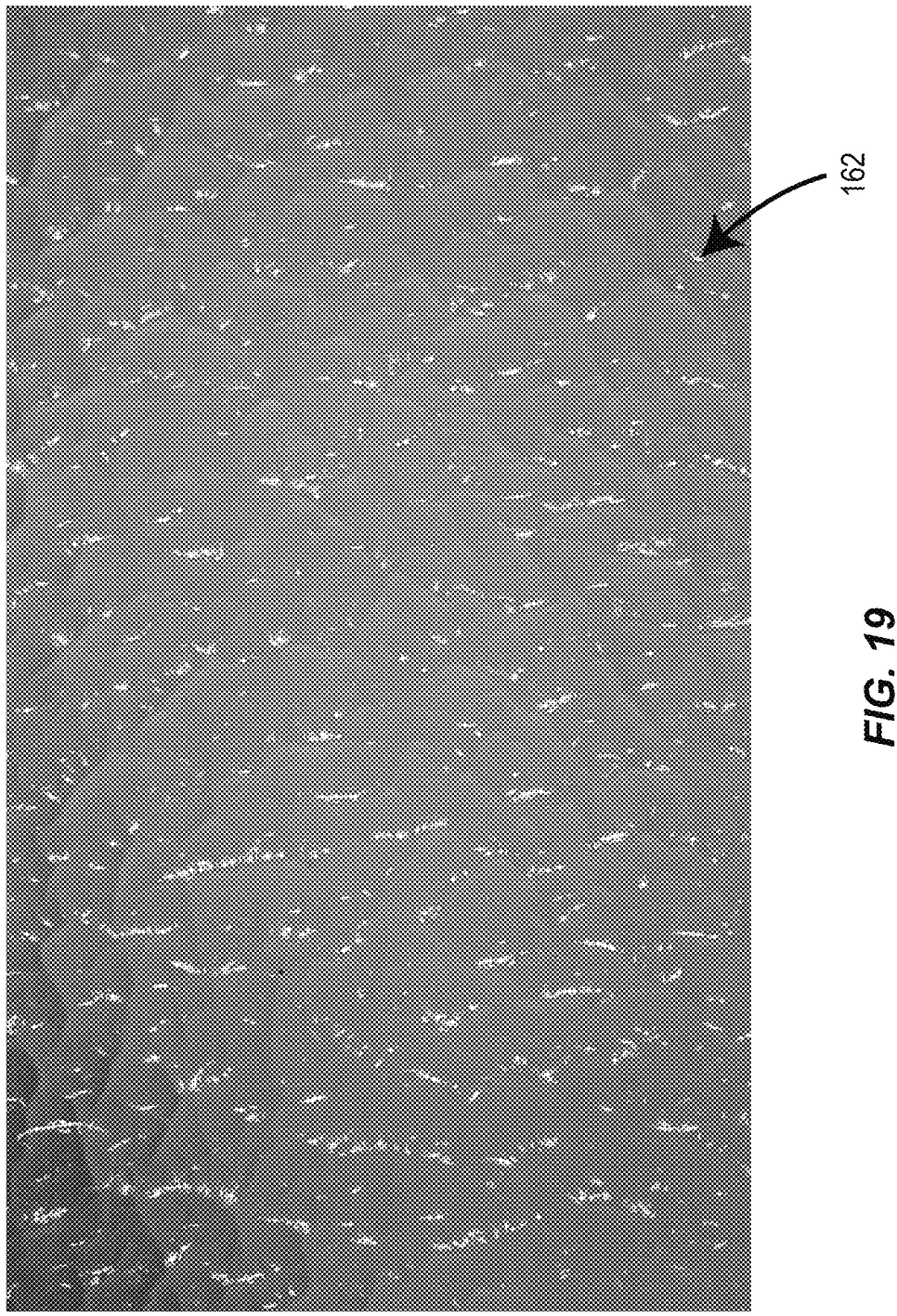
FIG. 19 is a photograph of an example a material of the present disclosure.

In some embodiments, the film 116 can swell during water re-uptake (and also during initial uptake) in a non-uniform manner. In such embodiments, the uptaken water may tend to travel in a path perpendicular to the film surface 162, and so may not migrate substantially in a transverse direction generally in the plane of the film 116 once absorbed. This uneven, perpendicular water uptake and relative lack of transverse water intra-film transport can form an irregular or rough texture or small ridges for the film surface 162. The presence of these small ridges on the irregular film surface 162 from the non-uniform swelling are also believed to potentially further disrupt the adhesion of the soil at the film surface 162, and thus may loosen the soil and further promote soil shedding. The uneven, ridged film surface 162 can also be seen in the photograph of FIG. 19 of an exemplary water-saturated film 116 according to the present disclosure.

Figure 10:
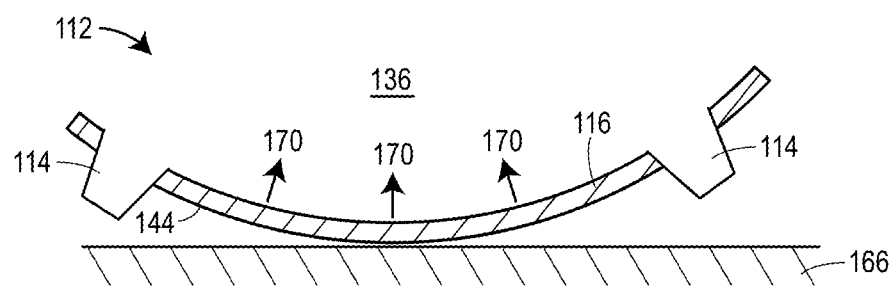
FIG. 10 is a side cross-sectional view of an outsole in an aspect according to the disclosure including a soil-shedding material and soil being shed therefrom, during impact with a ground surface.

In addition to the uptake, compression, expulsion, re-uptake, and swelling cycle discussed above, the increased compliance of the film 116, for example elongational compliance in the longitudinal direction, may allow the film 116 to be more malleable and stretchable when swelled. For example, as illustrated in FIG. 10, during a foot rotation in a foot strike (e.g., as the foot generally rolls from heel to toe during a stride), the outsole 112 and the film 116 are correspondingly flexed (e.g., inducing compression forces illustrated by arrows 170).

The increased elongation or stretchiness of the film 116 when partially or fully saturated with water can increase the extent that the film 116 stretches during this flexing, which can induce additional shear on any soil adhered to the film surface 162. As illustrated, a rolling ground strike creates a curved outsole 112 and a curved compressed film 116, which can cause water to be expelled therefrom and transverse film stretching forces being induced to pull apart and shed the soil. The compression forces (illustrated by arrows 170) on the film 116, which can help to expel the water can be particularly strong at points of contact with the ground 166 and/or where the radius of curvature of the curved outsole 112/curved film 116 is relatively small or at its minimum.

The foregoing properties of the film 116 related to compression/expansion compliance and the elongation compliance are believed to be closely interrelated, and they can depend on the same film 116 properties (e.g., a hydrophilic film able to able to rapidly take up and expel relatively large amounts of water compared to the film size or thickness). A distinction is in their mechanisms for preventing soil accumulation, for example surface adhesion disruption versus shear inducement. The water re-uptake is believed to potentially act to quickly expand or swell the film 116 after being compressed to expel water. Rapid water uptake can provide a mechanism for replenishing the film 116 water content between foot strikes. Rapid replenishment of the film 116 water content can restore the film 116 to its compliant state, returning it to a state where stretching and shearing forces can contribute to debris shedding. In addition, replenishment of the film 116 water content can permit subsequent water expulsion to provide an additional mechanism for preventing soil accumulation (e.g., application of water pressure and modification of soil rheology). As such, the water absorption/expulsion cycle can provide a unique combination for preventing soil accumulation on the outsole 112 of the footwear 100.

In addition to being effective at preventing soil accumulation, the film 116 has also been found to be sufficiently durable for its intended use on the ground-contacting side of the outsole 112. Durability is based on the nature and strength of the interfacial bond of the film 116 to the bottom surface 144 of the backing plate 136, as well as the physical properties of the film 116 itself. For many examples, during the useful life of the film 116, the film 116 may not delaminate from the backing plate 136, and it can be substantially abrasion- and wear-resistant (e.g., maintaining its structural integrity without rupturing or tearing).

In various embodiments, the useful life of the film 116 (and the outsole 112 and footwear 100 containing it) is at least 10 hours, 20 hours, 50 hours, 100 hours, 120 hours, or 150 hours of wear. For example, in some applications, the useful life of the film 116 ranges from 20 hours to 120 hours. In other applications, the useful life of the film 116 ranges from 50 hours to 100 hours of wear.

Interestingly, for many examples, the dry and wet states of the film 116 can allow the film 116 to dynamically adapt in durability to account for dry and wet surface play. For example, when used on a dry ground 166, the film 116 can also be dry, which renders it stiffer and more wear resistant. Alternatively, when used on wet ground 166 or when wet material is present on a dry ground 166, the film 116 can quickly take up water to achieve a partially or fully saturated condition, which may be a swollen and/or compliant state. However, the wet ground 166 imposes less wear on the swollen and compliant film 116 compared to dry ground 166. As such, the film 116 can be used in a variety of conditions, as desired. Nonetheless, the footwear 100 and the outsole 112 are particularly beneficial for use in wet environments, such as with muddy surfaces, grass surfaces, and the like.

Figure 11:
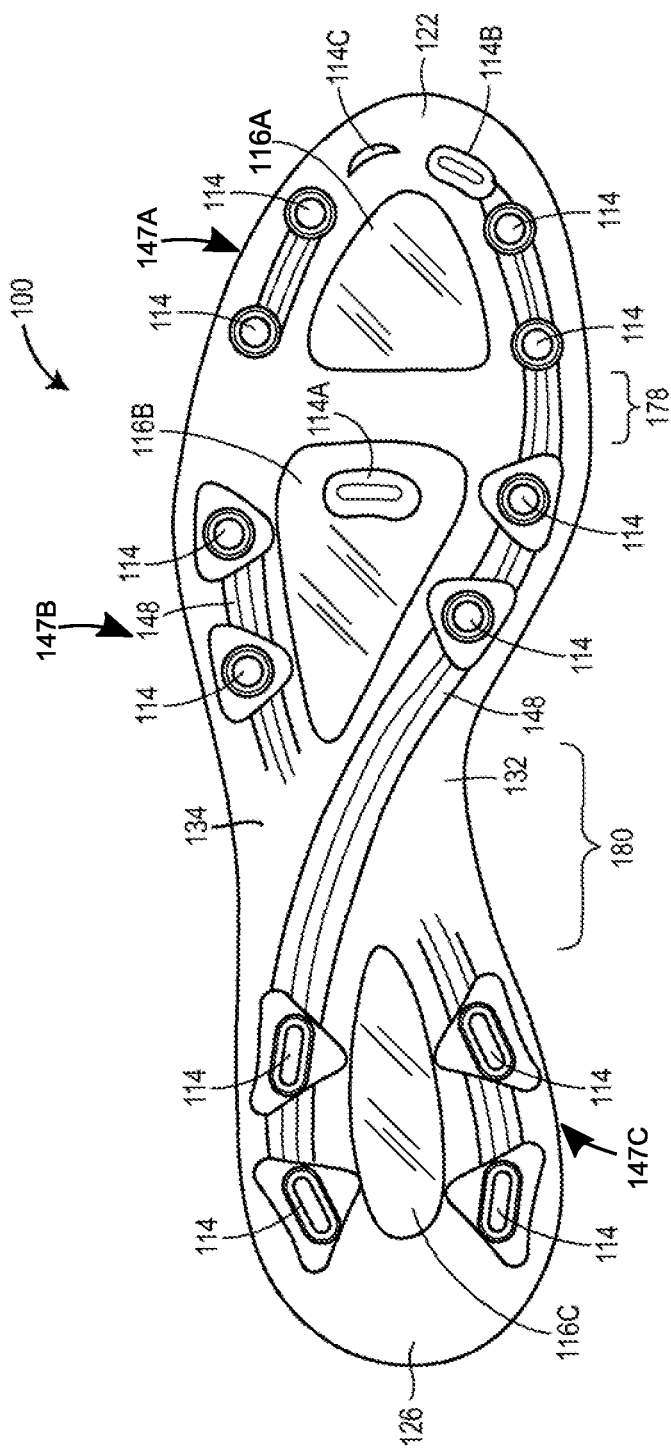
FIG. 11 is a bottom view of an article of footwear in another aspect of the present disclosure having an outsole including a material in accordance with the present disclosure, the material having discrete and separate sub-segments.

While the film 116 is illustrated above in FIGS. 1-4 as extending across the entire bottom surface 144 of the outsole 112 of the footwear 100, in alternative embodiments, the film 116 can alternatively be present as one or more segments that are present at separate, discrete locations on the bottom surface 144 of the outsole 112. For instance, as shown in FIG. 11, the film 116 can alternatively be present as a first segment 116A secured to the bottom surface 144 at the forefoot region 122, such as in the interstitial region between the traction elements 114 of cluster 147A; a second segment 116B secured to the bottom surface 144 at the midfoot region 124, such as in the interstitial region between the fraction elements 114 of cluster 147B; and/or a third segment 116C secured to the bottom surface 144 at the heel region 126, such as in the interstitial region between the fraction elements 114 of cluster 147C. In each of these examples, the remaining regions of the bottom surface 144 can be free of the film 116.

In some arrangements, the film 116 may include one or more segments secured to the bottom surface 144 at a region 178 between the clusters 147A and 147B, at a region 180 between the clusters 147B and 147C, or both. For example, the film 116 may include a first segment present on the bottom surface 144 that encompasses the locations of segment 116A, the region 178, and segment 116B as well at the location of region 178; and a second segment corresponding to the segment 116B (at the cluster 147C). As also shown in FIG. 11, the segments of the film 116 (e.g., segments 116A, 116B, and 116C) can optionally have surface dimensions that conform to the overall geometry of the backing plate 136, such as to conform to the contours of the ridges 148, the traction elements 114, and the like.

In another arrangement, the bottom surface 144 may include a front edge region 182 between the front edge 128 and the cluster 147A (and optionally include a front portion of the cluster 147A) that is free of the film 116. As some of the examples of the film 116 may be lubricious when partially or fully saturated, having the film 116 present in the front edge region 182 of the bottom surface 144 can potentially impact traction and ball handling during sports. Furthermore, soil accumulation is typically most prominent in the interstitial regions of the clusters 147A, 147B, and 147C, in comparison to the front edge 128.

Figure 12:
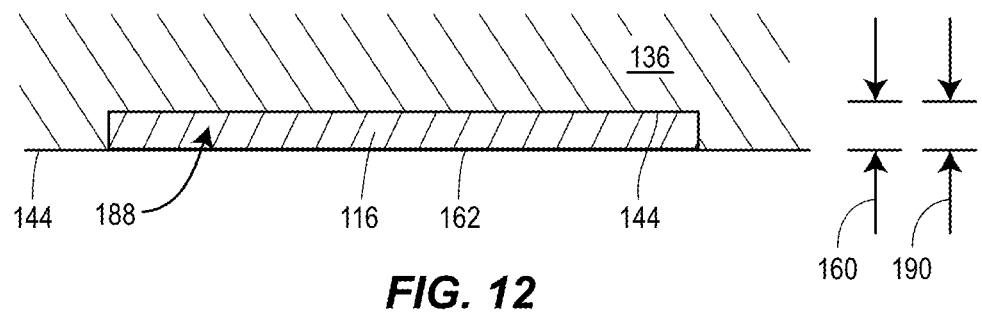
FIG. 12 is an expanded sectional view of a portion of an outsole in another aspect of the present disclosure, which includes a material in accordance with the present disclosure, the material being present in a recessed pocket of an outsole backing plate.

Furthermore, the backing plate 136 can also include one or more recessed pockets, such as a pocket 188 shown in FIG. 12, in which the film 116 or a sub-segment of the film 116 can reside. This can potentially increase the durability of the film 116 by protecting it from lateral delamination stresses. For instance, the backing plate 136 can include a pocket 188 in the interstitial region of cluster 147C, where the sub-segment 116C of the film 116 can be secured to the bottom surface 144 within the pocket 188. In this case, the dry-state thickness 160 of the film 116 can vary relative to a depth 190 of the pocket 188.

In some embodiments, the depth 190 of the pocket 188 can range from 80% to 120%, from 90% to 110%, or from 95% to 105% of the dry-state thickness 160 of the film 116. Moreover, in embodiments in which the backing plate 136 includes multiple pockets 188, each pocket 188 may have the same depth 190 or the depths 190 may independently vary as desired. As can be appreciated, the increased bonding of the film 116 due to the recessed pocket 188 can potentially reduce the swelling of the film 116 when partially or fully saturated. However, a significant portion of the film 116 can be offset enough from the walls of the pocket 188 such that these interfacial bonds (relative to the dry-state thickness 160) will minimally affect the swelling and water-absorbing performance of the film 116.

Figure 13:
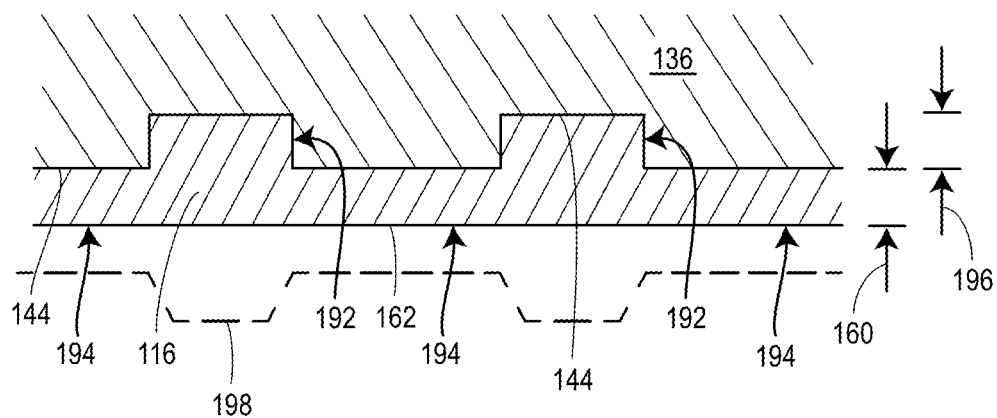
FIG. 13 is an expanded sectional view of a portion of an outsole in another aspect of the present disclosure, which includes an outsole backing plate having one or more indentations, and a material in accordance with the present disclosure, the material being present in and over the indentations.

FIG. 13 illustrates an alternative design for the engagement between the film 116 and the bottom surface 144. In this case, the backing plate 136 can include one or more recessed indentations 192 having any suitable pattern(s), and in which portions of the film 116 extend into the indentations 192 to increase the interfacial bond surface area between the film 116 and the bottom surface 144 of the backing plate 136. For example, the indentations 192 can be present as one or more geometrically-shaped holes (e.g., circular, rectangular, or other geometric shapes) or irregularly-shaped holes in the backing plate 136, one or more trenches or channels extending partially or fully along the backing plate 136 (in the lateral, longitudinal, or diagonal directions), and the like.

In these embodiments, the film 116 can have two (or more) thicknesses depending on whether a given portion of the film 116 extends into one of the indentations. For ease of discussion and readability, the dry-state thickness 160 of the film 116, as used herein, refers to a portion of the film 116 (in a dry state) that does not extend into one of the indentations, such as at locations 194. As such, the dry-state thickness 160 shown in FIG. 13 is the same as the dry-state thickness 160 shown above in FIG. 5.

Each indentation 192 may independently have a depth 196, which can range from 1% to 200%, from 25% to 150%, or from 50% to 100% of the dry-state thickness 160 of the film 116. In these locations, the dry-state thickness of the film 116 is the sum of the dry-state thickness 160 and the depth 196. An interesting result of this arrangement is that the film 116 can potentially swell to different partially or fully saturated-state thicknesses 164. In particular, because the amount that the film 116 swells depends on the initial, dry-state thickness of the film 116, and because the portions of the film 116 at the indentations 192 have greater dry-state thicknesses compared to the portions of the film 116 at locations 194, this can result in a non-planar swelling of the film 116, as depicted by broken lines 198. The particular dimensions of the non-planar swelling can vary depending on the relative dry-state thicknesses of the film 116, the depth 196 of the indentations 192, the extent of saturation of the film 116, the particular composition of the film 116, and the like.

Figure 14:
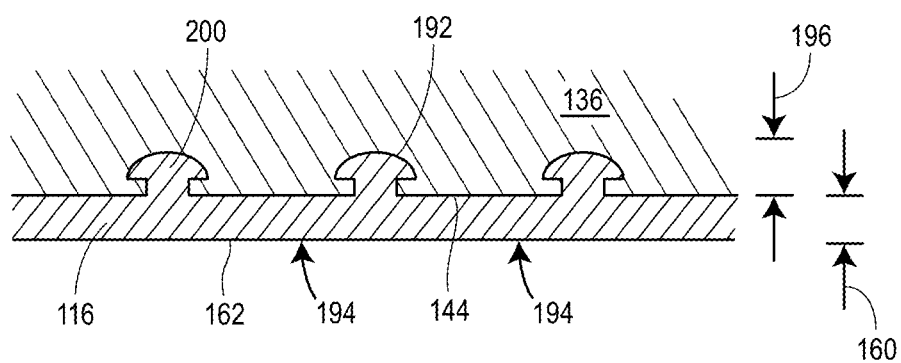
FIG. 14 is an expanded sectional view of a portion of an outsole in another aspect of the present disclosure, which includes an outsole backing plate having one or more indentations having locking members, and a material in accordance with the present disclosure, the material being present in and over the indentations.

FIG. 14 illustrates a variation on the indentations 192 shown above in FIG. 13. In the design shown in FIG. 14, the indentations 192 can also extend in-plane with the backing plate 136 to form locking members 200 (e.g., arms or flanged heads). This design can also be produced with co-extrusion or injection molding techniques, and can further assist in mechanically locking the film 116 to the backing plate 136.

As discussed above, the outsole 112 with the film 116 is particularly suitable for use in global football/soccer applications. However, the film 116 can also be used in combination with other types of footwear 100, such as for articles of footwear 100 for golf (shown in FIG. 15), for baseball (shown in FIG. 16), and for American football (shown in FIG. 17), each of which can include traction elements 114 as cleats, studs, and the like.

Figure 15:
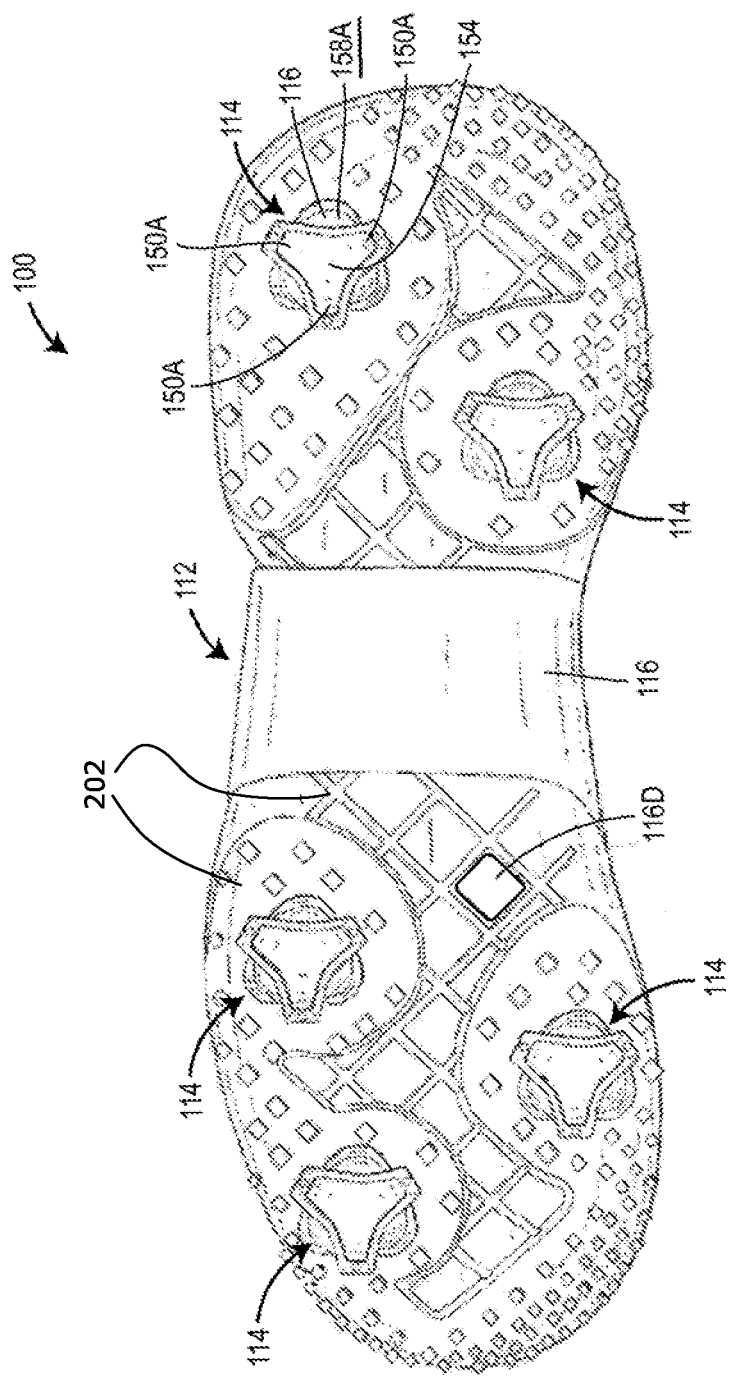
FIG. 15 is a bottom view of an article of footwear in another aspect of the present disclosure, which illustrates an example golf shoe application.

FIG. 15 illustrates an embodiment in which the film 116 is positioned on one or more portions of the outsole 112 and/or cleats 114 in an article of golf footwear 100. In some cases, the film 116 is present on one or more locations of the ground-facing surface of the outsole 112 except the cleats 114 (e.g., a non-cleated surface, such as generally illustrated in FIG. 1 for the global football/soccer footwear 100). Alternatively or additionally, the film 116 can be present as one or more film segments 116D on one or more surfaces between tread patterns 202 on ground-facing surface of the outsole 112.

Alternatively or additionally, the film 116 can be incorporated onto one or more surfaces of the cleats 114. For example, the film 116 can also be on central region of cleat 114 between the shafts/spikes 150A, such as where each cleat 114 is screwed into or otherwise mounted to the outsole 112 backing plate 136, and has a generally flat central base region 158A (i.e., where the film 116 is located) and three shafts/spikes 150A arranged around the perimeter of the central region 158A.

In such embodiments, remaining regions of the outsole 112 can be free of the film 116. For example, the cleats 114 having film 116 can be separate components that can be secured to the outsole 112 (e.g., screwed or snapped in), where the outsole 112 itself can be free of the film 116. In other words, the film-covered cleats 114 can be provided as components for use with standard footwear not otherwise containing the 116 (e.g., golf shoes or otherwise).

Figure 16:
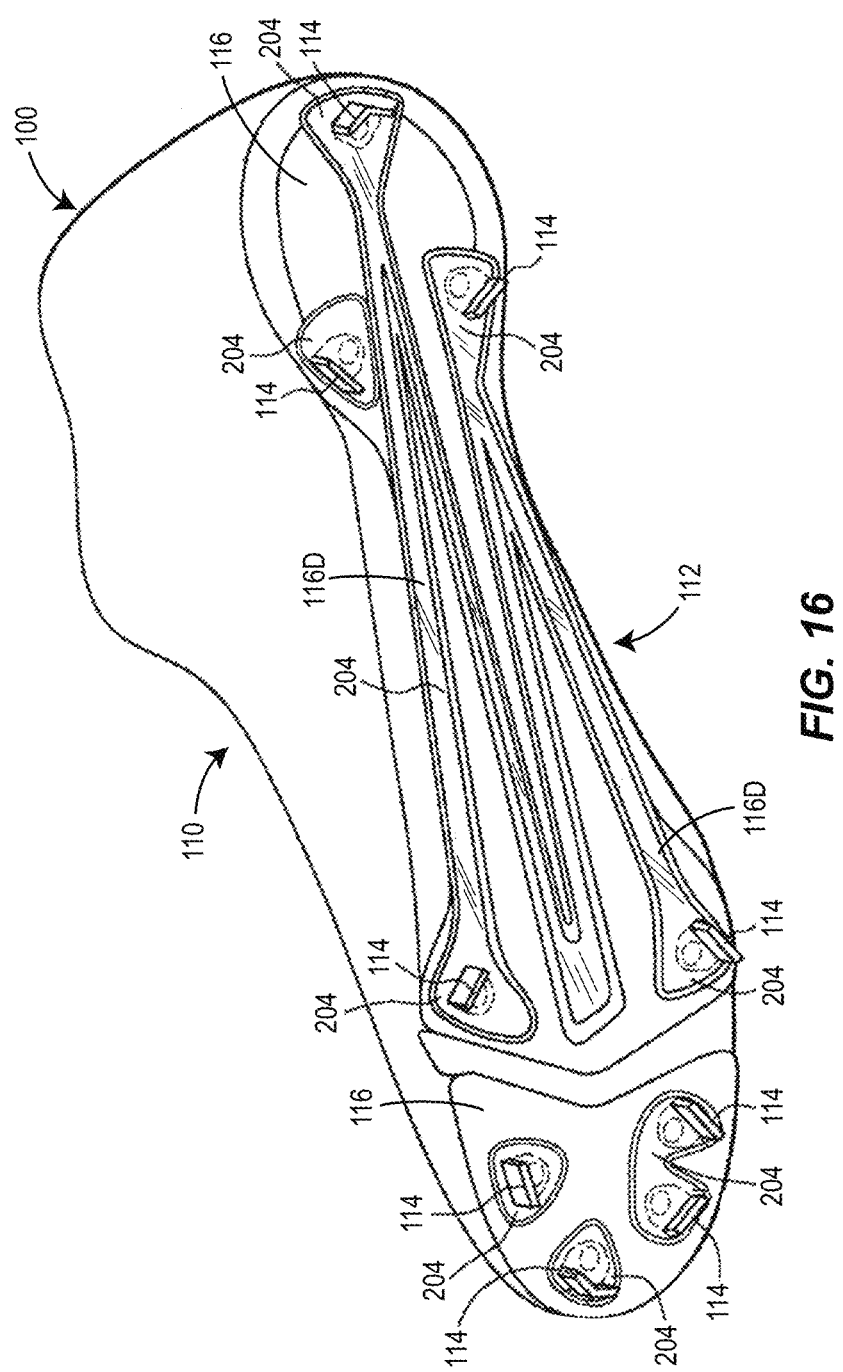
FIG. 16 is a bottom perspective view of an article of footwear in another aspect of the present disclosure, which illustrates an example baseball shoe application.

FIG. 16 illustrates an embodiment in which the film 116 is positioned on one or more portions of the outsole 112 in an article of baseball footwear 100. In some cases, the film 116 is present on one or more locations of the ground-facing surface of the outsole 112 except the cleats 114 (e.g., a non-cleated surface, such as generally illustrated in FIG. 1 for the global football/soccer footwear 100). Alternatively or additionally, the film 116 can be present as one or more film segments 116D on one or more recessed surfaces 204 in the ground-facing surface of the outsole 112, which recessed surfaces 204 can include the cleats 114 therein (e.g., film 116 is located only in one or more of the recessed surfaces 204, but not substantially on the cleats).

Figure 17:
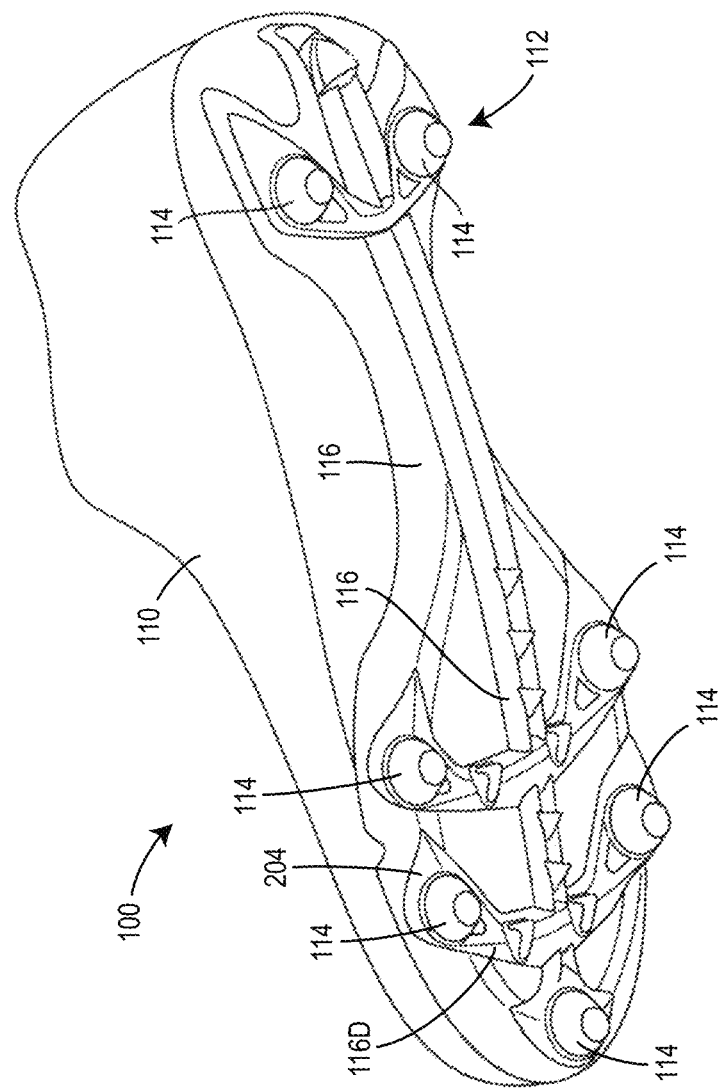
FIG. 17 is a bottom perspective view of an article of footwear in another aspect of the present disclosure, which illustrates an example American football shoe application.

FIG. 17 illustrates an embodiment in which the film 116 is positioned on one or more portions of the outsole 112 in an article of American football footwear 100. In some cases, the film 116 is present on one or more locations of the ground-facing surface of the outsole 112 except the cleats 114 (e.g., a non-cleated surface, such as generally illustrated in FIG. 1 for the global football/soccer footwear 100). Alternatively or additionally, the film 116 can be present as one or more film segments 116D on one or more recessed surfaces 204 in the ground-facing surface of the outsole 112, which recessed surfaces 204 can include the cleats 114 therein (e.g., film 116 is located only in one or more of the recessed surfaces 204, but not substantially on the cleats).

Figure 18:
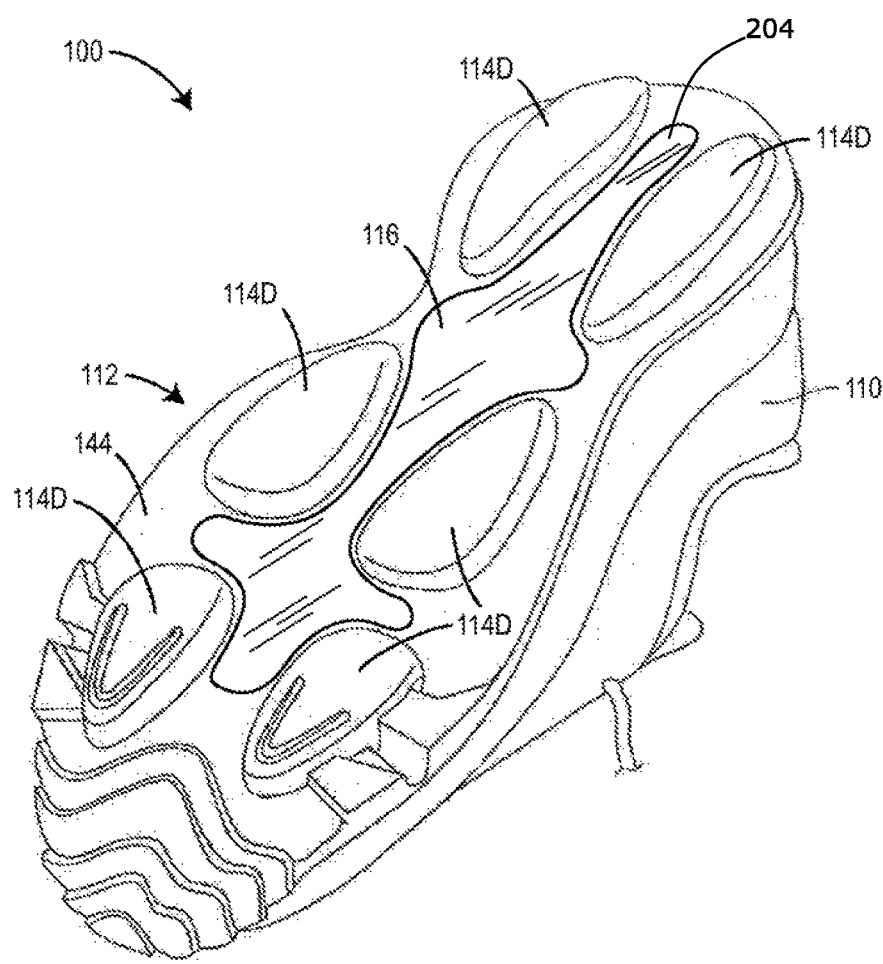
FIG. 18 is a bottom perspective view of an article of footwear in another aspect of the present disclosure, which illustrates an example hiking shoe application.

FIG. 18 illustrates an embodiment in which the film 116 is positioned on one or more portions of the outsole 112 in an article of hiking footwear 100 (e.g., hiking shoes or boots). As illustrated, the traction elements 114 are in the form of lugs 114D which are integrally formed with and protrude from the outsole 112 bottom surface 144. In some cases, the film 116 is present on one or more locations of the bottom surface 144 of the outsole 112 except the lugs 114D. For example, the film 116 can be located on recessed surfaces 204 between adjacent lugs 114D (e.g., but not substantially on the 114D).

The foregoing discussions of footwear 100 and outsole 112 have been made above in the context of footwear having traction elements (e.g., traction elements 114), such as cleats, studs, spikes, lugs, and the like. However, footwear 100 having film 116 can also be designed for any suitable activity, such as running, track and field, rugby, cycling, tennis, and the like. In these embodiments, one or more segments of the film 116 are preferably located in interstitial regions between the traction elements, such as in the interstitial grooves of a running shoe tread pattern.

As discussed above, the outsole films of the present disclosure, such as the film 116 for use with outsole 112 (and footwear 100), can compositionally include a film material that allows the outsole film to take up water. As used herein, the terms "take up", "taking up", "uptake", "uptaking", and the like refer to the drawing of a liquid (e.g., water) from an external source into the film, such as by absorption, adsorption, or both. Furthermore, as briefly mentioned above, the term "water" refers to an aqueous liquid that can be pure water, or can be an aqueous carrier with lesser amounts of dissolved, dispersed or otherwise suspended materials (e.g., particulates, other liquids, and the like).

The ability of the outsole film (e.g., the film 116) to uptake water and to correspondingly swell and increase in compliance can reflect its ability to prevent soil accumulation during use with an article of footwear (e.g., footwear 100). As discussed above, when the outsole film takes up water (e.g., through absorption, adsorption, capillary action, etc. . . . ), the water taken up by the outsole film transitions the outsole film from a dry, relatively more rigid state to a partially or fully saturated state that is relatively more compliant. When the outsole film is then subjected to an application of pressure, either compressive or flexing, the outsole film can reduce in volume, such as to expel at least a portion of its water.

This expelled water is believed to reduce the adhesive/cohesive forces of soil particles at the outsole, which taken alone, or more preferably in combination with the film compliance, can prevent or otherwise reduce soil accumulation at the outsole. Accordingly, the outsole film can undergo dynamic transitions during and between foot strikes, such as while a wearer is running or walking, and these dynamic transitions can result in forces which dislodge accumulated soil or otherwise reduce soil accumulation on the outsole as well.

Based on the multiple interacting mechanisms involved in reducing or preventing soil accumulation on the outsoles of the present disclosure, it has been found that different properties can be good at predicting soil-shedding performance. For instance, the article of footwear of the present disclosure (e.g., the footwear 100), the outsole (e.g., the outsole 114), and the outsole film (e.g., the film 116) can be characterized in terms of the outsole film's water uptake capacity and rate, swell capacity, contact angle when wet, coefficient of friction when wet and dry, reduction in storage modulus from dry to wet, reduction in glass transition temperature from dry to wet, and the like.

The terms "Footwear Sampling Procedure", "Co-Extruded Film Sampling Procedure", "Neat Film Sampling Procedure", "Neat Material Sampling Procedure", "Water Uptake Capacity Test", "Water Uptake Rate Test", "Swelling Capacity Test", "Contact Angle Test", "Coefficient of Friction Test", "Storage Modulus Test", "Glass Transition Temperature Test", "Impact Energy Test", and "Soil Shedding Footwear Test" as used herein refer to the respective sampling procedures and test methodologies described in the Property Analysis And Characterization Procedure section below. These sampling procedures and test methodologies characterize the properties of the recited materials, films, outsoles, footwear, and the like, and are not required to be performed as active steps in the claims.

For example, in some aspects, the outsole film as secured to a footwear outsole has a water uptake capacity at 24 hours greater than 40% by weight, as characterized by the Water Uptake Capacity Test with the Footwear Sampling Procedure, each as described below. It is believed that if a particular outsole film is not capable of taking up greater than 40% by weight in water within a 24-hour period, either due to its water uptake rate being too slow, or its ability to take up water is too low (e.g., due to its thinness, not enough material may be present, or the overall capacity of the material to take up water is too low), then the outsole film will not be effective in preventing or reducing soil accumulation.

In further aspects, the outsole film as secured to a footwear outsole has a water uptake capacity at 24 hours greater than 50% by weight, greater than 100% by weight, greater than 150% by weight, or greater than 200% by weight. In other aspects, the outsole film as secured to a footwear outsole has a water uptake capacity at 24 hours less than 900% by weight, less than 750% by weight, less than 600% by weight, or less than 500% by weight.

In some particular aspects, the outsole film as secured to a footwear outsole has a water uptake capacity at 24 hours ranging from 40% by weight to 900% by weight. For example, the outsole film can have a water uptake capacity ranging from 100% by weight to 900% by weight, from 100% by weight to 750% by weight, from 100% by weight to 700% by weight, from 150% by weight to 600% by weight, from 200% by weight to 500% by weight, or from 300% by weight to 500% by weight.

These water uptake capacities are determined by the Water Uptake Capacity Test with the Footwear Sampling Procedure, and can apply to samples taken at any suitable representative location along the outsole, where the samples may be acquired pursuant to the Footwear Sampling Procedure. In some cases, samples can be taken from one or more of the forefoot region, the midfoot region, and/or the heel region; from each of the forefoot region, the midfoot region, and the heel region; from within one or more of the traction element clusters (between the traction elements) at the forefoot region, the midfoot region, and/or the heel region; from of the traction element clusters; on planar regions of the traction elements (for embodiments in which the outsole film is present on the traction elements), and combinations thereof.

As discussed below, the water uptake capacity of the outsole film can alternatively be measured in a simulated environment with the outsole film co-extruded with a backing substrate. The backing substrate can be produced from any suitable material that is compatible with the outsole film, such as a material used to form an outsole backing plate. As such, suitable water uptake capacities at 24 hours for the outsole film as co-extruded with a backing substrate, as characterized by the Water Uptake Capacity Test with the Co-extruded Film Sampling Procedure, include those discussed above for the Water Uptake Capacity Test with the Footwear Sampling Procedure.

Additionally, it has been found that when the outsole film is secured to another surface, such as being thermally or adhesively bonded to an outsole substrate (e.g., an outsole backing plate), the interfacial bond formed between the outsole film and the outsole substrate can restrict the extent that the outsole film can take up water and/or swell. As such, it is believed that the outsole film as bonded to an outsole substrate or co-extruded backing substrate can potentially have a lower water uptake capacity and/or a lower swell capacity compared to the same outsole film in a neat film form or a neat material form.

As such, the water uptake capacity and the water uptake rate of the outsole film can also be characterized based on the outsole film in neat form (i.e., an isolated film that is not bonded to another material). The outsole film in neat form can have a water uptake capacity at 24 hours greater than 40% by weight, greater than 100% by weight, greater than 300% by weight, or greater than 1000% by weight, as characterized by the Water Uptake Capacity Test with the Neat Film Sampling Procedure. The outsole film in neat form can also have a water uptake capacity at 24 hours less than 900% by weight, less than 800% by weight, less than 700% by weight, less than 600% by weight, or less than 500% by weight.

In some particular aspects, the outsole film in neat form has a water uptake capacity at 24 hours ranging from 40% by weight to 900% by weight, from 150% by weight to 700% by weight, from 200% by weight to 600% by weight, or from 300% by weight to 500% by weight.

The outsole film as secured to a footwear outsole (or other footwear component) may also have a water uptake rate greater than 20 grams/(meter$^2$–minutes$^{1/2}$), as characterized by the Water Uptake Rate Test with the Footwear Sampling Procedure. As discussed above, in some aspects, the outsole film (e.g., the film 116) can take up water between the compressive cycles of foot strikes, which is believed to at least partially replenish the outsole film between the foot strikes.

As such, in further aspects, the outsole film as secured to a footwear outsole has a water uptake rate greater than 20 grams/(meter$^2$–minutes$^{1/2}$), greater than 100 grams/(meter$^2$–minutes$^{1/2}$), greater than 200 grams/(meter$^2$–minutes$^{1/2}$), greater than 400 grams/(meter$^2$–minutes$^{1/2}$), or greater than 600 grams/(meter$^2$–minutes$^{1/2}$). In some particular embodiments, the outsole film as secured to a footwear outsole has a water uptake rate ranging from 1 to 1,500 grams/(meter$^2$–minutes$^{1/2}$), 20 to 1,300 grams/(meter$^2$–minutes$^{1/2}$), from 30 to 1,200 grams/(meter$^2$–minutes$^{1/2}$), from 30 to 800 grams/(meter$^2$–minutes$^{1/2}$), from 100 to 800 grams/(meter$^2$–minutes$^{1/2}$), from 100 to 600 grams/(meter$^2$–minutes$^{1/2}$), from 150 to 450 grams/(meter$^2$–minutes$^{1/2}$), from 200 to 1,000 grams/(meter$^2$–minutes$^{1/2}$), from 400 to 1,000 grams/(meter$^2$–minutes$^{1/2}$), or from 600 to 900 grams/(meter$^2$–minutes$^{1/2}$).

Suitable water uptake rates for the outsole film as secured to a co-extruded backing substrate, as characterized by the Water Uptake Rate Test with the Co-extruded Film Sampling Procedure, and as provided in neat form, as characterized by the Water Uptake Rate Test with the Neat Film Sampling Procedure, each include those discussed above for the Water Uptake Rate Test with the Footwear Sampling Procedure.

In certain aspects, the outsole film as secured to a footwear outsole can also swell, increasing the film's thickness and/or volume, due to water uptake. This swelling of the outsole film can be a convenient indicator showing that the outsole film is taking up water, and can assist in rendering the outsole film compliant. In some aspects, the outsole film as secured to a footwear outsole has an increase in film thickness (or swell thickness increase) at 1 hour of greater than 20% or greater than 50%, for example ranging from 30% to 350%, from 50% to 400%, from 50% to 300%, from 100% to 300%, from 100% to 200%, or from 150% to 250%, as characterized by the Swelling Capacity Test with the Footwear Sampling Procedure. In some further aspects, the outsole film as secured to a footwear outsole has an increase in film thickness at 24 hours ranging from 45% to 400%, from 100% to 350%, or from 150% to 300%.

Additionally, the outsole film as secured to a footwear outsole can have an increase in film volume (or volumetric swell increase) at 1 hour of greater than 50%, for example ranging from 10% to 130%, from 30% to 100%, or from 50% to 90%. Moreover, the outsole film as secured to a footwear outsole can have an increase in film volume at 24 hours ranging from 25% to 200%, from 50% to 150%, or from 75% to 100%.

For co-extruded film simulations, suitable increases in film thickness and volume at 1 hour and 24 hours for the outsole film as secured to a co-extruded backing substrate, as characterized by the Swelling Capacity Test with the Co-extruded Film Sampling Procedure, include those discussed above for the Swelling Capacity Test with the Footwear Sampling Procedure.

The outsole film in neat form can have an increase in film thickness at 1 hour ranging from 35% to 400%, from 50% to 300%, or from 100% to 200%, as characterized by the Swelling Capacity Test with the Neat Film Sampling Procedure. In some further embodiments, the outsole film in neat form can have an increase in film thickness at 24 hours ranging 45% to 500%, from 100% to 400%, or from 150% to 300%. Correspondingly, the outsole film in neat form can have an increase in film volume at 1 hour ranging from 50% to 500%, from 75% to 400%, or from 100% to 300%.

As also discussed above, in some aspects, the surface of the outsole film preferably exhibits hydrophilic properties. The hydrophilic properties of the outsole film surface can be characterized by determining the static sessile drop contact angle of the film's surface. Accordingly, in some examples, the outsole film in a dry state has a static sessile drop contact angle (or dry-state contact angle) of less than 105°, or less than 95°, less than 85°, as characterized by the Contact Angle Test (independent of film sampling process). In some further examples, the outsole film in a dry state has a static sessile drop contact angle ranging from 60° to 100°, from 70° to 100°, or from 65° to 95°.

In other examples, the outsole film in a saturated state has a static sessile drop contact angle (or wet-state contact angle) of less than 90°, less than 80°, less than 70°, or less than 60°. In some further examples, the outsole film in a saturated state has a static sessile drop contact angle ranging from 45° to 75°. In some cases, the dry-state static sessile drop contact angle of the outsole film surface is greater than the wet-state static sessile drop contact angle of the outsole film surface by at least 10°, at least 15°, or at least 20°, for example from 10° to 40°, from 10° to 30°, or from 10° to 20°.

The surface of the outsole film (and of the outsole in general) can also exhibit a low coefficient of friction when the outsole film partially for fully saturated. Examples of suitable coefficients of friction for the outsole film in a dry state (or dry-state coefficient of friction) are less than 1.5, for instance ranging from 0.3 to 1.3, or from 0.3 to 0.7, as characterized by the Coefficient of Friction Test (independent of film sampling process). Examples of suitable coefficients of friction for the outsole film in a saturated state (or wet-state coefficient of friction) are less than 0.8 or less than 0.6, for instance ranging from 0.05 to 0.6, from 0.1 to 0.6, or from 0.3 to 0.5. Furthermore, the outsole film can exhibit a reduction in its coefficient of friction from its dry state to its saturated state, such as a reduction ranging from 15% to 90%, or from 50% to 80%. In some cases, the dry-state coefficient of friction is greater than the wet-state coefficient of friction for the outsole film, for example being higher by a value of at least 0.3 or 0.5, such as 0.3 to 1.2 or 0.5 to 1.

Furthermore, the compliance of the outsole film can be characterized by its storage modulus in the dry state (when equilibrated at 0% relative humidity (RH)), in a partially wetted state (e.g., when equilibrated at 50% RH), and in a wetted state (when equilibrated at 90% RH), and by reductions in its storage modulus between the dry and saturated states. In particular, the outsole film can have a reduction in storage modulus (ΔE') from the dry state relative to the wetted state. A reduction in storage modulus as the water concentration in the outsole film increases corresponds to an increase in compliance, because less stress is required for a given strain/deformation.

In some embodiments, the outsole film exhibits a reduction in the storage modulus from its dry state to its saturated state of more than 20%, more than 40%, more than 60%, more than 75%, more than 90%, or more than 99%, relative to the storage modulus in the dry state, and as characterized by the Storage Modulus Test with the Neat Film Sampling Process or the Neat Material Sampling Process.

In some further embodiments, the dry-state storage modulus of the outsole film is greater than its wet-state (or saturated-state) storage modulus by more than 25 megaPascals (MPa), by more than 50 MPa, by more than 100 MPa, by more than 300 MPa, or by more than 500 MPa, for example ranging from 25 MPa to 800 MPa, from 50 MPa to 800 MPa, from 100 MPa to 800 MPa, from 200 MPa to 800 MPa, from 400 MPa to 800 MPa, from 25 MPa to 200 MPa, from 25 MPa to 100 MPa, or from 50 MPa to 200 MPa. Additionally, the dry-state storage modulus can range from 40 MPa to 800 MPa, from 100 MPa to 600 MPa, or from 200 MPa to 400 MPa, as characterized by the Storage Modulus Test. Additionally, the wet-state storage modulus can range from 0.003 MPa to 100 MPa, from 1 MPa to 60 MPa, or from 20 MPa to 40 MPa.

In addition to a reduction in storage modulus, the outsole film (or a crosslinked polymeric material on an outsole external surface) can also exhibit a reduction in its glass transition temperature from the dry state (when equilibrated at 0% relative humidity (RH)) to the wetted state (when equilibrated at 90% RH). While not wishing to be bound by theory, it is believed that the water taken up by the outsole film plasticizes the outsole film, which reduces its storage modulus and its glass transition temperature, rendering the outsole film more compliant (e.g., compressible, expandable, and stretchable).

In some embodiments, the outsole film can exhibit a reduction in glass transition temperature ($\Delta T_g$) from its dry-state glass transition temperature to its wet-state glass transition temperature of more than a 5° C. difference, more than a 6° C. difference, more than a 10° C. difference, or more than a 15° C. difference, as characterized by the Glass Transition Temperature Test with the Neat Film Sampling Process or the Neat Material Sampling Process. For instance, the reduction in glass transition temperature ($\Delta T_g$) can range from more than a 5° C. difference to a 40° C. difference, from more than a 6° C. difference to a 50° C. difference, form more than a 10° C. difference to a 30° C. difference, from more than a 30° C. difference to a 45° C. difference, or from a 15° C. difference to a 20° C. difference. The outsole film can also exhibit a dry glass transition temperature ranging from −40° C. to −80° C., or from −40° C. to −60° C.

Alternatively (or additionally), the reduction in glass transition temperature ($\Delta T_g$) can range from a 5° C. difference to a 40° C. difference, form a 10° C. difference to a 30° C. difference, or from a 15° C. difference to a 20° C. difference. The outsole film can also exhibit a dry glass transition temperature ranging from −40° C. to −80° C., or from −40° C. to −60° C.

In some further aspects, the outsole film can exhibit a soil shedding ability with a relative impact energy ranging from 0 to 0.9, from 0.2 to 0.7, or from 0.4 to 0.5, as characterized by the Impact Energy Test with the Co-extruded Film Sampling Procedure. Moreover, the outsole film (e.g., the film 116) is preferably durable enough, and has a sufficient bond to the outsole backing plate, for use over extended durations in game play. For instance, it has been found that the outsole film of the present disclosure can, in some aspects, continue to perform without significant visual abrasion or delamination for more than 80 or 100 hours, as discussed above.

In particular embodiments, the film material for the outsole film compositionally includes a hydrogel and, optionally, one or more additives. As used herein, the term "hydrogel" refers to a polymeric material that is capable of taking up at least 10% by weight in water, based on a dry weight of the polymeric material. The hydrogel can include a crosslinked or crosslinkable polymeric network, where crosslinks interconnect multiple polymer chains to form the polymeric network, and where the crosslinks can be physical crosslinks, covalent crosslinks, or can include both physical and covalent crosslinks (within the same polymeric network). The hydrogel constitutes more than 50% by weight of the entire film material for the outsole film, or more than 75% by weight, or more 85% by weight, or more than 95% by weight. In some aspects, the film material of the outsole film consists essentially of the hydrogel.

For a physical crosslink, a copolymer chain can form entangled regions and/or crystalline regions through non-covalent (non-bonding) interactions, such as, for example, an ionic bond, a polar bond, and/or a hydrogen bond. In particular, the crystalline regions create the physical crosslink between the copolymer chains whereas the non-bonding interactions form the crystalline domains (which include hard segments, as described below). These hydrogels can exhibit sol-gel reversibility, allowing them to function as thermoplastic polymers, which can be advantageous for manufacturing and recyclability. As such, in some preferred embodiments, the hydrogel of the film material includes a physically crosslinked polymeric network to function as a thermoplastic hydrogel.

The physically crosslinked hydrogels can be characterized by hard segments and soft segments, which can exist as phase separated regions within the polymeric network while the film material is in a solid (non-molten) state. The hard segments can form portions of the polymer chain backbones, and can exhibit high polarities, allowing the hard segments of multiple polymer chains to aggregate together, or interact with each other, to form semi-crystalline regions of the polymeric network.

A "semi-crystalline" or "crystalline" region has an ordered molecular structure with sharp melt points, which remains solid until a given quantity of heat is absorbed and then rapidly changes into a low viscosity liquid. A "pseudo-crystalline" region has properties of a crystal, but does not exhibit a true crystalline diffraction pattern. For ease of reference, the term "crystalline region" will be used herein to collectively refer to a crystalline region, a semi-crystalline region, and a pseudo-crystalline region of a polymeric network.

In comparison, the soft segments can be longer, more flexible, untwistable, hydrophilic regions of the polymeric network that allow the polymer network to expand and swell under the pressure of taken up water. The soft segments can constitute amorphous hydrophilic regions of the hydrogel or crosslinked polymeric network. The soft segments, or amorphous regions, can also form portions of the backbones of the polymer chains along with the hard segments. Additionally, one or more portions of the soft segments, or amorphous regions, can be grafted or otherwise extend as pendant chains that extend from the backbones at the soft segments. The soft segments, or amorphous regions, can be covalently bonded to the hard segments, or crystalline regions (e.g., through carbamate linkages). For example, a plurality of amorphous hydrophilic regions can be covalently bonded to the crystalline regions of the hard segments.

Thus, in various embodiments, the hydrogel or crosslinked polymeric network includes a plurality of copolymer chains wherein at least a portion of the copolymer chains each comprise a hard segment physically crosslinked to other hard segments of the copolymer chains and a soft segment covalently bonded to the hard segment, such as through a carbamate group or an ester group. In some cases, the hydrogel, or crosslinked polymeric network, includes a plurality of copolymer chains wherein at least a portion of the copolymer chains each comprise a first chain segment physically crosslinked to at least one other copolymer chain of the plurality of copolymer chains and a hydrophilic segment (e.g., a polyether chain segment) covalently bonded to the first chain segment, such as through a carbamate group or an ester group.

In various embodiments, the hydrogel or crosslinked polymeric network includes a plurality of copolymer chains, wherein at least a portion of the copolymer chains each include a first segment forming at least a crystalline region with other hard segments of the copolymer chains; and a second segment, such as a soft segment (e.g., a segment having polyether chains or one or more ether groups) covalently bonded to the first segment, where the soft segment forms amorphous regions of the hydrogel or crosslinked polymeric network. In some cases, the hydrogel or crosslinked polymeric network includes a plurality of copolymer chains, where at least a portion of the copolymer chains have hydrophilic segments.

The soft segments, or amorphous regions, of the copolymer chains can constitute a substantial portion of the polymeric network, allowing their hydrophilic segments or groups to attract water molecules. In some embodiments, the soft segments, or amorphous regions, are present in the copolymer chains in a ratio (relative to the hard segments, or crystalline regions) that is at least or greater than 20:1 by weight, that ranges from 20:1 to 110:1 by weight, or from 40:1 to 110:1 by weight, or from 40:1 to 80:1 by weight, or from 60:1 to 80:1.

For a covalent crosslink, one polymer chain is linked to one or more additional polymer chains with one or more covalent bonds, typically with a linking segment or chain. Covalently crosslinked hydrogels (e.g., thermoset and photocured hydrogels) can be prepared by covalently linking the polymer chains together using one or more multi-functional compounds, such as, for example, a molecule having at least two ethylenically-unsaturated groups, at least two oxirane groups (e.g., diepoxides), or combinations thereof (e.g., glycidyl methacrylate); and can also include any suitable intermediate chain segment, such as $C_{1-30}$, $C_{2-20}$, or $C_{2-10}$ hydrocarbon, polyether, or polyester chain segments.

The multi-functional compounds can include at least three functional groups selected from the group consisting of isocyanidyl, hydroxyl, amino, sulfhydryl, carboxyl or derivatives thereof, and combinations thereof. In some embodiments, such as when the polymer network includes polyurethane, the multi-functional compound can be a polyol having three or more hydroxyl groups (e.g., glycerol, trimethylolpropane, 1,2,6-hexanetriol, 1,2,4-butanetriol, trimethylolethane) or a polyisocyanate having three or more isocyanate groups. In some cases, such as when the polymer network includes polyamide, the multi-functional compound can include, for example, carboxylic acids or activated forms thereof having three or more carboxyl groups (or activated forms thereof, polyamines having three or more amino groups, and polyols having three or more hydroxyl groups (e.g., glycerol, trimethylolpropane, 1,2,6-hexanetriol, 1,2,4-butanetriol, and trimethylolethane). In various cases, such as when the polymer network includes polyolefin, the multi-functional compound can be a compound having two ethylenically-unsaturated groups.

It has been found that the crosslinking density of the crosslinked hydrogel can impact the structural integrity and water uptake capacities of the outsole film (e.g., the film 116). If the crosslinking density is too high, the resulting outsole film can be stiff and less compliant, which can reduce its water uptake and swelling capacity. On the other hand, if the crosslinking density is too low, then the resulting outsole film can lose its structural integrity when saturated. As such, the hydrogel(s) of the film material preferably have a balanced crosslinking density such that the outsole film retains its structural integrity, yet is also sufficiently compliant when partially or fully saturated with water.

The crosslinked polymer network of the hydrogel for the outsole film (e.g., the film 116) can include any suitable polymer chains that provide the desired functional properties (e.g., water uptake, swelling, and more generally, preventing soil accumulation), and also desirably provide good durability for the outsole. For example, the hydrogel can be based on one or more polyurethanes, one or more polyamides, one or more polyolefins, and combinations thereof (e.g., a hydrogel based on polyurethane(s) and polyamide(s)). In these embodiments, the hydrogel or crosslinked polymeric network can include a plurality of copolymer chains wherein at least a portion of the copolymer chains each include a polyurethane segment, a polyamide segment, or a combination thereof. In some embodiments, the one or more polyurethanes, one or more polyamides, one or more polyolefins, and combinations thereof include polysiloxane segments and/or ionomer segments.

In some embodiments, the hydrogel includes a crosslinked polymeric network with one or more polyurethane copolymer chains (i.e., a plurality of polyurethane chains) that are physically and/or covalently crosslinked (referred to as a "polyurethane hydrogel"). The polyurethane hydrogel can be produced by polymerizing one or more isocyanates with one or more polyols to produce copolymer chains having carbamate linkages (—N(CO)O—) as illustrated below in Formula 1, where the isocyanate(s) each preferably include two or more isocyanate (—NCO) groups per molecule, such as 2, 3, or 4 isocyanate groups per molecule (although, single-functional isocyanates can also be optionally included, e.g., as chain terminating units).

(Formula 1)

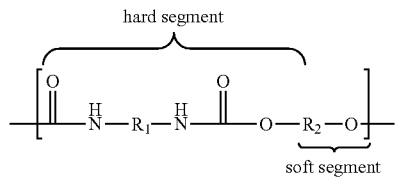

In these embodiments, each $R_1$ independently is an aliphatic or aromatic segment, and each $R_2$ is a hydrophilic segment.

Unless otherwise indicated, any of the functional groups or chemical compounds described herein can be substituted or unsubstituted. A "substituted" group or chemical compound, such as an alkyl, alkenyl, alkynyl, cycloalkyl, cycloalkenyl, aryl, heteroaryl, alkoxyl, ester, ether, or carboxylic ester refers to an alkyl, alkenyl, alkynyl, cycloalkyl, cycloalkenyl, aryl, heteroaryl, alkoxyl, ester, ether, or carboxylic ester group, has at least one hydrogen radical that is substituted with a non-hydrogen radical (i.e., a substituent). Examples of non-hydrogen radicals (or substituents) include, but are not limited to, alkyl, cycloalkyl, alkenyl, cycloalkenyl, alkynyl, ether, aryl, heteroaryl, heterocycloalkyl, hydroxyl, oxy (or oxo), alkoxyl, ester, thioester, acyl, carboxyl, cyano, nitro, amino, amido, sulfur, and halo. When a substituted alkyl group includes more than one non-hydrogen radical, the substituents can be bound to the same carbon or two or more different carbon atoms.

Additionally, the isocyanates can also be chain extended with one or more chain extenders to bridge two or more isocyanates. This can produce polyurethane copolymer chains as illustrated below in Formula 2, wherein $R_3$ includes the chain extender.

(Formula 2)

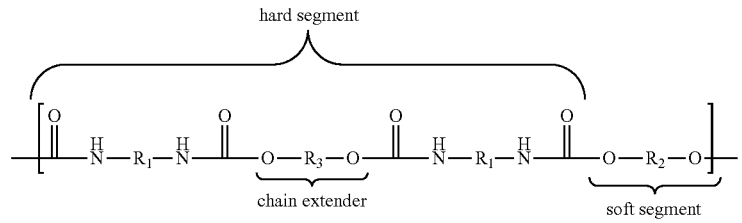

Each segment $R_1$, or the first segment, in Formulas 1 and 2 can independently include a linear or branched $C_{3-30}$ segment, based on the particular isocyanate(s) used, and can be aliphatic, aromatic, or include a combination of aliphatic portions(s) and aromatic portion(s). The term "aliphatic" refers to a saturated or unsaturated organic molecule that does not include a cyclically conjugated ring system having delocalized pi electrons. In comparison, the term "aromatic" refers to a cyclically conjugated ring system having delocalized pi electrons, which exhibits greater stability than a hypothetical ring system having localized pi electrons.

In aliphatic embodiments (from aliphatic isocyanate(s)), each segment $R_1$ can include a linear aliphatic group, a branched aliphatic group, a cycloaliphatic group, or combinations thereof. For instance, each segment $R_1$ can include a linear or branched $C_{3-20}$ alkylene segment (e.g., $C_{4-15}$ alkylene or $C_{6-10}$ alkylene), one or more $C_{3-8}$ cycloalkylene segments (e.g., cyclopropyl, cyclobutyl, cyclopentyl, cyclohexyl, cycloheptyl, or cyclooctyl), and combinations thereof.

Examples of suitable aliphatic diisocyanates for producing the polyurethane copolymer chains include hexamethylene diisocyanate (HDI), isophorone diisocyanate (IPDI), butylene diisocyanate (BDI), bisisocyanatocyclohexylmethane (HMDI), 2,2,4-trimethylhexamethylene diisocyanate (TMDI), bisisocyanatomethylcyclohexane, bisisocyanatomethyltricyclodecane, norbornane diisocyanate (NDI), cyclohexane diisocyanate (CHDI), 4,4'-dicyclohexylmethane diisocyanate (H12MDI), diisocyanatododecane, lysine diisocyanate, and combinations thereof.

In aromatic embodiments (from aromatic isocyanate(s)), each segment $R_1$ can include one or more aromatic groups, such as phenyl, naphthyl, tetrahydronaphthyl, phenanthrenyl, biphenylenyl, indanyl, indenyl, anthracenyl, and fluorenyl. Unless otherwise indicated, an aromatic group can be an unsubstituted aromatic group or a substituted aromatic group, and can also include heteroaromatic groups. "Heteroaromatic" refers to monocyclic or polycyclic (e.g., fused bicyclic and fused tricyclic) aromatic ring systems, where one to four ring atoms are selected from oxygen, nitrogen, or sulfur, and the remaining ring atoms are carbon, and where the ring system is joined to the remainder of the molecule by any of the ring atoms. Examples of suitable heteroaryl groups include pyridyl, pyrazinyl, pyrimidinyl, pyrrolyl, pyrazolyl, imidazolyl, thiazolyl, tetrazolyl, oxazolyl, isooxazolyl, thiadiazolyl, oxadiazolyl, furanyl, quinolinyl, isoquinolinyl, benzoxazolyl, benzimidazolyl, and benzothiazolyl.

Examples of suitable aromatic diisocyanates for producing the polyurethane copolymer chains include toluene diisocyanate (TDI), TDI adducts with trimethyloylpropane (TMP), methylene diphenyl diisocyanate (MDI), xylene diisocyanate (XDI), tetramethylxylylene diisocyanate (TMXDI), hydrogenated xylene diisocyanate (HXDI), naphthalene 1,5-diisocyanate (NDI), 1,5-tetrahydronaphthalene diisocyanate, para-phenylene diisocyanate (PPDI), 3,3'-dimethyldiphenyl-4,4'-diisocyanate (DDDI), 4,4'-dibenzyl diisocyanate (DBDI), 4-chloro-1,3-phenylene diisocyanate, and combinations thereof. In some embodiments, the copolymer chains are substantially free of aromatic groups.

In some preferred embodiments, the polyurethane copolymer chains are produced from diisocynates including HMDI, TDI, MDI, $H_{12}$ aliphatics, and combinations thereof.

Examples of suitable triisocyanates for producing the polyurethane copolymer chains include TDI, HDI, and IPDI adducts with trimethyloylpropane (TMP), uretdiones (i.e., dimerized isocyanates), polymeric MDI, and combinations thereof.

Segment $R_3$ in Formula 2 can include a linear or branched $C_2$-$C_{10}$ segment, based on the particular chain extender polyol used, and can be, for example, aliphatic, aromatic, or polyether. Examples of suitable chain extender polyols for producing the polyurethane copolymer chains include ethylene glycol, lower oligomers of ethylene glycol (e.g., diethylene glycol, triethylene glycol, and tetraethylene glycol), 1,2-propylene glycol, 1,3-propylene glycol, lower oligomers of propylene glycol (e.g., dipropylene glycol, tripropylene glycol, and tetrapropylene glycol), 1,4-butylene glycol, 2,3-butylene glycol, 1,6-hexanediol, 1,8-octanediol, neopentyl glycol, 1,4-cyclohexanedimethanol, 2-ethyl-1,6-hexanediol, 1-methyl-1,3-propanediol, 2-methyl-1,3-propanediol, dihydroxyalkylated aromatic compounds (e.g., bis (2-hydroxyethyl) ethers of hydroquinone and resorcinol, xylene-α,α-diols, bis(2-hydroxyethyl) ethers of xylene-α,α-diols, and combinations thereof.

Segment $R_2$ in Formula 1 and 2 can include polyether, polyester, polycarbonate, an aliphatic group, or an aromatic group, wherein the aliphatic group or aromatic group is substituted with one or more pendant hydrophilic groups selected from the group consisting of hydroxyl, polyether, polyester, polylactone (e.g., polyvinylpyrrolidone (PVP)), amino, carboxylate, sulfonate, phosphate, ammonium (e.g., tertiary and quaternary ammonium), zwitterion (e.g., a betaine, such as poly(carboxybetaine (pCB) and ammonium phosphonates such as phosphatidylcholine), and combinations thereof. Therefore, the hydrophilic segment of $R_2$ can form portions of the hydrogel backbone, or be grafted to the hydrogel backbone as a pendant group. In some embodiments, the pendant hydrophilic group or segment is bonded to the aliphatic group or aromatic group through a linker. Each segment $R_2$ can be present in an amount of 5% to 85% by weight, from 5% to 70% by weight, or from 10% to 50% by weight, based on the total weight of the reactant monomers.

In some embodiments, at least one $R_2$ segment includes a polyether segment (i.e., a segment having one or more ether groups). Suitable polyethers include, but are not limited to polyethylene oxide (PEO), polypropylene oxide (PPO), polytetrahydrofuran (PTHF), polytetramethylene oxide (PTMO), and combinations thereof. The term "alkyl" as used herein refers to straight chained and branched saturated hydrocarbon groups containing one to thirty carbon atoms, for example, one to twenty carbon atoms, or one to ten carbon atoms. The term $C_n$ means the alkyl group has "n" carbon atoms. For example, $C_4$ alkyl refers to an alkyl group that has 4 carbon atoms. $C_{1-7}$ alkyl refers to an alkyl group having a number of carbon atoms encompassing the entire range (i.e., 1 to 7 carbon atoms), as well as all subgroups (e.g., 1-6, 2-7, 1-5, 3-6, 1, 2, 3, 4, 5, 6, and 7 carbon atoms). Nonlimiting examples of alkyl groups include, methyl, ethyl, n-propyl, isopropyl, n-butyl, sec-butyl(2-methylpropyl), t-butyl(1,1-dimethylethyl), 3,3-dimethylpentyl, and 2-ethylhexyl. Unless otherwise indicated, an alkyl group can be an unsubstituted alkyl group or a substituted alkyl group.

In some cases, at least one $R_2$ segment includes a polyester segment. The polyester can be derived from the polyesterification of one or more dihydric alcohols (e.g., ethylene glycol, 1,3-propylene glycol, 1,2-propylene glycol, 1,4-butanediol, 1,3-butanediol, 2-methylpentanediol-1,5, diethylene glycol, 1,5-pentanediol, 1,5-hexanediol, 1,2-dodecanediol, cyclohexanedimethanol, and combinations thereof) with one or more dicarboxylic acids (e.g., adipic acid, succinic acid, sebacic acid, suberic acid, methyladipic acid, glutaric acid, pimelic acid, azelaic acid, thiodipropionic acid and citraconic acid and combinations thereof). The polyester also can be derived from polycarbonate prepolymers, such as poly(hexamethylene carbonate) glycol, poly (propylene carbonate) glycol, poly(tetramethylene carbonate)glycol, and poly(nonanemethylene carbonate) glycol. Suitable polyesters can include, for example, polyethylene adipate (PEA), poly(1,4-butylene adipate), poly(tetramethylene adipate), poly(hexamethylene adipate), polycaprolactone, polyhexamethylene carbonate, poly(propylene carbonate), poly(tetramethylene carbonate), poly (nonanemethylene carbonate), and combinations thereof.

In various cases, at least one $R_2$ segment includes a polycarbonate segment. The polycarbonate can be derived from the reaction of one or more dihydric alcohols (e.g., ethylene glycol, 1,3-propylene glycol, 1,2-propylene glycol, 1,4-butanediol, 1,3-butanediol, 2-methylpentanediol-1,5, diethylene glycol, 1,5-pentanediol, 1,5-hexanediol, 1,2-dodecanediol, cyclohexanedimethanol, and combinations thereof) with ethylene carbonate.

In various embodiments, at least one $R_2$ segment includes an aliphatic group substituted with one or more hydrophilic groups selected from the group consisting of hydroxyl, polyether, polyester, polylactone (e.g., polyvinylpyrrolidone), amino, carboxylate, sulfonate, phosphate, ammonium (e.g., tertiary and quaternary ammonium), zwitterion (e.g., a betaine, such as poly(carboxybetaine (pCB) and ammonium phosphonates such as phosphatidylcholine), and combinations thereof. In some embodiments, the aliphatic group is linear and can include, for example, a $C_{1-20}$ alkylene chain or a $C_{1-20}$ alkenylene chain (e.g., methylene, ethylene, propylene, butylene, pentylene, hexylene, heptylene, octylene, nonylene, decylene, undecylene, dodecylene, tridecylene, ethenylene, propenylene, butenylene, pentenylene, hexenylene, heptenylene, octenylene, nonenylene, decenylene, undecenylene, dodecenylene, tridecenylene). The term "alkylene" refers to a bivalent hydrocarbon. The term $C_n$ means the alkylene group has "n" carbon atoms. For example, $C_{1-6}$alkylene refers to an alkylene group having, e.g., 1, 2, 3, 4, 5, or 6 carbon atoms. The term "alkenylene" refers to a bivalent hydrocarbon having at least one double bond.

In some cases, at least one $R_2$ segment includes an aromatic group substituted with one or more hydrophilic groups selected from the group consisting of hydroxyl, polyether, polyester, polylactone (e.g., polyvinylpyrrolidone), amino, carboxylate, sulfonate, phosphate, ammonium (e.g., tertiary and quaternary ammonium), zwitterion (e.g., a betaine, such as poly(carboxybetaine (pCB) and ammonium phosphonates such as phosphatidylcholine), and combinations thereof. Suitable aromatic groups include, but are not limited to, phenyl, naphthyl, tetrahydronaphthyl, phenanthrenyl, biphenylenyl, indanyl, indenyl, anthracenyl, fluorenylpyridyl, pyrazinyl, pyrimidinyl, pyrrolyl, pyrazolyl, imidazolyl, thiazolyl, tetrazolyl, oxazolyl, isooxazolyl, thiadiazolyl, oxadiazolyl, furanyl, quinolinyl, isoquinolinyl, benzoxazolyl, benzimidazolyl, and benzothiazolyl.

The aliphatic and aromatic groups are substituted with an appropriate number of pendant hydrophilic and/or charged groups so as to provide the resulting hydrogel with the properties described herein. In some embodiments, the pendant hydrophilic group is one or more (e.g., 2, 3, 4, 5, 6, 7, 8, 9, 10 or more) hydroxyl groups. In various embodiments, the pendant hydrophilic group is one or more (e.g., 2, 3, 4, 5, 6, 7, 8, 9, 10 or more) amino groups. In some cases, the pendant hydrophilic group is one or more (e.g., 2, 3, 4, 5, 6, 7, 8, 9, 10 or more) carboxylate groups. For example, the aliphatic group can include polyacrylic acid. In some cases, the pendant hydrophilic group is one or more (e.g., 2, 3, 4, 5, 6, 7, 8, 9, 10 or more) sulfonate groups. In some cases, the pendant hydrophilic group is one or more (e.g., 2, 3, 4, 5, 6, 7, 8, 9, 10 or more) phosphate groups. In some embodiments, the pendant hydrophilic group is one or more ammonium groups (e.g., tertiary and/or quaternary ammonium). In other embodiments, the pendant hydrophilic group is one or more zwitterions (e.g., a betaine, such as poly(carboxybetaine (pCB) and ammonium phosphonates such as phosphatidylcholine).

In some embodiments, the $R_2$ segment includes charged groups that are capable of binding to a counterion to ionically crosslink the polymer the polymer network and form ionomers. In these embodiments, for example, $R_2$ is an aliphatic or aromatic group having pendant amino, carboxylate, sulfonate, phosphate, ammonium, zwitterionic groups, or combinations thereof.

In various cases, the pendant hydrophilic group is at least one polyether, such as two polyethers. In other cases, the pendant hydrophilic group is at least one polyester. In various cases, the pendant hydrophilic group is polylactone (e.g., polyvinylpyrrolidone). Each carbon atom of the pendant hydrophilic group can optionally be substituted with, e.g., $C_{1-6}$ alkyl. In some of these embodiments, the aliphatic and aromatic groups can be graft polymers, wherein the pendant groups are homopolymers (e.g., polyethers, polyesters, polyvinylpyrrolidone).

In some preferred embodiments, the pendant hydrophilic group is a polyether (e.g., polyethylene oxide and polyethylene glycol), polyvinylpyrrolidone, polyacrylic acid, or combinations thereof.

The pendant hydrophilic group can be bonded to the aliphatic group or aromatic group through a linker. The linker can be any bifunctional small molecule (e.g., $C_{1-20}$) capable of linking the pendant hydrophilic group to the aliphatic or aromatic group. For example, the linker can include a diisocyanate, as previously described herein, which when linked to the pendant hydrophilic group and to the aliphatic or aromatic group forms a carbamate bond. In some embodiments, the linker can be 4,4'-diphenylmethane diisocyanate (MDI), as shown below.

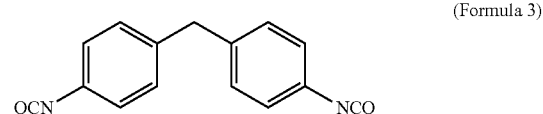

(Formula 3)

In some exemplary embodiments, the pendant hydrophilic group is polyethylene oxide and the linking group is MDI, as shown below.

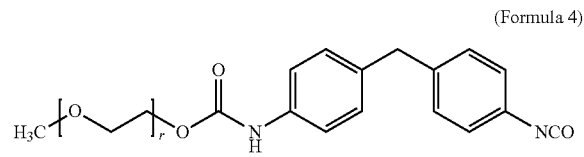

(Formula 4)

In some cases, the pendant hydrophilic group is functionalized to enable it to bond to the aliphatic or aromatic group, optionally through the linker. In various embodiments, for example, when the pendant hydrophilic group includes an alkene group, which can undergo a Michael addition with a sulfhydryl-containing bifunctional molecule (i.e., a molecule having a second reactive group, such as a hydroxyl group or amino group), to result in a hydrophilic group that can react with the polymer backbone, optionally through the linker, using the second reactive group. For example, when the pendant hydrophilic group is polyvinylpyrrolidone, it can react with the sulfhydryl group on mercaptoethanol to result in hydroxyl-functionalized polyvinylpyrrolidone, as shown below.

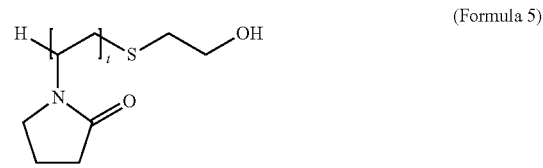

(Formula 5)

In some of the embodiments disclosed herein, at least one $R_2$ segment is polytetramethylene oxide. In other exemplary embodiments, at least one $R_2$ segment can be an aliphatic polyol functionalized with polyethylene oxide or polyvinylpyrrolidone, such as the polyols described in E.P. Patent No. 2 462 908. For example, the $R_2$ segment can be derived from the reaction product of a polyol (e.g., pentaerythritol or 2,2,3-trihydroxypropanol) and either MDI-derivatized methoxypolyethylene glycol (to obtain compounds as shown in Formulas 6 or 7) or with MDI-derivatized polyvinylpyrrolidone (to obtain compounds as shown in Formulas 8 or 9) that had been previously been reacted with mercaptoethanol, as shown below,

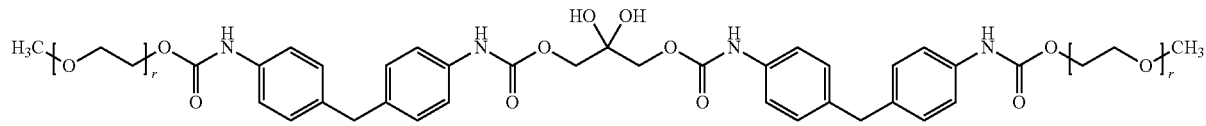
(Formula 6)

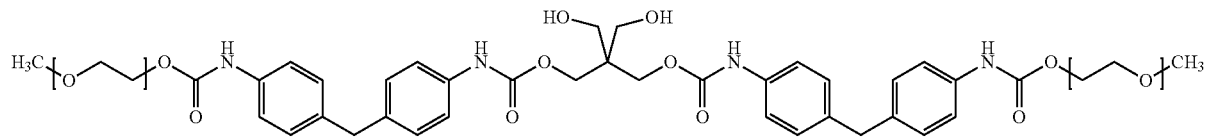
(Formula 7)

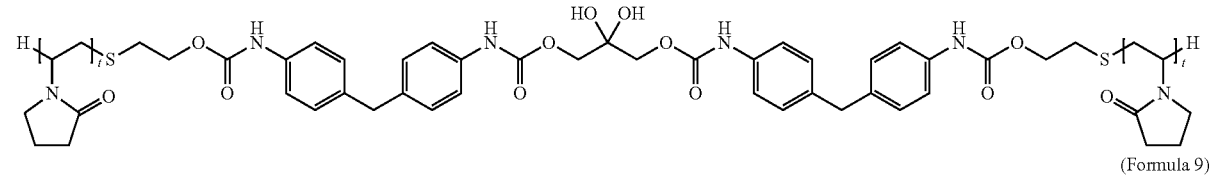
(Formula 8)

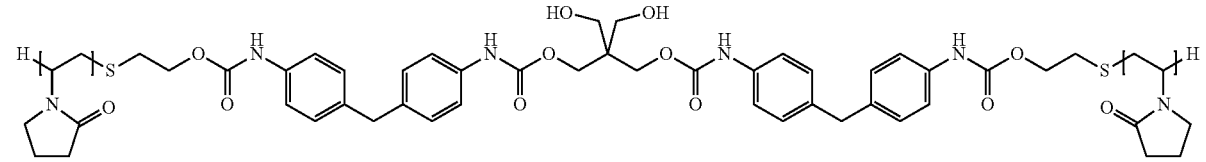
(Formula 9)

In various cases, at least one $R_2$ is a polysiloxane, In these cases, $R_2$ can be derived from a silicone monomer of Formula 10, such as a silicone monomer disclosed in U.S. Pat. No. 5,969,076, which is hereby incorporated by reference:

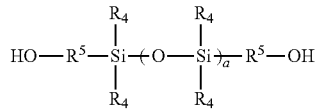
(Formula 10)

wherein:

a is 1 to 10 or larger (e.g., 1, 2, 3, 4, 5, 6, 7, 8, 9, or 10);

each $R^4$ independently is hydrogen, $C_{1-18}$ alkyl, $C_{2-18}$ alkenyl, aryl, or polyether; and each $R^5$ independently is $C_{1-10}$alkylene, polyether, or polyurethane.

In some embodiments, each $R^4$ independently is H, $C_{1-10}$ alkyl, $C_{2-10}$alkenyl, $C_{1-6}$aryl, polyethylene, polypropylene, or polybutylene. For example, each $R^4$ can independently be selected from the group consisting of methyl, ethyl, n-propyl, isopropyl, n-butyl, isobutyl, s-butyl, t-butyl, ethenyl, propenyl, phenyl, and polyethylene.

In various embodiments, each $R^5$ independently is $C_{1-10}$alkylene (e.g., methylene, ethylene, propylene, butylene, pentylene, hexylene, heptylene, octylene, nonylene, or decylene). In other cases, each $R^5$ is polyether (e.g., polyethylene, polypropylene, or polybutylene). In various cases, each $R^5$ is polyurethane.

In some embodiments, the hydrogel includes a crosslinked polymeric network that includes copolymer chains that are derivatives of polyurethane. This crosslinked polymeric network can be produced by polymerizing one or more isocyanates with one or more polyamino compounds, polysulfhydryl compounds, or combinations thereof, as shown in Formulas 11 and 12, below:

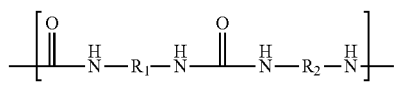
(Formula 11)

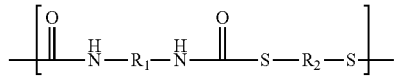
(Formula 12)

wherein the variables are as described above. Additionally, the isocyanates can also be chain extended with one or more polyamino or polythiol chain extenders to bridge two or more isocyanates, such as previously described for the polyurethanes of Formula 2.

In some embodiments, the polyurethane hydrogel is composed of MDI, PTMO, and 1,4-butylene glycol, as described in U.S. Pat. No. 4,523,005, which is hereby incorporated by reference in its entirety.

In some embodiments, the polyurethane hydrogel is physically crosslinked through e.g., nonpolar or polar interactions between the urethane or carbamate groups on the polymers (the hard segments), and is a thermoplastic polyurethane (TPU), or specifically, a hydrophilic thermoplastic polyurethane. In these embodiments, component $R_1$ in Formula 1, and components $R_1$ and $R_3$ in Formula 2, forms the portion of the polymer often referred to as the "hard segment", and component $R_2$ forms the portion of the polymer often referred to as the "soft segment". In these embodiments, the soft segment can be covalently bonded to the hard segment.

Commercially available thermoplastic polyurethane hydrogels suitable for the present use include, but are not limited to those under the tradename "TECOPHILIC", such as TG-500, TG-2000, SP-80A-150, SP-93A-100, SP-60D-60 (Lubrizol, Countryside, Ill.), "ESTANE" (e.g., ALR G 500; Lubrizol, Countryside, Ill.).

In various embodiments, the polyurethane hydrogel is covalently crosslinked, as previously described herein.

In some embodiments, the polyamide segment of the polyamide hydrogel comprises or consists essentially of a polyamide. The polyamide hydrogel can be formed from the polycondensation of a polyamide prepolymer with a hydrophilic prepolymer to form a block copolyamide.

In some embodiments, the polyamide segment of the polyamide hydrogel can be derived from the condensation of polyamide prepolymers, such as lactams, amino acids, and/or diamino compounds with dicarboxylic acids, or activated forms thereof. The resulting polyamide segments include amide linkages (—(CO)NH—). The term "amino acid" refers to a molecule having at least one amino group and at least one carboxyl group. Each polyamide segment of the polyamide hydrogel can be the same or different.

In some embodiments, the polyamide segment is derived from the polycondensation of lactams and/or amino acids, and includes an amide segment having a structure shown in Formula 13, below, wherein $R_6$ is the segment of the block copolymer derived from the lactam or amino acid, and $R_2$ is the segment derived from a hydrophilic prepolymer:

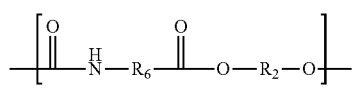

(Formula 13)

In some embodiments, $R_6$ is derived from a lactam. In some cases, $R_6$ is derived from a $C_{3-20}$ lactam, or a $C_{4-15}$ lactam, or a $C_{6-12}$ lactam. For example, $R_6$ can be derived from caprolactam or laurolactam. In some cases, $R_6'$ is derived from one or more amino acids. In various cases, $R_6$ is derived from a $C_{4-25}$ amino acid, or a $C_{5-20}$ amino acid, or a $C_{8-15}$ amino acid. For example, $R_6'$ can be derived from 12-aminolauric acid or 11-aminoundecanoic acid.

In some cases, Formula 13 includes a polyamide-polyether block copolymer segment, as shown below:

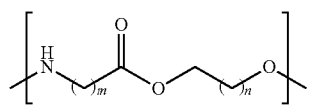

(Formula 14)

wherein m is 3-20, and n is 1-8. In some exemplary embodiments, m is 4-15, or 6-12 (e.g., 6, 7, 8, 9, 10, 11, or 12), and n is 1 2, or 3. For example, m can be 11 or 12, and n can be 1 or 3.

In various embodiments, the polyamide segment of the polyamide hydrogel is derived from the condensation of diamino compounds with dicarboxylic acids, or activated forms thereof, and includes an amide segment having a structure shown in Formula 15, below, wherein $R_7$ is the segment of the block copolymer derived from the diamino compound, $R_8$ is the segment derived from the dicarboxylic acid compound, and $R_2$ is the segment derived from a hydrophilic prepolymer:

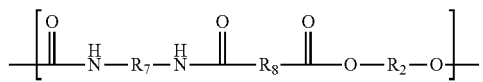

(Formula 15)

In some embodiments, $R_7$ is derived from a diamino compound that includes an aliphatic group having $C_{4-15}$ carbon atoms, or $C_{5-10}$ carbon atoms, or $C_{6-9}$ carbon atoms. In some embodiments, the diamino compound includes an aromatic group, such as phenyl, naphthyl, xylyl, and tolyl. Suitable diamino compounds include, but are not limited to, hexamethylene diamine (HMD), tetramethylene diamine, trimethyl hexamethylene diamine (TMD), m-xylylene diamine (MXD), and 1,5-pentamine diamine. In various embodiments, $R_8$ is derived from a dicarboxylic acid or activated form thereof, includes an aliphatic group having $C_{4-15}$ carbon atoms, or $C_{5-12}$ carbon atoms, or $C_{6-10}$ carbon atoms. In some cases, the dicarboxylic acid or activated form thereof includes an aromatic group, such as phenyl, naphthyl, xylyl, and tolyl. Suitable carboxylic acids or activated forms thereof include, but are not limited to adipic acid, sebacic acid, terephthalic acid, and isophthalic acid. In some embodiments, the copolymer chains are substantially free of aromatic groups.

In some preferred embodiments, each polyamide segment is independently derived from a polyamide prepolymer selected from the group consisting of 12-aminolauric acid, caprolactam, hexamethylene diamine and adipic acid.

Additionally, the polyamide hydrogels can also be chain extended with one or more polyamino, polycarboxyl (or derivatives thereof), or amino acid chain extenders, as previously described herein. In some embodiments, the chain extender can include a diol, dithiol, amino alcohol, aminoalkyl mercaptan, hydroxyalkyl mercaptan, a phosphite or a bisacyllactam compound (e.g., triphenylphosphite, N,N'-terephthaloyl bis-laurolactam, and diphenyl isophthalate).

Each component $R_2$ of Formula 13 and 15 independently is polyether, polyester, polycarbonate, an aliphatic group, or an aromatic group, wherein the aliphatic group or aromatic group is substituted with one or more pendant hydrophilic groups, as previously described herein, wherein the pendant group can optionally be bonded to the aliphatic or aromatic group through a linker, as previously described herein.

In some preferred embodiments, $R_2$ is derived from a compound selected from the group consisting of polyethylene oxide (PEO), polypropylene oxide (PPO), polytetrahydrofuran (PTHF), polytetramethylene oxide (PTMO), a polyethylene oxide-functionalized aliphatic or aromatic group, a polyvinylpyrrolidone-functionalized aliphatic of aromatic group, and combinations thereof. In various cases, $R_2$ is derived from a compound selected from the group consisting of polyethylene oxide (PEO), polypropylene oxide (PPO), polytetramethylene oxide (PTMO), a polyethylene oxide-functionalized aliphatic or aromatic group, and combinations thereof. For example, $R_2$ can be derived from a compound selected from the group consisting of polyethylene oxide (PEO), polytetramethylene oxide (PTMO), and combinations thereof.

In some embodiments, the polyamide hydrogel is physically crosslinked through, e.g., nonpolar or polar interactions between the polyamide groups on the polymers, and is a thermoplastic polyamide, or in particular, a hydrophilic thermoplastic polyamide. In these embodiments, component $R_6$ in Formula 13 and components $R_7$ and $R_8$ in Formula 15 form the portion of the polymer often referred to as the "hard segment", and component $R_2$ forms the portion of the polymer often referred to as the "soft segment". Therefore, in some embodiments, the hydrogel or crosslinked polymeric network can include a physically crosslinked polymeric network having one or more polymer chains with amide linkages.

In some embodiments, the hydrogel or crosslinked polymeric network includes plurality of block copolymer chains, wherein at least a portion of the block copolymer chains each include a polyamide block and a hydrophilic block, (e.g., a polyether block) covalently bonded to the polyamide block to result in a thermoplastic polyamide block copolymer hydrogel (i.e., a polyamide-polyether block copolymer). In these embodiments, the polyamide segments can interact with each other to form the crystalline region. Therefore, the polyamide block copolymer chains can each comprise a plurality of polyamide segments forming crystalline regions with other polyamide segments of the polyamide block copolymer chains, and a plurality of hydrophilic segments covalently bonded to the polyamide segments.

In some embodiments, the polyamide is polyamide-11 or polyamide-12 and the polyether is selected from the group consisting of polyethylene oxide, polypropylene oxide, and polytetramethylene oxide. Commercially available thermoplastic polyamide hydrogels suitable for the present use include those under the tradename "PEBAX" (e.g., "PEBAX MH1657" and "PEBAX MV1074") from Arkema, Inc., Clear Lake, Tex.), and "SERENE" coating (Sumedics, Eden Prairie, Minn.).

In various embodiments, the polyamide hydrogel is covalently crosslinked, as previously described herein.

In some embodiments, the hydrogel comprises or consists essentially of a polyolefin hydrogel. The polyolefin hydrogel can be formed through free radical, cationic, and/or anionic polymerization by methods well known to those skilled in the art (e.g., using a peroxide initiator, heat, and/or light).

In some embodiments, the hydrogel or crosslinked polymeric network can include one or more, or a plurality of, polyolefin chains. For instance, the polyolefin can include polyacrylamide, polyacrylate, polyacrylic acid and derivatives or salts thereof, polyacrylohalide, polyacrylonitrile, polyallyl alcohol, polyallyl ether, polyallyl ester, polyallyl carbonate, polyallyl carbamate, polyallyl sulfone, polyallyl sulfonic acid, polyallyl amine, polyallyl cyanide, polyvinyl ester, polyvinyl thioester, polyvinyl pyrrolidone, polyaolefin, polystyrene, and combinations thereof. Therefore, the polyolefin can be derived from a monomer selected from the group consisting of acrylamide, acrylate, acrylic acid and derivatives or salts thereof, acrylohalide, acrylonitrile, allyl alcohol, allyl ether, allyl ester, allyl carbonate, allyl carbamate, allyl sulfone, allyl sulfonic acid, allyl amine, allyl cyanide, vinyl ester, vinyl thioester, vinyl pyrrolidone, α-olefin, styrene, and combinations thereof.

In some embodiments, the polyolefin is derived from an acrylamide. Suitable acrylamides can include, but are not limited to, acrylamide, methacrylamide, ethylacrylamide, N,N-dimethylacrylamide, N-isopropylacrylamide, N-tert-butylacrylamide, N-isopropylmethacrylamide, N-phenylacrylamide, N-diphenylmethylacrylamide, N-(triphenylmethyl)methacrylamide, N-hydroxyethyl acrylamide, 3-acryloylamino-1-propanol, N-acryloylamido-ethoxyethanol, N-[tris(hydroxymethyl)methyl]acrylamide, N-(3-methoxypropyl)acrylamide, N-[3-(dimethylamino)propyl]methacrylamide, (3-acrylamidopropyl)trimethylammonium chloride, diacetone acrylamide, 2-acrylamido-2-methyl-1-propanesulfonic acid, salts of 2-acrylamido-2-methyl-1-propanesulfonic acid, 4-acryloylmorpholine, and combinations thereof. For example, the acrylamide prepolymer can be acrylamide or methacrylamide.

In some cases, the polyolefin is derived from an acrylate (e.g., acrylate and/or alkylacrylate). Suitable acrylates include, but are not limited to, methyl acrylate, ethyl acrylate, propyl acrylate, isopropyl acrylate, n-butyl acrylate, isobutyl acrylate, tert-butyl acrylate, hexyl acrylate, isooctyl acrylate, isodecyl acrylate, octadecyl acrylate, lauryl acrylate, 2-ethylhexyl acrylate, 4-tert-butylcyclohexyl acrylate, 3,5,5-trimethylhexyl acrylate, isobornyl acrylate, vinyl methacrylate, allyl methacrylate, methyl methacrylate, ethyl methacrylate, butyl methacrylate, isobutyl methacrylate, tert-butyl methacrylate, hexyl methacrylate, 2-ethylhexyl methacrylate, isodecyl methacrylate, lauryl methacrylate, stearyl methacrylate, cyclohexyl methacrylate, 3,3,5-trimethylcyclohexyl methacrylate, combinations thereof, and the like. For example, acrylate prepolymer can be methyl acrylate, ethyl methacrylate, or 2-hydroxyethyl methacrylate.

In some cases, the polyolefin is derived from an acrylic acid or a derivative or salt thereof. Suitable acrylic acids, but are not limited to acrylic acid, sodium acrylate, methacrylic acid, sodium methacrylate, 2-ethylacrylic acid, 2-propylacrylic acid, 2-bromoacrylic acid, 2-(bromomethyl)acrylic acid, 2-(trifluoromethyl)acrylic acid, acryloyl chloride, methacryloyl chloride, and 2-ethylacryloyl chloride.

In various embodiments, the polyolefin can be derived from an allyl alcohol, allyl ether, allyl ester, allyl carbonate, allyl carbamate, allyl sulfone, allyl sulfonic acid, allyl amine, allyl cyanide, or a combination thereof. For example, the polyolefin segment can be derived from allyloxyethanol, 3-allyloxy-1,2-propanediol, allyl butyl ether, allyl benzyl ether, allyl ethyl ether, allyl phenyl ether, allyl 2,4,6-tribromophenyl ether, 2-allyloxybenzaldehyde, 2-allyloxy-2-hydroxybenzophenone, allyl acetate, allyl acetoacetate, allyl chloroacetate, allylcyanoacetate, allyl 2-bromo-2-methylpropionate, allyl butyrate, allyltrifluoroacetae, allyl methyl carbonate, tert-butyl N-allylcarbamate, allyl methyl sulfone, 3-allyloxy-2-hydroxy-1-propanesulfonic acid, 3-allyloxy-2-hydroxy-1-propanesulfonic acid sodium salt, allylamine, an allylamine salt, and allyl cyanide.

In some cases, the polyolefin can be derived from a vinyl ester, vinyl thioester, vinyl pyrrolidone (e.g., N-vinyl pyrrolidone), and combinations thereof. For example, the vinyl monomer can be vinyl chloroformate, vinyl acetate, vinyl decanoate, vinyl neodecanoate, vinyl neononanoate, vinylpivalate, vinyl propionate, vinyl stearate, vinyl valerate, vinyl trifluoroacetate, vinyl benzoate, vinyl 4-tert-butylbenzoate, vinyl cinnamate, butyl vinyl ether, tert-butyl vinyl ether, cyclohexyl vinyl ether, dodecyl vinyl ether, ethylene glycol vinyl ether, 2-ethylhexyl vinyl ether, ethyl vinyl ether, ethyl-1-propenyl ether, isobutyl vinyl ether, propyl vinyl ether, 2-chloroethyl vinyl ether, 1,4-butanediol vinyl ether, 1,4-cyclohexanedimethanol vinyl ether, di(ethylene glycol) vinyl ether, diethyl vinyl orthoformate, vinyl sulfide, vinyl halide, and vinyl chloride.

In some embodiments, the polyolefin can be derived from an alpha-olefin, such as 1-octene, 1-nonene, 1-decene, 1-undecene, 1-dodecene, 1-tridecene, 1-tetradecene, 1-pentadecene, 1-hexadecene, 1-pentadecene, 1-heptadecene, and 1-octadecene.

In various cases, the polyolefin segment containing $R_7$ can be derived from a styrene. Suitable styrene monomers include styrene, α-bromostyrene, 2,4-diphenyl-4-methyl-1-pentene, α-methylstyrene, 4-acetoxystyrene, 4-benzhydrylstyrene, 4-tert-butylstyrene, 2,4-dimethylstyrene, 2,5-dimethylstyrene, 2-methylstyrene, 3-methylstyrene, 4-methylstyrene, 2-(trifluoromethyl)styrene, 3-(trifluoromethyl)styrene, 4-(trifluoromethyl)styrene, 2,4,6-trimethylstyrene, vinylbenzyl chloride, 4-benzyloxy-3-methoxystyrene, 4-tert-butoxystyrene, 3,4-dimethoxystyrene, 4-ethoxystyrene, 4-vinylanisole, 2-bromostyrene, 3-bromostyrene, 4-bromosytrene, 4-chloro-α-methylstyrene, 2-chlorostyrene, 3-chlorostyrene, 4-chlorostyrene, 2,6-dichloro styrene, 2,6-difluorostyrene, 2-fluorostyrene, 3-fluorostyrene, 4-fluorostyrene, 2,3,4,5,6-pentafluoro styrene, N,N-dimethylvinylbenzylamine, 2-isopropenylaniline, 4-[N-(methylaminoethyl)aminomethyl]styrene, 3-vinylaniline, 4-vinylaniline, (vinylbenzyl)trimethylammonium chloride, 4-(diphenylphosphino)styrene, 3-isopropenyl-α,α-dimethylbenzyl isocyanate, 3-nitrostyrene, 9-vinylanthracene, 2-vinylnaphthalene, 4-vinylbenzocyclobutene, 4-vinylbiphenyl, and vinylbenzoic acid.

In some embodiments, the polyolefin comprises a hydrophilic portion. The hydrophilic portion of the polyolefin hydrogel can be pendant to the polyolefin backbone, or the hydrophilic portion can function as a covalent crosslinker of the polyolefin hydrogel. In some embodiments, the hydrophilic portion of the polyolefin hydrogel includes a pendant polyether, polyester, polycarbonate, hydroxyl, lactone (e.g., pyrrolidone), amino, carboxylate, sulfonate, phosphate, ammonium (e.g., tertiary and quaternary ammonium), zwitterion group (e.g., a betaine, such as poly(carboxybetaine (pCB) and ammonium phosphonates such as phosphatidylcholine), or combinations thereof. Polyolefin hydrogels containing a pendant hydrophilic portion can be formed by copolymerizing a polyolefin monomer, as previously described, with a second polymer olefin monomer having a hydrophilic side chain, such as acrylic acid or polyvinylpyrrolidone).

In some embodiments, the polyolefin hydrogel or crosslinked polymeric network includes a plurality of polyolefin chains wherein at least a portion of the polyolefin chains each comprise a first chain segment physically crosslinked to at least one other polyolefin chain of the plurality of polyolefin chains and one or more hydrophilic chain segments covalently bonded to the first chain segment.

In other embodiments, the hydrophilic portion of the polyolefin hydrogel is a hydrophilic crosslinker. The crosslinker can include polyether, polyester, polycarbonate, hydroxyl, lactone (e.g., pyrrolidone), amino, carboxylate, sulfonate, phosphate, ammonium (e.g., tertiary and quaternary ammonium), a zwitterion (e.g., a betaine, such as poly(carboxybetaine (pCB) and ammonium phosphonates such as phosphatidylcholine), and combinations thereof. The hydrophilic crosslinker can be derived from a molecule having at least two ethylenically-unsaturated groups, such as a polyethylene glycol dimethacrylate.

Suitable commercially available polyolefin films include, but are not limited to the "POLYOX" product line by Dow Chemical, Midland Mich., and styrenic block co-polymers. Examples of styrenic co-polymers include, but are not limited to TPE-s (e.g., styrene-butadiene-styrene (SBS) block copolymers, such as "SOFPRENE" and styrene-ethylene-butylene-styrene (SEBS) block copolymer, such as "LAPRENE", by SO.F.TER. GROUP, Lebanon, Tenn.); thermoplastic copolyester elastomers (e.g., thermoplastic elastomer vulconates (TPE-v or TPV)), such as "FORPRENE" by SO.F.TER. GROUP), "TERMOTON-V" by Termopol, Istanbul Turkey; and TPE block copolymers, such as "SANTOPRENE" (ExxonMobil, Irving, Tex.).

In some embodiments, the polyolefin prepolymer described above is co-polymerized with a silicone prepolymer to form a silicone hydrogel. In these embodiments, the silicone prepolymer, the polyolefin prepolymer, or both can function as the crosslinker.

Examples of silicone monomers include, but are not limited to, 3-methacryloxypropyl tris(trimethylsiloxy)silane (TRIS), and monomethacryloxypropyl terminated polydimethylsiloxane (mPDMS), m vinyl[3-[3,3,3-trimethyl-1,1bis(trimethylsilyoxy)-disiloxanyl]propyl]carbamate, 3-methacryloxypropyl-bis(trimethylsiloxy)methyl silane, and methacryloxypropylpentamethyl disiloxane.

As discussed above, the film material can also optionally include one or more additives, such as antioxidants, colorants, stabilizers, anti-static agents, wax packages, anti-blocking agents, crystal nucleating agents, melt strength enhancers, anti-stain agents, stain blockers, hydrophilicity-enhancing additives, and combinations thereof.

Examples of particularly suitable additives include hydrophilicity-enhancing additives, such as one or more superabsorbent polymers (e.g., superabsorbent polyacrylic acid or copolymers thereof). Examples of hydrophilicity-enhancing additives include those commercially available under the tradenames "CREASORB" or "CREABLOCK" by Evonik, Mobile, Ala., "HYSORB" by BASF, Wyandotte, Mich., "WASTE LOCK PAM" by $M^2$ Polymer Technologies, Inc., Dundee Township, Ill., and "AQUA KEEP" by Sumitomo Seika, New York, N.Y. The incorporation of the hydrophilicity-enhancing additive can assist the hydrogel by increasing the water uptake rate and/or capacity for the film material. Examples of suitable concentrations of the hydrophilicity-enhancing additive in the film material range from 0.1% to 15% by weight, from 0.5% to 10% by weight, or from 1% to 5% by weight, based on the total weight of the film material.

In some aspects, the outsole film can define an exterior or ground-facing surface of the outsole. Alternatively, a water-permeable membrane can define the exterior or ground-facing surface of the outsole, and can be in direct contact with the outsole film. For example, at least a portion of the exterior surface of the outsole can be defined by a first side of the water-permeable membrane, with the outsole film present between the backing plate/outsole substrate and the membrane.

The level of water permeability of the water-permeable membrane is preferably sufficient for water to rapidly partition from the exterior surface of the outsole (i.e., the first side of the membrane), across the second side of the membrane, and into the outsole film. For example, the level of water permeability of the water-permeable membrane can be sufficient for a sample of the outsole obtained in accordance with the Footwear Sampling Procedure to have a water uptake capacity of greater than 40% by weight at 24 hours and/or at 1 hour.

The articles of footwear of the present disclosure can be manufactured using a variety of different footwear manufacturing techniques. For example, the outsole film (e.g., the film 116) and the backing plate or substrate can be formed using methods such as injection molding, cast molding, thermoforming, vacuum forming, extrusion, spray coating, and the like.

In a first embodiment, the outsole is formed with the use of a co-extruded outsole plate. In this case, the film material can be co-extruded with a thermoplastic material used to form a thin backing substrate, where the resulting co-extrudate can be provided in a web or sheet form. The web or sheet can then be placed in a vacuum thermoforming tool to produce the three-dimensional geometry of the outsole ground-facing side (referred to as an outsole face precursor).

The backing substrate provides a first function in this step by creating a structural support for the relatively thinner and weaker outsole film. The outsole face precursor can then be trimmed to form its perimeter and orifices to receive traction elements, thereby providing an outsole face.

The outsole face can then be placed in a mold cavity, where the outsole film is preferably positioned away from the injection sprues. Another thermoplastic material can then be back injected into the mold to bond to the backing substrate, opposite of the outsole film. This illustrates the second function of the backing substrate, namely to protect the outsole film from the injection pressure. The injected thermoplastic material can be the same or different from the material used to produce the backing substrate. Preferably, they include the same or similar materials (e.g., both being thermoplastic polyurethanes). As such, the backing substrate and the injected material in the mold form the outsole backing plate, which is secured to the outsole film (during the co-extrusion step).

In a second embodiment, the outsole is formed with the use of injection molding. In this case, a substrate material is preferably injected into a mold to produce the outsole backing plate. The outsole backing plate can then be back injected with the film material to produce the outsole film bonded to the outsole backing plate.

In either embodiment, after the outsole is manufactured, it can be directly or indirectly secured to a footwear upper to provide the article of footwear of the present disclosure. In particular, outsole film can function as a ground-facing surface of the outsole, which is positioned on the opposite side of the outsole backing plate from the upper.

Property Analysis and Characterization Procedure

Various properties can be determined for outsole films of footwear according to the following methodologies.

1. Sampling Procedures

As mentioned above, it has been found that when the outsole film is secured to another substrate, the interfacial bond can restrict the extent that the outsole film can take up water and/or swell. As such, various properties of the outsole film can be characterized using samples prepared with the following sampling procedures:

A. Footwear Sampling Procedure

This procedure can be used to obtain a sample of the outsole film when the outsole film is a component of a footwear outsole or article of footwear (e.g., bonded to an outsole substrate, such as an outsole backing plate). An outsole sample including the outsole film in a non-wetted state (e.g., at 25° C. and 20% relative humidity) is cut from the article of footwear using a blade. This process is performed by separating the outsole from an associated footwear upper, and removing any materials from the outsole top surface (e.g., corresponding to the top surface 142) that can uptake water and potentially skew the water uptake measurements of the outsole film. For example, the outsole top surface can be skinned, abraded, scraped, or otherwise cleaned to remove any upper adhesives, yarns, fibers, foams, and the like that could potentially take up water themselves.

The resulting sample includes the outsole film and any outsole substrate bonded to the outsole film, and maintains the interfacial bond between the outsole film and the associated outsole substrate. As such, this test can simulate how the outsole film will perform as part of an article of footwear. Additionally, this sample is also useful in cases where the interfacial bond between the outsole film and the outsole substrate is less defined, such as where the material of the outsole film is highly diffused into the material of the outsole substrate (e.g., with a concentration gradient).

The sample is taken at a location along the outsole that provides a substantially constant film thickness for the outsole film (within +/−10% of the average film thickness), such as in a forefoot region, midfoot region, or a heel region of the outsole, and has a surface area of 4 square centimeters ($cm^2$). In cases where the outsole film is not present on the outsole in any segment having a 4 $cm^2$ surface area and/or where the film thickness is not substantially constant for a segment having a 4 $cm^2$ surface area, sample sizes with smaller cross-sectional surface areas can be taken and the area-specific measurements are adjusted accordingly.

B. Co-Extruded Film Sampling Procedure

This procedure can be used to obtain a sample of an outsole film when the outsole film is co-extruded onto a backing substrate. The backing substrate is produced from a material that is compatible with the material of the outsole film, such as a material used to form an outsole backing plate for the outsole film.

It has been found that samples taken from co-extruded outsole films are suitable substitutes to samples taken from articles of footwear. Additionally, this sample is also useful in cases where the interfacial bond between the outsole film and the backing substrate is less defined, such as where the material of the outsole film is highly diffused into the material of the backing substrate (e.g., with a concentration gradient).

In this case, the outsole film is co-extruded with the backing substrate as a web or sheet having a substantially constant film thickness for the outsole film (within +/−10% of the average film thickness), and cooled to solidify the resulting web or sheet. A sample of the outsole-film secured to the backing substrate is then cut from the resulting web or sheet, with a sample size surface area of 4 $cm^2$, such that the outsole film of the resulting sample remains secured to the backing substrate.

C. Neat Film Sampling Procedure

This procedure can be used to obtain a sample of an outsole film when the outsole film is isolated in a neat form (i.e., without any bonded substrate). In this case, the outsole film is extruded as a web or sheet having a substantially constant film thickness for the outsole film (within +/−10% of the average film thickness), and cooled to solidify the resulting web or sheet. A sample of the outsole film having a surface area of 4 $cm^2$ is then cut from the resulting web or sheet.

Alternatively, if a source of the outsole film material is not available in a neat form, the outsole film can be cut from an outsole substrate of a footwear outsole, or from a backing substrate of a co-extruded sheet or web, thereby isolating the outsole film. In either case, a sample of the outsole film having a surface area of 4 $cm^2$ is then cut from the resulting isolated film.

D. Neat Material Sampling Procedure

This procedure can be used to obtain a sample of a material used to form the outsole film. In this case, the outsole film material is provided in media form, such as flakes, granules, powders, pellets, and the like. If a source of the outsole film material is not available in a neat form, the outsole film can be cut, scraped, or ground from an outsole substrate of a footwear outsole or from a backing substrate of a co-extruded sheet or web, thereby isolating the outsole film material.

2. Water Uptake Capacity Test

This test measures the water uptake capacity of the outsole film after a given soaking duration for a sample (e.g., taken with the above-discussed Footwear Sampling Procedure, Co-extruded Film Sampling Procedure, or the Neat Film Sampling Procedure). The sample is initially dried at 60° C. until there is no weight change for consecutive measurement intervals of at least 30 minutes apart (e.g., a 24-hour drying period at 60° C. is typically a suitable duration). The total weight of the dried sample ($Wt_{sample,dry}$) is then measured in grams. The dried sample is then allowed to cool down to 25° C., and is fully immersed in a deionized water bath maintained at 25° C. After a given soaking duration, the sample is removed from the deionized water bath, blotted with a cloth to remove surface water, and the total weight of the soaked sample ($Wt_{sample,wet}$) is measured in grams.

Any suitable soaking duration can be used, where a 24-hour soaking duration is believed to simulate saturation conditions for the outsole films of the present disclosure (i.e., the outsole film will be in its saturated state). Accordingly, as used herein, the expression "having a water uptake capacity at 5 minutes of . . . " refers to a soaking duration of 5 minutes, having a water uptake capacity at 1 hour of . . . " refers to a soaking duration of 1 hour, the expression "having a water uptake capacity at 24 hours of . . . " refers to a soaking duration of 24 hours, and the like.

As can be appreciated, the total weight of a sample taken pursuant to the Footwear Sampling Procedure or the Co-extruded Film Sampling Procedure includes the weight of the outsole film as dried or soaked ($Wt_{film,dry}$ or $Wt_{film,wet}$) and the weight of the outsole or backing substrate ($Wt_{substrate}$). In order to determine a change in weight of the outsole film due to water uptake, the weight of the substrate ($Wt_{substrate}$) needs to be subtracted from the sample measurements.

The weight of the substrate ($Wt_{substrate}$) is calculated using the sample surface area (e.g., 4 cm$^2$), an average measured thickness of the substrate in the sample, and the average density of the substrate material. Alternatively, if the density of the material for the substrate is not known or obtainable, the weight of the substrate ($Wt_{substrate}$) is determined by taking a second sample using the same sampling procedure as used for the primary sample, and having the same dimensions (surface area and film/substrate thicknesses) as the primary sample. The outsole film of the second sample is then cut apart from the substrate of the second sample with a blade to provide an isolated substrate. The isolated substrate is then dried at 60° C. for 24 hours, which can be performed at the same time as the primary sample drying. The weight of the isolated substrate ($Wt_{substrate}$) is then measured in grams.

The resulting substrate weight ($Wt_{substrate}$) is then subtracted from the weights of the dried and soaked primary sample ($Wt_{sample,dry}$ and $Wt_{sample,wet}$) to provide the weights of the outsole film as dried and soaked ($Wt_{film,dry}$ and $Wt_{film,wet}$), as depicted below by Equations 1 and 2:

$$Wt_{film,dry} = Wt_{sample,dry} - Wt_{substrate} \quad \text{(Equation 1)}$$

$$Wt_{film,wet} = Wt_{sample,wet} - Wt_{substrate} \quad \text{(Equation 2)}$$

For outsole film samples taken pursuant to the Neat Film Sampling Procedure, the substrate weight ($Wt_{substrate}$) is zero. As such, Equation 1 collapses to $Wt_{film,dry} = Wt_{sample,dry}$, and Equation 2 collapses to $Wt_{film,wet} = Wt_{sample,wet}$.

The weight of the dried outsole film ($Wt_{film,dry}$) is then subtracted from the weight of the soaked outsole film ($Wt_{film,wet}$) to provide the weight of water that was taken up by the outsole film, which is then divided by the weight of the dried outsole film ($Wt_{film,dry}$) to provide the water uptake capacity for the given soaking duration as a percentage, as depicted below by Equation 3:

$$\text{Water Uptake Capacity} = \frac{Wt_{film,wet} - Wt_{film,dry}}{Wt_{film,dry}} (100\%) \quad \text{(Equation 3)}$$

For example, a water uptake capacity of 50% at 1 hour means that the soaked outsole film weighed 1.5 times more than its dry-state weight after soaking for 1 hour, where there is a 1:2 weight ratio of water to outsole film material. Similarly, a water uptake capacity of 500% at 24 hours means that the soaked outsole film weighed 5 times more than its dry-state weight after soaking for 24 hours, where there is a 4:1 weight ratio of water to outsole film material.

3. Water Uptake Rate Test

This test measures the water uptake rate of the outsole film by modeling weight gain as a function of soaking time for a sample with a one-dimensional diffusion model. The sample can be taken with any of the above-discussed Footwear Sampling Procedure, Co-extruded Film Sampling Procedure, or the Neat Film Sampling Procedure. The sample is initially dried at 60° C. until there is no weight change for consecutive measurement intervals of at least 30 minutes apart (a 24-hour drying period at 60° C. is typically a suitable duration). The total weight of the dried sample ($Wt_{sample,dry}$) is then measured in grams. Additionally, the average thickness of the outsole film for the dried sample is measured for use in calculating the water uptake rate, as explained below.

The dried sample is then allowed to cooled down to 25° C., and is fully immersed in a deionized water bath maintained at 25° C. Between soaking durations of 1, 2, 4, 9, 16, and 25 minutes, the sample is removed from the deionized water bath, blotted with a cloth to remove surface water, and the total weight of the soaked sample ($Wt_{sample,wet,t}$) is measured, where "t" refers to the particular soaking-duration data point (e.g., 1, 2, 4, 9, 16, or 25 minutes).

The exposed surface area of the soaked sample ($A_t$) is also measured with calipers for determining the specific weight gain, as explained below. The exposed surface area refers to the surface area that comes into contact with the deionized water when fully immersed in the bath. For samples obtained using the Footwear Sampling Procedure and the Co-extruded Film Sampling Procedure, the samples only have one major surface exposed. However, for samples obtained using the Neat Film Sampling Procedure, both major surfaces are exposed. For convenience, the surface areas of the peripheral edges of the sample are ignored due to their relatively small dimensions.

The measured sample is fully immersed back in the deionized water bath between measurements. The 1, 2, 4, 9, 16, and 25 minute durations refer to cumulative soaking durations while the sample is fully immersed in the deionized water bath (i.e., after the first minute of soaking and first measurement, the sample is returned to the bath for one more minute of soaking before measuring at the 2-minute mark).

As discussed above in the Water Uptake Capacity Test, the total weight of a sample taken pursuant to the Footwear Sampling Procedure or the Co-extruded Film Sampling Procedure includes the weight of the outsole film as dried or soaked ($Wt_{film,dry}$ or $Wt_{film,wet,t}$) and the weight of the outsole or backing substrate ($Wt_{substrate}$). In order to determine a weight change of the outsole film due to water uptake, the weight of the substrate ($Wt_{substrate}$) needs to be subtracted from the sample weight measurements. This can be accomplished using the same steps discussed above in the Water Uptake Capacity Test to provide the resulting outsole film weights $Wt_{,film,dry}$ and $Wt_{,film,wet,t}$ for each soaking-duration measurement.

The specific weight gain ($Ws_{,film,t}$) from water uptake for each soaked sample is then calculated as the difference between the weight of the soaked sample ($Wt_{,film,wet,t}$) and the weight of the initial dried sample ($Wt_{,film,dry}$), where the resulting difference is then divided by the exposed surface area of the soaked sample ($A_t$), as depicted below by Equation 4:

$$Ws_{,film,t} = \frac{Wt_{,film,wet,t} - Wt_{,film,dry}}{A_t} \quad \text{(Equation 4)}$$

where t refers to the particular soaking-duration data point (e.g., 1, 2, 4, 9, 16, or 25 minutes), as mentioned above.

The water uptake rate for the outsole film is then determined as the slope of the specific weight gains ($Ws_{,film,t}$) versus the square root of time (in minutes), as determined by a least squares linear regression of the data points. For the outsole films of the present disclosure, the plot of the specific weight gains ($Ws_{,film,t}$) versus the square root of time (in minutes) provides an initial slope that is substantially linear (to provide the water uptake rate by the linear regression analysis). However, after a period of time depending on the thickness of the outsole film, the specific weight gains will slow down, indicating a reduction in the water uptake rate, until the saturated state is reached. This is believed to be due to the water being sufficiently diffused throughout the outsole film as the water uptake approaches saturation, and will vary depending on film thickness.

As such, for the outsole film having an average dried film thickness (as measured above) less than 0.3 millimeters, only the specific weight gain data points at 1, 2, 4, and 9 minutes are used in the linear regression analysis. In these cases, the data points at 16 and 25 minutes can begin to significantly diverge from the linear slope due to the water uptake approaching saturation, and are omitted from the linear regression analysis. In comparison, for the outsole film having an average dried film thickness (as measured above) of 0.3 millimeters or more, the specific weight gain data points at 1, 2, 4, 9, 16, and 25 minutes are used in the linear regression analysis. The resulting slope defining the water uptake rate for the sampled outsole film has units of weight/(surface area-square root of time), such as grams/(meter$^2$–minutes$^{1/2}$).

Furthermore, some film or substrate surfaces can create surface phenomenon that quickly attract and retain water molecules (e.g., via surface hydrogen bonding or capillary action) without actually drawing the water molecules into the film or substrate. Thus, samples of these films or substrates can show rapid specific weight gains for the 1-minute sample, and possibly for the 2-minute sample. After that, however, further weight gain is negligible. As such, the linear regression analysis is only applied if the specific weight gain data points at 1, 2, and 4 minutes continue to show an increase in water uptake. If not, the water uptake rate under this test methodology is considered to be about zero grams/(meter$^2$–minutes$^{1/2}$).

4. Swelling Capacity Test

This test measures the swelling capacity of the outsole film in terms of increases in film thickness and film volume after a given soaking duration for a sample (e.g., taken with the above-discussed Footwear Sampling Procedure, Co-extruded Film Sampling Procedure, or the Neat Film Sampling Procedure). The sample is initially dried at 60° C. until there is no weight change for consecutive measurement intervals of at least 30 minutes apart (a 24-hour drying period is typically a suitable duration). The film dimensions of the dried sample are then measured (e.g., thickness, length, and width for a rectangular sample; thickness and diameter for a circular sample, etc. . . . ). The dried sample is then fully immersed in a deionized water bath maintained at 25° C. After a given soaking duration, the sample is removed from the deionized water bath, blotted with a cloth to remove surface water, and the same film dimensions for the soaked sample are re-measured.

Any suitable soaking duration can be used. Accordingly, as used herein, the expressions "having a swelling thickness (or volume) increase at 5 minutes of . . . " refers to a soaking duration of 5 minutes, having a swelling thickness (or volume) increase at 1 hour of . . . " refers to a test duration of 1 hour, the expression "having a swelling thickness (or volume) increase at 24 hours of . . . " refers to a test duration of 24 hours, and the like.

The swelling of the outsole film is determined by (i) an increase in the film thickness between the dried and soaked outsole film, by (ii) an increase in the film volume between the dried and soaked outsole film, or (iii) both. The increase in film thickness between the dried and soaked film is calculated by subtracting the measured film thickness of the initial dried film from the measured film thickness of the soaked film. Similarly, the increase in film volume between the dried and soaked film is calculated by subtracting the measured film volume of the initial dried film from the measured film volume of the soaked film. The increases in the film thickness and volume can also be represented as percentage increases relative to the dry-film thickness or volume, respectively.

5. Contact Angle Test

This test measures the contact angle of the outsole film surface (or of the outsole surface) based on a static sessile drop contact angle measurement for a sample (e.g., taken with the above-discussed Footwear Sampling Procedure, Co-extruded Film Sampling Procedure, or the Neat Film Sampling Procedure). The contact angle refers to the angle at which a liquid interface meets a solid surface, and is an indicator of how hydrophilic the surface is.

For a dry test (i.e., to determine a dry-state contact angle), the sample is initially equilibrated at 25° C. and 20% humidity for 24 hours. For a wet test (i.e., to determine a wet-state contact angle), the sample is fully immersed in a deionized water bath maintained at 25° C. for 24 hours. After that, the sample is removed from the bath and blotted with a cloth to remove surface water, and clipped to a glass slide if needed to prevent curling.

The dry or wet sample is then placed on a moveable stage of a contact angle goniometer commercially available under the tradename "RAME-HART F290" from Rame-Hart Instrument Co., Succasunna, N.J. A 10-microliter droplet of deionized water is then placed on the sample using a syringe and automated pump. An image is then immediately taken of the droplet (before film can take up the droplet), and the contact angle of both edges of the water droplet are measured from the image. The decrease in contact angle between the dried and wet samples is calculated by subtracting the measured contact angle of the wet film from the measured contact angle of the dry film.

6. Coefficient of Friction Test

This test measures the coefficient of friction of the outsole film surface (or of the outsole surface) for a sample (e.g., taken with the above-discussed Footwear Sampling Procedure, Co-extruded Film Sampling Procedure, or the Neat Film Sampling Procedure). For a dry test (i.e., to determine a dry-state coefficient of friction), the sample is initially equilibrated at 25° C. and 20% humidity for 24 hours. For a wet test (i.e., to determine a wet-state coefficient of friction), the sample is fully immersed in a deionized water bath maintained at 25° C. for 24 hours. After that, the sample is removed from the bath and blotted with a cloth to remove surface water.

The measurement is performed with an aluminum sled mounted on an aluminum test track, which is used to perform a sliding friction test for test sample on an aluminum surface of the test track. The test track measures 127 millimeters wide by 610 millimeters long. The aluminum sled measures 76.2 millimeters×76.2 millimeters, with a 9.5 millimeter radius cut into the leading edge. The contact area of the aluminum sled with the track is 76.2 millimeters x 66.6 millimeters, or 5,100 square millimeters).

The dry or wet sample is attached to the bottom of the sled using a room temperature-curing two-part epoxy adhesive commercially available under the tradename "LOCTITE 608" from Henkel, Dusseldorf, Germany. The adhesive is used to maintain the planarity of the wet sample, which can curl when saturated. A polystyrene foam having a thickness of about 25.4 millimeters is attached to the top surface of the sled (opposite of the test sample) for structural support.

The sliding friction test is conducted using a screw-driven load frame. A tow cable is attached to the sled with a mount supported in the polystyrene foam structural support, and is wrapped around a pulley to drag the sled across the aluminum test track. The sliding or frictional force is measured using a load transducer with a capacity of 2,000 Newtons. The normal force is controlled by placing weights on top of the aluminum sled, supported by the polystyrene foam structural support, for a total sled weight of 20.9 kilograms (205 Newtons). The crosshead of the test frame is increased at a rate of 5 millimeters/second, and the total test displacement is 250 millimeters. The coefficient of friction is calculated based on the steady-state force parallel to the direction of movement required to pull the sled at constant velocity. The coefficient of friction itself is found by dividing the steady-state pull force by the applied normal force. Any transient value relating static coefficient of friction at the start of the test is ignored.

7. Storage Modulus Test

This test measures the resistance of the outsole film to being deformed (ratio of stress to strain) when a vibratory or oscillating force is applied to it, and is a good indicator of film compliance in the dry and wet states. For this test, a sample is provided in neat form using the Neat Film Sampling Procedure, which is modified such that the surface area of the test sample is rectangular with dimensions of 5.35 millimeters wide and 10 millimeters long. The film thickness can range from 0.1 millimeters to 2 millimeters, and the specific range is not particularly limited as the end modulus result is normalized according to film thickness.

The storage modulus (E') with units of megaPascals (MPa) of the sample is determined by dynamic mechanical analysis (DMA) using a DMA analyzer commercially available under the tradename "Q800 DMA ANALYZER" from TA Instruments, New Castle, Del., which is equipped with a relative humidity accessory to maintain the sample at constant temperature and relative humidity during the analysis.

Initially, the thickness of the test sample is measured using calipers (for use in the modulus calculations). The test sample is then clamped into the DMA analyzer, which is operated at the following stress/strain conditions during the analysis: isothermal temperature of 25° C., frequency of 1 Hertz, strain amplitude of 10 micrometers, preload of 1 Newton, and force track of 125%. The DMA analysis is performed at a constant 25° C. temperature according to the following time/relative humidity (RH) profile: (i) 0% RH for 300 minutes (representing the dry state for storage modulus determination), (ii) 50% RH for 600 minutes, (iii) 90% RH for 600 minutes (representing the wet state for storage modulus determination), and (iv) 0% RH for 600 minutes.

The E' value (in MPa) is determined from the DMA curve according to standard DMA techniques at the end of each time segment with a constant RH value. Namely, the E' value at 0% RH (i.e., the dry-state storage modulus) is the value at the end of step (i), the E' value at 50% RH is the value at the end of step (ii), and the E' value at 90% RH (i.e., the wet-state storage modulus) is the value at the end of step (iii) in the specified time/relative humidity profile.

The outsole film can be characterized by its dry-state storage modulus, its wet-state storage modulus, or the reduction in storage modulus between the dry-state and wet-state outsole films, where wet-state storage modulus is less than the dry-state storage modulus. This reduction in storage modulus can be listed as a difference between the dry-state storage modulus and the wet-state storage modulus, or as a percentage change relative to the dry-state storage modulus.

8. Glass Transition Temperature Test

This test measures the glass transition temperature ($T_g$) of the outsole film for a sample, where the outsole film is provided in neat form, such as with the Neat Film Sampling Procedure or the Neat Material Sampling Procedure, with a 10-milligram sample weight. The sample is measured in both a dry state and a wet state (i.e., after exposure to a humid environment as described herein).

The glass transition temperature is determined with DMA using a DMA analyzer commercially available under the tradename "Q2000 DMA ANALYZER" from TA Instruments, New Castle, Del., which is equipped with aluminum hermetic pans with pinhole lids, and the sample chamber is purged with 50 milliliters/minute of nitrogen gas during analysis. Samples in the dry state are prepared by holding at 0% RH until constant weight (less than 0.01% weight change over 120 minute period). Samples in the wet state are prepared by conditioning at a constant 25° C. according to the following time/relative humidity (RH) profile: (i) 250 minutes at 0% RH, (ii) 250 minutes at 50% RH, and (iii) 1,440 minutes at 90% RH. Step (iii) of the conditioning program can be terminated early if sample weight is measured during conditioning and is measured to be substantially constant within 0.05% during an interval of 100 minutes.

After the sample is prepared in either the dry or wet state, it is analyzed by DSC to provide a heat flow versus temperature curve. The DSC analysis is performed with the following time/temperature profile: (i) equilibrate at −90° C. for 2 minutes, (ii) ramp at +10° C./minute to 250° C., (iii) ramp at −50° C./minute to −90° C., and (iv) ramp at +10° C./minute to 250° C. The glass transition temperature value (in Celsius) is determined from the DSC curve according to standard DSC techniques.

9. Impact Energy Test

This test measures the ability of an outsole film sample to shed soil under particular test conditions, where the sample is prepared using the Co-extruded Film Sampling Procedure or the Neat Film Sampling Procedure (to obtain a suitable sample surface area). Initially, the sample is fully immersed in a water bath maintained at 25° C. for 24 hours), and then removed from the bath and blotted with a cloth to remove surface water.

The saturated test sample is then adhered to an aluminum block model outsole having a 25.4-millimeter thickness and a 76.2 millimeters×76.2 millimeters surface area, using a room temperature-curing two-part epoxy adhesive commercially available under the tradename "LOCTITE 608" from Henkel, Dusseldorf, Germany. The adhesive is used to maintain the planarity of the soaked sample, which can curl when saturated.

Four polyurethane cleats, which are commercially available under the trade name "MARKWORT M12-EP" 0.5-inch (12.7 millimeter) tall cleats from Markwort Sporting Goods Company, St. Louis, Mo., are then screwed into the bottom of the block in a square pattern with a 1.56-inch (39.6-millimeter) pitch. As a control reference, four identical cleats are attached to an aluminum block model outsole without an outsole film sample attached.

To clog the model outsole cleats, a bed of soil of about 75 millimeters in height is placed on top of a flat plastic plate. The soil is commercially available under the tradename "TIMBERLINE TOP SOIL", model 50051562, from Timberline (subsidiary of Old Castle, Inc., Atlanta, Ga.) and was sifted with a square mesh with a pore dimension of 1.5 millimeter on each side. The model outsole is then compressed into the soil under body weight and twisting motion until the cleats touch the plastic plate. The weight is removed from the model outsole, and the model outsole is then twisted by 90 degrees in the plane of the plate and then lifted vertically. If no soil clogs the model outsole, no further testing is conducted.

However, if soil does clog the model outsole, the soil is knocked loose by dropping a 25.4-millimeter diameter steel ball weighing 67 grams onto the top side of the model outsole (opposite of the test sample and clogged soil). The initial drop height is 152 millimeters (6 inches) above the model outsole. If the soil does not come loose, the ball drop height is increased by an additional 152 millimeters (6 inches) and dropped again. This procedure of increasing the ball drop height by 152 millimeter (6 inch) increments is repeated until the soil on the bottom of the outsole model is knocked loose.

This test is run 10 times per test sample. For each run, the ball drop height can be converted into unclogging impact energy by multiplying the ball drop height by the ball mass (67 grams) and the acceleration of gravity (9.8 meters/second). The unclogging impact energy in Joules equals the ball drop height in inches multiplied by 0.0167. The procedure is performed on both the model outsole with the outsole film sample and a control model outsole without the outsole film, and the relative ball drop height, and therefore relative impact energy, is determined as the ball drop height for the model outsole with the outsole film sample divided by the control model outsole without the outsole film. A result of zero for the relative ball drop height (or relative impact energy) indicates that no soil clogged to the model outsole initially when the model outsole was compressed into the test soil (i.e., in which case the ball drop and control model outsole portions of the test are omitted).

10. Soil Shearing Footwear Test

This test measures the mud shearing ability of an article of footwear, and does not require any sampling procedure. Initially, the outsole of the footwear (while still attached to the upper) is fully immersed in a water bath maintained at 25° C. for 20 minutes), and then removed from the bath and blotted with a cloth to remove surface water, and its initial weight is measured.

The footwear with the soaked outsole is then placed on a last (i.e., foot form) and fixed to a test apparatus commercially available under the tradename "INSTRON 8511" from Instron Corporation, Norwood, Mass. The footwear is then lowered so that the cleats are fully submerged in the soil, and then raised and lowered into the soil at an amplitude of 10 millimeters for ten repetitions at 1 Hertz. With the cleats submerged in the soil, the cleat is rotated 20 degrees in each direction ten times at 1 Hertz. The soil is commercially available under the tradename "TIMBERLINE TOP SOIL", model 50051562, from Timberline (subsidiary of Old Castle, Inc., Atlanta, Ga.), and the moisture content is adjusted so that the shear strength value is between 3 and 4 kilograms/cm$^2$ on a shear vane tester available from Test Mark Industries (East Palestine, Ohio.

After the test is complete, the footwear is carefully removed from the last and its post-test weight is measured. The difference between the post-test weight and the initial weight of the footwear, due to soil accumulation, is then determined.

EXAMPLES

The present disclosure is more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

1. Footwear Outsole Water Uptake Analysis

Test samples for Examples 1-5 were measured for water uptake capacities over multiple soaking durations. Each test sample was taken from a global football/soccer shoe outsole having an outsole film of the present disclosure. Each outsole was initially manufactured by co-extruding the outsole film with a backing substrate having a substrate thickness of 0.4 millimeters, where the backing substrate material was an aromatic thermoplastic polyurethane commercially available under the tradename "ESTANE 2103-87AE" from Lubrizol Corporation, Wickliffe, Ohio.

For Examples 1-3, the outsole film material was a thermoplastic polyurethane hydrogel commercially available under the tradename "TECOPHILIC TG-500" from the Lubrizol Corporation, Wickliffe, Ohio, which included copolymer chains having aliphatic hard segments and hydrophilic soft segments (with polyether chains). For Examples 4 and 5, the outsole film material was a lower-water-uptake thermoplastic polyurethane hydrogel commercially available under the tradename "TECOPHILIC HP-60D-60" from the Lubrizol Corporation, Wickliffe, Ohio.

For each example, the resulting co-extruded web was then sheeted, vacuum thermoformed, and trimmed to dimensions for an outsole face. The outsole face was then back injected with another thermoplastic polyurethane commercially available under the tradename "DESMOPAN DP 8795 A" from Bayer MaterialScience AG, Leverkusen, Germany to produce the outsole having the outsole film as the ground-facing surface, and the extruded backing substrate and back-injected material collectively forming the outsole backing plate. Footwear uppers were then adhered to the top sides of the produced outsoles to provide the article of footwear.

Test samples for each example were then taken as described above in the Footwear Sampling Procedure, with the exception of the sample sizes described below. In particular, annular test samples including the outsole film and the outsole backing plate were cut out of the footwear. This was performed by initially cutting off the upper from the outsole near the biteline where the outsole and upper meet.

A small guide hole in the center of the sample was then created (creating an inner diameter for the sample) to assist in cutting the annular sample with the desired outer diameter. All removable layers remaining on the top side of the outsole backing plate after cutting were peeled away from the test samples, including the sockliner, strobel, and insole board, while some residual adhesive remained on the sample. Each sample was taken from a central location in its respective region (i.e., near a longitudinal midline) and generally in-between the cleats.

Test samples for Examples 1-3 were respectively taken from the forefoot region, the midfoot region, and the heel region of the outsole. Test samples for Examples 4 and 5 were respectively taken from the forefoot region and the midfoot region. Each sample was taken from a central location in its respective region (i.e., near a longitudinal midline) and generally in-between the cleats.

For comparison purposes, outsole samples were also taken from a global football/soccer footwear having a thermoplastic polyurethane commercially available under the tradename "DESMOPAN DP 8795 A" from Bayer MaterialScience AG, Leverkusen, Germany; where the outsoles did not include an outsole film of the present disclosure. For Comparative Example A, an annular test sample was taken from the forefoot region of the outsole using the same technique as discussed above for Examples 1-5. For Comparative Example B, a rectangular test sample was taken from the midfoot region of the outsole. Each sample was taken from a central location in its respective region (i.e., near a longitudinal midline) and generally in-between the cleats.

The film thickness, outsole thickness, surface area, and film volume of each test sample was then measured and calculated. The water uptake capacity for each test sample was then measured for different soaking durations, pursuant to the Water Uptake Capacity Test. After each soaking duration, the total sample weight was recorded, and the water uptake weight for each soaking duration was calculated by subtracting out the dry sample weight from the given recorded total sample weight.

The film weight was also calculated for each soaking duration by subtracting out the weight of the sample outsole substrate, as described in the Water Uptake Capacity Test. The outsole substrate weight was determined by calculating its volume (from the outsole thickness and surface area) and using the known density of the outsole backing plate material. The water uptake capacity was then calculated for each soaking duration, as also described in the Water Uptake Capacity Test. Tables 1A-1G shown below list the total sample weights, the water uptake weights, the film weights, and the water uptake capacities for the test samples of Examples 1-5 and Comparative Examples A and B over different soaking durations.

TABLE 1A

| Sample | Soak Time (minutes) | Total Sample Weight (grams) | Uptaken Water Weight (grams) | Film Weight (grams) | Water Uptake Capacity |
|---|---|---|---|---|---|
| Example 1 | 0 | 1.54 | 0.00 | 0.64 | 0% |
| Example 1 | 2 | 1.72 | 0.18 | 0.77 | 28% |
| Example 1 | 5 | 1.75 | 0.21 | 0.84 | 33% |
| Example 1 | 10 | 1.84 | 0.30 | 0.90 | 47% |
| Example 1 | 30 | 2.01 | 0.47 | 1.10 | 74% |
| Example 1 | 60 | 2.18 | 0.64 | 1.22 | 101% |

TABLE 1B

| Sample | Soak Time (minutes) | Total Sample Weight (grams) | Uptaken Water Weight (grams) | Film Weight (grams) | Water Uptake Capacity |
|---|---|---|---|---|---|
| Example 2 | 0 | 1.50 | 0.00 | 0.51 | 0% |
| Example 2 | 2 | 1.68 | 0.18 | 0.67 | 35% |
| Example 2 | 5 | 1.75 | 0.25 | 0.73 | 49% |
| Example 2 | 10 | 1.84 | 0.34 | 1.04 | 66% |
| Example 2 | 30 | 2.15 | 0.65 | 1.33 | 127% |
| Example 2 | 60 | 2.40 | 0.90 | 1.49 | 176% |

TABLE 1C

| Sample | Soak Time (minutes) | Total Sample Weight (grams) | Uptaken Water Weight (grams) | Film Weight (grams) | Water Uptake Capacity |
|---|---|---|---|---|---|
| Example 3 | 0 | 1.21 | 0.00 | 0.46 | 0% |
| Example 3 | 2 | 1.36 | 0.15 | 0.51 | 32% |
| Example 3 | 5 | 1.44 | 0.23 | 0.72 | 50% |
| Example 3 | 10 | 1.52 | 0.31 | 0.88 | 67% |
| Example 3 | 30 | 1.63 | 0.42 | 0.79 | 91% |
| Example 3 | 60 | 1.80 | 0.59 | 1.12 | 127% |
| Example 3 | 180 | 2.15 | 0.94 | 1.58 | 203% |
| Example 3 | 300 | 2.30 | 1.09 | 1.72 | 235% |
| Example 3 | 1260 | 2.57 | 1.36 | 1.93 | 294% |

TABLE 1D

| Sample | Soak Time (minutes) | Total Sample Weight (grams) | Uptaken Water Weight (grams) | Film Weight (grams) | Water Uptake Capacity |
|---|---|---|---|---|---|
| Example 4 | 0 | 1.06 | 0.00 | 0.18 | 0% |
| Example 4 | 2 | 1.08 | 0.02 | 0.31 | 11% |
| Example 4 | 5 | 1.11 | 0.05 | 0.35 | 28% |
| Example 4 | 10 | 1.06 | 0.00 | 0.34 | 0% |
| Example 4 | 30 | 1.11 | 0.05 | 0.28 | 28% |
| Example 4 | 60 | 1.12 | 0.06 | 0.41 | 33% |
| Example 4 | 180 | 1.14 | 0.08 | 0.38 | 44% |
| Example 4 | 300 | 1.10 | 0.04 | 0.38 | 22% |
| Example 4 | 1260 | 1.10 | 0.04 | 0.36 | 22% |

TABLE 1E

| Sample | Soak Time (minutes) | Total Sample Weight (grams) | Uptaken Water Weight (grams) | Film Weight (grams) | Water Uptake Capacity |
|---|---|---|---|---|---|
| Example 5 | 0 | 1.14 | 0.00 | 0.21 | 0% |
| Example 5 | 2 | 1.17 | 0.03 | 0.21 | 61% |
| Example 5 | 5 | 1.07 | −0.07 | 0.24 | 6% |
| Example 5 | 10 | 1.19 | 0.05 | 0.26 | 72% |

TABLE 1E-continued

| Sample | Soak Time (minutes) | Total Sample Weight (grams) | Uptaken Water Weight (grams) | Film Weight (grams) | Water Uptake Capacity |
|---|---|---|---|---|---|
| Example 5 | 30 | 1.18 | 0.04 | 0.26 | 66% |
| Example 5 | 60 | 1.19 | 0.05 | 0.27 | 72% |
| Example 5 | 180 | 1.20 | 0.06 | 0.29 | 77% |
| Example 5 | 300 | 1.19 | 0.05 | 0.36 | 72% |
| Example 5 | 1260 | 1.20 | 0.06 | 0.24 | 77% |

TABLE 1F

| Sample | Soak Time (minutes) | Total Sample Weight (grams) | Uptaken Water Weight (grams) |
|---|---|---|---|
| Comparative Example A | 0 | 1.26 | 0.00 |
| Comparative Example A | 2 | 1.60 | 0.34 |
| Comparative Example A | 5 | 1.62 | 0.36 |
| Comparative Example A | 10 | 1.56 | 0.30 |
| Comparative Example A | 30 | 1.62 | 0.36 |
| Comparative Example A | 60 | 1.57 | 0.31 |

TABLE 1F

| Sample | Soak Time (minutes) | Total Sample Weight (grams) | Uptaken Water Weight (grams) |
|---|---|---|---|
| Comparative Example B | 0 | 1.05 | 0.00 |
| Comparative Example B | 2 | 1.05 | 0.00 |
| Comparative Example B | 5 | 1.05 | 0.00 |
| Comparative Example B | 10 | 1.05 | 0.00 |
| Comparative Example B | 30 | 1.05 | 0.00 |
| Comparative Example B | 60 | 1.05 | 0.00 |
| Comparative Example B | 180 | 1.06 | 0.01 |
| Comparative Example B | 300 | 1.05 | 0.00 |
| Comparative Example B | 1260 | 1.06 | 0.01 |

As shown in Tables 1A-1C, there is significant change in the weight of the samples for Example 1-3, which was believed to be due to the high absorbance of the outsole film material. The samples of Examples 4 and 5 were based on a lower-absorbent material and used a thinner application when compared to Examples 1-3. Both of these differences lead to less resolution in the measurement, although the uptake percent (~50% average for the two samples) is measurable. This illustrates how the water uptake of an outsole film is dependent on the water uptake properties of the film material as well as the film thickness.

In comparison, the samples of Comparative Examples A and B demonstrated the lack of water uptake for non-functional materials. In particular, the sample of Example A only showed a change in weight at the first time point, but no subsequent change. This is due to surface phenomenon of the sample (e.g., capillary action) rather than water uptake into the outsole. In particular, the backing layer for Comparative Example A was rough (i.e., has micropores unrelated to the polymer chemistry) and fibers associated with shoe construction adhered to the backing layer that were not fully removed during sample preparation. On the other hand, the sample of Comparative Example B had a smooth outsole surface and all potential contaminants are removed.

In addition to the water uptake capacities, the test samples of Examples 1-5 and Comparative Examples A and B were measured for thickness and volumetric swelling, pursuant to the Swelling Capacity Test, over the same soaking durations referred to above. Tables 2A-2G list the measured surface areas and film thicknesses, and the calculated film volumes for the test samples, and Tables 3A-3E list the film thickness increase, the percentage film thickness increase, the film volume increase, the percentage film volume increase.

TABLE 2A

| Sample | Soak Time (minutes) | Surface Area (mm$^2$) | Sample Thickness (mm) | Film Thickness (mm) | Film volume (mm$^3$) |
|---|---|---|---|---|---|
| Example 1 | 0 | 380 | 3.66 | 1.44 | 548 |
| Example 1 | 2 | 379 | 3.75 | 1.75 | 664 |
| Example 1 | 5 | 410 | 3.75 | 1.77 | 726 |
| Example 1 | 10 | 410 | 3.90 | 1.90 | 779 |
| Example 1 | 30 | 451 | 4.18 | 2.11 | 951 |
| Example 1 | 60 | 481 | 4.34 | 2.18 | 1049 |

TABLE 2B

| Sample | Soak Time (minutes) | Surface Area (mm$^2$) | Sample Thickness (mm) | Film Thickness (mm) | Film volume (mm$^3$) |
|---|---|---|---|---|---|
| Example 2 | 0 | 421 | 3.50 | 1.05 | 442 |
| Example 2 | 2 | 415 | 3.70 | 1.40 | 582 |
| Example 2 | 5 | 436 | 4.22 | 1.45 | 633 |
| Example 2 | 10 | 472 | 4.20 | 1.90 | 897 |
| Example 2 | 30 | 561 | 4.15 | 2.05 | 1150 |
| Example 2 | 60 | 612 | 4.18 | 2.10 | 1285 |

TABLE 2C

| Sample | Soak Time (minutes) | Surface Area (mm$^2$) | Sample Thickness (mm) | Film Thickness (mm) | Film volume (mm$^3$) |
|---|---|---|---|---|---|
| Example 3 | 0 | 347 | 2.95 | 1.15 | 399 |
| Example 3 | 2 | 347 | 3.08 | 1.28 | 444 |
| Example 3 | 5 | 369 | 3.46 | 1.68 | 620 |
| Example 3 | 10 | 399 | 3.58 | 1.89 | 755 |
| Example 3 | 30 | 404 | 3.70 | 1.68 | 678 |
| Example 3 | 60 | 449 | 3.75 | 2.15 | 964 |
| Example 3 | 180 | 513 | 4.00 | 2.65 | 1359 |
| Example 3 | 300 | 530 | 4.18 | 2.80 | 1485 |
| Example 3 | 1260 | 581 | 4.35 | 2.87 | 1667 |

TABLE 2D

| Sample | Soak Time (minutes) | Surface Area (mm$^2$) | Sample Thickness (mm) | Film Thickness (mm) | Film volume (mm$^3$) |
|---|---|---|---|---|---|
| Example 4 | 0 | 363 | 2.41 | 0.43 | 156 |
| Example 4 | 2 | 366 | 2.56 | 0.73 | 267 |
| Example 4 | 5 | 372 | 2.57 | 0.80 | 298 |
| Example 4 | 10 | 371 | 2.47 | 0.78 | 290 |
| Example 4 | 30 | 374 | 2.47 | 0.65 | 243 |
| Example 4 | 60 | 379 | 2.55 | 0.93 | 352 |
| Example 4 | 180 | 373 | 2.55 | 0.87 | 324 |
| Example 4 | 300 | 386 | 2.53 | 0.85 | 328 |
| Example 4 | 1260 | 379 | 2.40 | 0.81 | 307 |

TABLE 2E

| Sample | Soak Time (minutes) | Surface Area (mm$^2$) | Sample Thickness (mm) | Film Thickness (mm) | Film volume (mm$^3$) |
|---|---|---|---|---|---|
| Example 5 | 0 | 378 | 2.42 | 0.47 | 178 |
| Example 5 | 2 | 377 | 2.50 | 0.48 | 181 |
| Example 5 | 5 | 386 | 2.50 | 0.54 | 208 |
| Example 5 | 10 | 385 | 2.52 | 0.58 | 223 |

TABLE 2E-continued

| Sample | Soak Time (minutes) | Surface Area (mm²) | Sample Thickness (mm) | Film Thickness (mm) | Film volume (mm³) |
|---|---|---|---|---|---|
| Example 5 | 30 | 384 | 2.53 | 0.59 | 227 |
| Example 5 | 60 | 388 | 2.50 | 0.59 | 229 |
| Example 5 | 180 | 389 | 2.57 | 0.65 | 253 |
| Example 5 | 300 | 394 | 2.57 | 0.78 | 307 |
| Example 5 | 1260 | 388 | 2.55 | 0.54 | 209 |

TABLE 2F

| Sample | Soak Time (minutes) | Surface Area (mm²) | Sample Thickness (mm) |
|---|---|---|---|
| Comparative Example A | 0 | 405 | 2.90 |
| Comparative Example A | 2 | 417 | 2.90 |
| Comparative Example A | 5 | 425 | 3.15 |
| Comparative Example A | 10 | 407 | 2.77 |
| Comparative Example A | 30 | 416 | 2.77 |
| Comparative Example A | 60 | 426 | 2.87 |

TABLE 2G

| Sample | Soak Time (minutes) | Surface Area (mm²) | Sample Thickness (mm) |
|---|---|---|---|
| Comparative Example B | 0 | 501 | 1.77 |
| Comparative Example B | 2 | 500 | 1.77 |
| Comparative Example B | 5 | 502 | 1.77 |
| Comparative Example B | 10 | 503 | 1.75 |
| Comparative Example B | 30 | 503 | 1.75 |
| Comparative Example B | 60 | 496 | 1.73 |
| Comparative Example B | 180 | 499 | 1.73 |
| Comparative Example B | 300 | 503 | 1.74 |
| Comparative Example B | 1260 | 501 | 1.73 |

TABLE 3A

| Sample | Soak Time (minutes) | Film Thickness Increase (mm) | Percent Film Thickness Increase | Film Volume Increase (mm³) | Percent Film Volume Increase |
|---|---|---|---|---|---|
| Example 1 | 0 | 0 | 0% | 0 | 0% |
| Example 1 | 2 | 0.31 | 22% | 116 | 21% |
| Example 1 | 5 | 0.33 | 23% | 178 | 33% |
| Example 1 | 10 | 0.46 | 32% | 231 | 42% |
| Example 1 | 30 | 0.67 | 47% | 403 | 74% |
| Example 1 | 60 | 0.74 | 51% | 501 | 92% |

TABLE 3B

| Sample | Soak Time (minutes) | Film Thickness Increase (mm) | Percent Film Thickness Increase | Film Volume Increase (mm³) | Percent Film Volume Increase |
|---|---|---|---|---|---|
| Example 2 | 0 | 0 | 0% | 0 | 0% |
| Example 2 | 2 | 0.35 | 33% | 140 | 32% |
| Example 2 | 5 | 0.40 | 38% | 191 | 43% |
| Example 2 | 10 | 0.85 | 81% | 455 | 103% |
| Example 2 | 30 | 1.00 | 95% | 708 | 160% |
| Example 2 | 60 | 1.05 | 100% | 843 | 191% |

TABLE 3C

| Sample | Soak Time (minutes) | Film Thickness Increase (mm) | Percent Film Thickness Increase | Film Volume Increase (mm³) | Percent Film Volume Increase |
|---|---|---|---|---|---|
| Example 3 | 0 | 0 | 0% | 0 | 0% |
| Example 3 | 2 | 0.13 | 11% | 45 | 11% |
| Example 3 | 5 | 0.53 | 46% | 221 | 55% |
| Example 3 | 10 | 0.74 | 64% | 356 | 89% |
| Example 3 | 30 | 0.53 | 46% | 279 | 70% |
| Example 3 | 60 | 1.00 | 87% | 565 | 142% |
| Example 3 | 180 | 1.50 | 130% | 960 | 240% |
| Example 3 | 300 | 1.65 | 143% | 1086 | 272% |
| Example 3 | 1260 | 1.72 | 150% | 1268 | 318% |

TABLE 3D

| Sample | Soak Time (minutes) | Film Thickness Increase (mm) | Percent Film Thickness Increase | Film Volume Increase (mm³) | Percent Film Volume Increase |
|---|---|---|---|---|---|
| Example 4 | 0 | 0 | 0% | 0 | 0% |
| Example 4 | 2 | 0.30 | 70% | 111 | 71% |
| Example 4 | 5 | 0.37 | 86% | 142 | 91% |
| Example 4 | 10 | 0.35 | 81% | 134 | 85% |
| Example 4 | 30 | 0.22 | 51% | 87 | 56% |
| Example 4 | 60 | 0.50 | 116% | 196 | 125% |
| Example 4 | 180 | 0.44 | 102% | 168 | 107% |
| Example 4 | 300 | 0.42 | 98% | 172 | 110% |
| Example 4 | 1260 | 0.38 | 88% | 151 | 96% |

TABLE 3E

| Sample | Soak Time (minutes) | Film Thickness Increase (mm) | Percent Film Thickness Increase | Film Volume Increase (mm³) | Percent Film Volume Increase |
|---|---|---|---|---|---|
| Example 5 | 0 | 0 | 0% | 0 | 0% |
| Example 5 | 2 | 0.01 | 2% | 3 | 2% |
| Example 5 | 5 | 0.07 | 15% | 30 | 17% |
| Example 5 | 10 | 0.11 | 23% | 45 | 26% |
| Example 5 | 30 | 0.12 | 26% | 49 | 28% |
| Example 5 | 60 | 0.12 | 26% | 51 | 29% |
| Example 5 | 180 | 0.18 | 38% | 75 | 42% |
| Example 5 | 300 | 0.31 | 66% | 129 | 73% |
| Example 5 | 1260 | 0.07 | 15% | 31 | 18% |

As can be seen in Tables 2A-2G and 3A-3E, the samples of Examples 1-5 all show significant changes in both thickness and volume upon water absorption. The thickness and volume change is even resolved for Examples 3 and 4, where the water uptake test showed less change. The samples for Comparative Examples A and B, however, did not show any change in thickness or volume. Even when Comparative Example A showed a change in weight, as discussed above, there was no corresponding thickness change because the physisorbed water was not acting to swell the samples, as is the case for Examples 1-5.

2. Outsole Film Water Uptake Capacity

Various samples of outsole films for Examples 6-18 were also tested for water uptake capacities at 1 hour and 24 hours, pursuant to the Water Uptake Capacity Test with either the Co-Extruded Film Sampling Procedure (co-extruded form) or the Neat Film Sampling Procedure (neat form). For the co-extruded forms, the backing substrate was a thermoplastic polyurethane commercially available under the tradename "DESMOPAN DP 8795 A" from Bayer MaterialScience AG, Leverkusen, Germany.

The outsole film material for Examples 6-8 was a thermoplastic polyurethane hydrogel commercially available under the tradename "TECOPHILIC TG-500" from the Lubrizol Corporation, Wickliffe, Ohio (same material as for Examples 1-3). For Example 6, the film was in neat form with a 0.25-millimeter film thickness. For Example 7, the film was in a co-extruded form with a 0.13-millimeter film thickness. For Example 8, the film was also in a co-extruded form, but with a 0.25-millimeter film thickness.

The outsole film material for Examples 9 and 10 was a lower-water-uptake thermoplastic polyurethane hydrogel commercially available under the tradename "TECOPHILIC HP-60D-60" from the Lubrizol Corporation, Wickliffe, Ohio (same as for Examples 4 and 5). For Example 9, the film was in a co-extruded form with a 0.25-millimeter film thickness. For Example 10, the film was in a neat form with a 0.13-millimeter film thickness.

The outsole film material for Example 11 was a thermoplastic polyurethane hydrogel commercially available under the tradename "TECOPHILIC TG-2000" from the Lubrizol Corporation, Wickliffe, Ohio, where the film was in a neat form with a 0.13-millimeter film thickness. The outsole film material for Example 12 was a thermoplastic polyurethane hydrogel commercially available under the tradename "TECOPHILIC HP-93A-100" from the Lubrizol Corporation, Wickliffe, Ohio, where the film was in a co-extruded form with a 0.13-millimeter film thickness.

The outsole film materials for Examples 13-17 were also thermoplastic polyurethane hydrogels derived from chain-extended TDI isocyanates and polyether glycols, where the polyether glycol concentrations were varied to adjust the water uptake capacities. For these examples, the films were pressed into thick neat films having 3-millimeter film thicknesses.

In comparison to Examples 1-17, the outsole film material for Example 18 was a thermoplastic polyamide-polyether block copolymer hydrogel commercially available under the tradename "PEBAX MH1657" from Arkema, Inc., Clear Lake, Tex., where the film was in a neat form with a 0.13-millimeter film thickness. Table 4 lists the water uptake capacities for the samples of Examples 6-18.

TABLE 4

| Sample | Water Uptake Capacity (1 hour) | Water Uptake Capacity (24 hours) |
|---|---|---|
| Example 6 | 341% | 468% |
| Example 7 | 260% | — |
| Example 8 | 153% | 168% |
| Example 9 | — | 44% |
| Example 10 | 29% | 80% |
| Example 11 | 415% | 900% |
| Example 12 | 44% | — |
| Example 13 | 55% | 238% |
| Example 14 | 60% | 250% |
| Example 15 | 35% | 184% |
| Example 16 | 40% | 167% |
| Example 17 | 15% | 69% |
| Example 18 | 116% | 100% |

As shown, Examples 6-8 in Table 4 demonstrate the effects of constraining the outsole film to a co-extruded backing substrate. Examples 9 and 10 demonstrate the same effects with a lower uptake material. Example 11 is a neat film with relatively high water uptake, while Example 12 is a coextruded form of a neat resin that has a water uptake capacity in-between those of Examples 6 and 10. Examples 13-17 also exhibited good water uptakes, and included considerably thicker films (by about a factor of 10).

3. Outsole Film Water Uptake Rate and Swelling

Several samples (for Examples 1, 4, 6-8, and 10-12) were also tested for water uptake rates and swell capacities, pursuant to the Water Uptake Rate Test and the Swell Capacity Test. Table 5 lists the test results for the samples of Examples 1, 4, 6-8, and 10-12.

TABLE 5

| Sample | Water Uptake Rate (grams/m$^2$-minutes$^{1/2}$) | Percent Film Thickness Increase (1 hour) | Percent Film Volume Increase (1 hour) |
|---|---|---|---|
| Example 1 | 235 | 73% | 130% |
| Example 4 | 58 | 72% | 75% |
| Example 6 | 752 | 89% | 117% |
| Example 7 | 173 | 318% | 64% |
| Example 8 | 567 | 177% | 77% |
| Example 10 | 33 | 43% | 88% |
| Example 11 | 1270 | 69% | 92% |
| Example 12 | 172 | 153% | 70% |

As shown, the tested samples exhibited varying water uptake rates, where the samples having higher water uptake capacities (from Table 4) and that were in neat form exhibited faster water uptake rates. Moreover, the swelling thickness and volume increases shown in Table 5 generally corresponded to the water uptake capacities shown above in Table 4.

4. Outsole Film Contact Angle

The samples for Examples 6, 7, 10-12, and 18 were also tested for dry and wet contact angles, pursuant to the Contact Angle Test. Table 6 below lists the corresponding dry and wet contact angles with their variations, as well as the difference in contact angle between the dry and wet measurements.

TABLE 6

| Sample | Average Dry Film Contact Angle (degrees) | Dry Film Contact Angle (std dev) | Average Wet Film Contact Angle (degrees) | Wet Film Contact Angle (std dev) | Contact Angle Difference |
|---|---|---|---|---|---|
| Example 6 | 87.6 | 2.6 | 66.9 | 4.9 | 20.7 |
| Example 7 | 86.6 | 1.1 | 57.4 | 5.5 | 29.2 |
| Example 10 | 95.6 | 3.2 | 72.5 | 2.5 | 23.1 |
| Example 11 | 79.5 | 2.4 | 64.7 | 2.3 | 14.8 |
| Example 12 | 97.1 | 2.5 | 95.5 | 4.7 | 1.7 |
| Example 18 | 66.2 | 5.0 | 52.0 | 3.7 | 14.2 |

The samples of Examples 6 and 7 show that there is no difference in contact angles between a neat film and the co-extruded film at the relevant thicknesses because contact angle is a surface property. The samples of Examples 10 and 11 show that a higher contact angle is generally present on a lower water uptake material (Example 10) compared to a high water uptake material (Example 11) The sample of Example 18, based on polyamide copolymer chemistry, demonstrates that the base chemistry can affect the dry contact angle. However, in all cases, a substantial reduction in contact angle is seen for wet films when compared to dry samples. As can be appreciated from the discussion herein, a decrease in contact angle can demonstrate a change in adhesive properties between the soil and outsole.

5. Outsole Film Coefficient of Friction

The samples for Examples 7, 10-12, and 18-21 were also tested for dry and wet coefficients of friction, pursuant to the Coefficient Of Friction Test. The outsole film material for Example 19 was the same thermoplastic polyamide hydrogel as used for Example 18, where the film was in a co-extruded form with a 0.13-millimeter film thickness.

The outsole film material for Examples 20 and 21 was a thermoplastic polyamide-polyether block copolymer hydrogel commercially available under the tradename "PEBAX MV1074" from Arkema, Inc., Clear Lake, Tex. For Example 20, the film was in a neat form with a 0.13-millimeter film thickness. For Example 21, the film was in a co-extruded form with a 0.13-millimeter film thickness.

For comparison purposes, a film of a thermoplastic polyurethane (commercially available under the tradename "DESMOPAN DP 8795 A" from Bayer MaterialScience AG, Leverkusen, Germany; Comparative Example C), and a non-hydrogel thermoplastic polyamide (commercially available from Arkema, Inc., Clear Lake, Tex.; Comparative Example D) were also tested. Table 7 below lists the corresponding dry and wet coefficients of friction, as well as the percent reductions in the coefficients of friction between the dry and wet measurements.

TABLE 7

| Sample | Coefficient of Friction (dry) | Coefficient of Friction (wet) | Percent Reduction in Coefficient of Friction |
|---|---|---|---|
| Example 7 | 0.3 | 0.13 | 57% |
| Example 10 | 0.63 | 0.11 | 83% |
| Example 11 | 0.29 | 0.06 | 79% |
| Example 12 | 1.22 | 0.54 | 56% |
| Example 18 | 0.6 | 0.76 | −27% |
| Example 19 | 0.65 | 0.31 | 52% |
| Example 20 | 0.59 | 0.47 | 20% |
| Example 21 | 0.53 | 0.26 | 51% |
| Comparative Example C | 0.59 | 0.71 | −20% |
| Comparative Example D | 0.37 | 0.35 | 5% |

A comparison the results between Examples 7, 10-12, and 19-21 to Comparative Examples C and D in Table 7 illustrate how the water take up by the outsole films of the present disclosure can reduce the coefficient of friction of the film surfaces. Example 18 exhibited an increase in coefficient of friction after soaking. This is believed to be due to a partial saturation state for the film, where the water present at or near the film surface is being drawn into the film, creating a transitory tackier surface. As the film for Example 18 reached saturation point, its coefficient of friction also reduced below its dry-state value.

6. Outsole Film Storage Modulus

The samples for Examples 6, 8-12, and 18 were also tested for reductions in storage modulus values, pursuant to the Storage Modulus Test. Table 8 lists the storage modulus values at 0% relative humidity (RH), 50% RH, and 90%, as well as the percent reductions between the 0% and 50% RH, and between the 0% and 90% RH.

TABLE 8

| Sample | E' (MPa) 0% RH | E' (MPa) 50% RH | E' (MPa) 90% RH | ΔE'50 (%) | ΔE'90 (%) |
|---|---|---|---|---|---|
| Example 6 | 766.6 | 548.3 | 0.03 | 29% | 100% |
| Example 8 | 151.7 | 119 | 41.9 | 22% | 72% |
| Example 9 | 60.16 | 52.68 | 45.93 | 12% | 24% |
| Example 10 | 43.44 | 34.05 | 29.58 | 22% | 32% |
| Example 11 | 514.9 | 396.8 | 0.86 | 23% | 100% |
| Example 12 | 44.7 | 38.2 | 34.5 | 15% | 23% |
| Example 18 | 119.7 | 105.3 | 64.6 | 12% | 46% |

The mechanical properties of the sample films and their changes upon water uptake can demonstrate both functional and durability properties. First, storage modulus is inversely related to compliance, and a compliant surface is useful in preventing or reducing the adhesion of soil to the outsole, as discussed above. A decrease in the modulus upon exposure to moisture is representative of an increase in compliance and more functional material. Additionally, the outsole films of the present disclosure as saturated desirably have suitable upper values for the storage modulus in order to maintain structural integrity for longer durations.

7. Outsole Film Glass Transition Temperature

The samples for Examples 6, 8-12, and 18 were also tested for reductions in glass transition temperatures, pursuant to the Glass Transition Temperature Test. Table 9 lists the dry and wet glass transition temperatures, as well as their reductions between the dry and wet states.

TABLE 9

| Sample | $T_{g,dry}$ (° C.) | $T_{g,wet}$ (° C.) | $\Delta T_g$ (° C.) |
|---|---|---|---|
| Example 6 | −27.5 | −70 | −42.5 |
| Example 8 | −30 | −63 | −33 |
| Example 9 | −25 | −31 | −6 |
| Example 10 | −20 | −37.1 | −17.1 |
| Example 11 | — | −63 | — |
| Example 12 | −49.59 | −60.59 | −11 |
| Example 18 | −54.93 | −64.76 | −9.83 |

As can be seen in Table 9, water can act to plasticize the outsole film if it is taken up at the molecular level, and can act to differentiate this mechanism from materials that absorb water through capillary force or physisorption. A larger drop in the glass transition temperature will typically be seen for a neat film (Examples 6 and 10) compared to a co-extruded version (Examples 8 and 9, respectively.) Interestingly, Example 11 showed no measurable glass transition when dry, which suggests that there is not enough amorphous material in the sample to create a measurable signal. The appearance of a glass transition temperature after water uptake suggests that the material is either significantly plasticized and/or the absorbent regions are highly crystalline in the absence of water.

8. Impact Energy Test

The samples for Examples 7, 12, 14, 16, 17, 19, and 21 were also tested for their abilities in shedding soil, pursuant to the Impact Energy Test, as shown below in Table 10.

TABLE 10

| Sample | Relative Impact Energy |
|---|---|
| Example 7 | 0.60 |
| Example 12 | 0.90 |
| Example 14 | 0.00 |
| Example 16 | 0.00 |
| Example 17 | 0.83 |
| Example 19 | 1.03 |
| Example 21 | 0.95 |

All of the samples listed in Table 10, with the exception of Example 19, show a reduction in the adhesion energy between the film and soil when compared to the unmodified aluminum block. Example 19 showed a slight increase in adhesion energy. However, this is believed to be due to the thickness of the sample (3 millimeters), which prevented the film from reaching its saturation point during the soaking step. In comparison, the other samples listed in Table 10 illustrated improvements in reducing soil adhesion.

9. Soil Shearing of Footwear

Global football/soccer footwear for Examples 22 and 23 were also tested for soil shearing abilities, pursuant to the Soil Shearing Footwear Test, where Example 22 included the same footwear and outsole films as discussed above for Examples 1-3, and where Example 23 included the same footwear and outsole films as discussed above for Examples 4 and 5.

After the test, the sample for Example 22 had a weight gain of 28.3 grams, and the sample for Example 23 had a weight gain 37.4 grams. Both examples demonstrated that the use of the soaked outsole films in a typical field of use achieve the desired results of reducing soil accumulation. Furthermore, the film with a higher degree of water uptake capacity, water uptake rate, and swelling capacity (Example 22) showed more improvement in reducing soil accumulation compared to the lower water uptake film (Example 23).

10. Field Use

Global football/soccer footwear for Examples 24 and 25 were also tested on a closed course during game play, where Example 24 included the same footwear and outsole films as discussed above for Examples 1-3 and 22, and where Example 25 included the same footwear and outsole films as discussed above for Examples 4, 5, and 23. Five pairs of the footwear for Example 24 were tested, one pair of the footwear for Example 25 was tested, and two pairs of control footwear were tested (which did not include an outsole film) (Comparative Examples E and F). The footwear, initially clear of all debris, were then worn by players on the closed course while playing soccer for 90 minutes during a rainy day.

Figure 20A:
FIG. 20A includes a photograph of articles of footwear with a material according to the disclosure (the outsole film of Example 25) after being worn and used during wet and muddy game conditions, FIGS. 20B, 20C, 20D, 20E, and 20F include photographs of articles of footwear with a material according to the disclosure (the outsole film of Example 24) after being worn and used during wet and muddy game conditions, and FIGS. 20G and 20H include photographs of articles of footwear without a material according to the disclosure after being worn and used during wet and muddy game conditions.
Figure 20B:
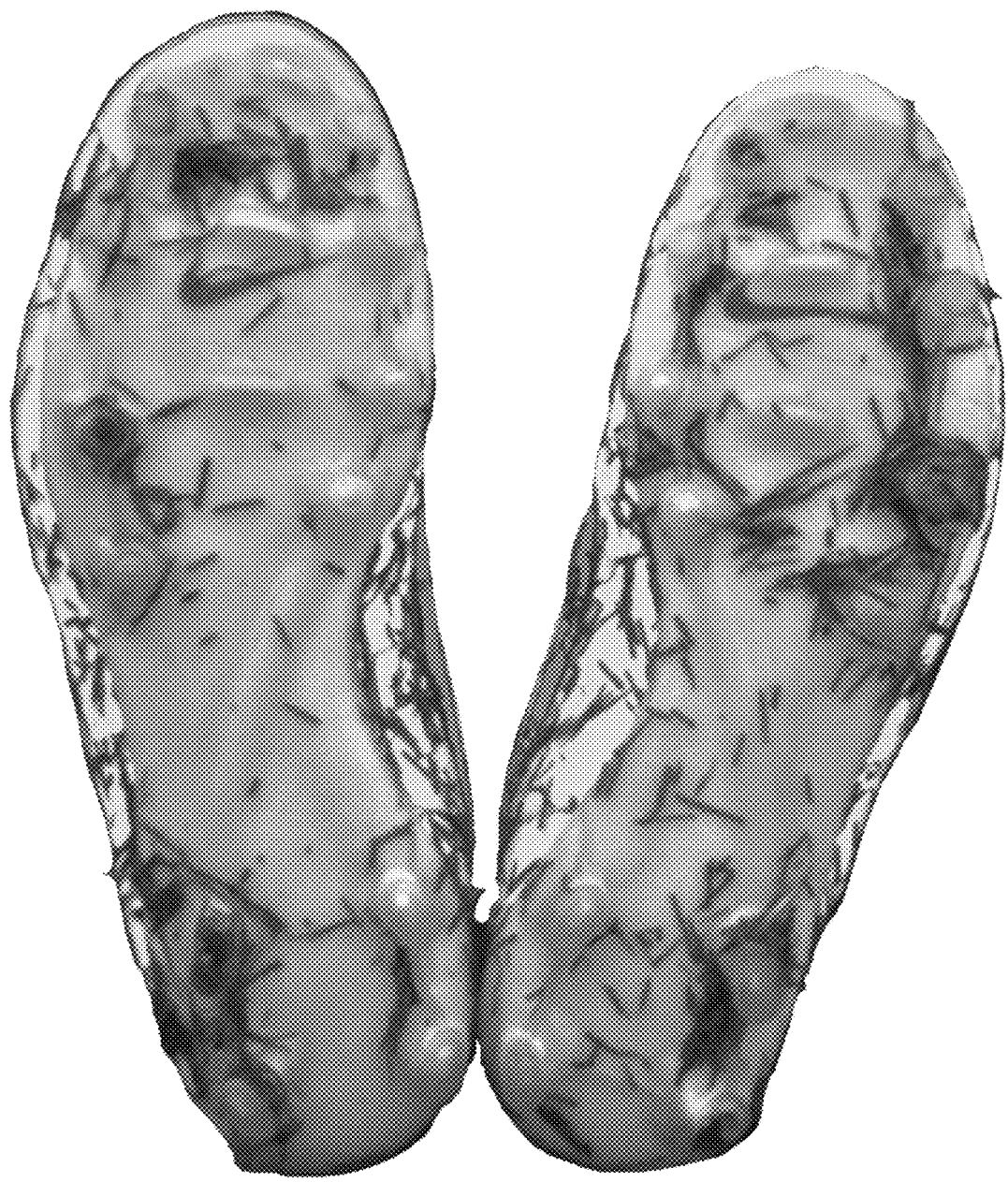
Figure 20C:
Figure 20D:
Figures 20E, 20F, 20G:
Figure 20H:

The first 45 minutes were played on a natural grass field, and second 45 minutes were played on an organic/sand/clay mix field. After the 90-minute playing session, the shoes were investigated for the accumulation of debris over the course of the game. As seen from the images in FIGS. 20B-20F, the five pairs of shoes with the outsole film of Example 24 accumulated little to no debris, while the two pairs of control footwear for Comparative Examples E and F accumulated a substantial amount of debris. The pair of shoes with the outsole film of Example 25 also accumulated debris (as shown in FIG. 20A), but the accumulated amount was somewhat less than the control footwear of Comparative Examples E and F (as shown in FIGS. 20G and 20H). This illustrates the difference in preventing soil accumulation based on the water uptake capacities of the outsole films of the present disclosure.

Additionally, the footwear for Examples 24 and 25 were also used for extended durations during games on the closed course to demonstrate the limits of their durabilities. The outsole films for the footwear of both Examples 24 and 25 continue to perform the same after 100 hours of game play without any significant abrasion or delamination. As such, the outsole films of the present disclosure are suitable for use as ground-facing surfaces for footwear outsoles.

Although the present disclosure has been described with reference to preferred embodiments, workers skilled in the art will recognize that changes may be made in form and detail without departing from the spirit and scope of the disclosure.

We claim:

1. An outsole for an article of footwear, the outsole comprising:
    an outsole substrate; and
    a hydrogel secured to the outsole substrate and defining an external surface of the outsole, wherein the hydrogel comprises crystalline regions and amorphous hydrophilic regions, and wherein the amorphous hydrophilic regions are covalently bonded to the crystalline regions with carbamate linkages, and the amorphous hydrophilic regions are present in the hydrogel at a ratio of at least 20:1 by weight relative to the crystalline regions, wherein at least a portion of the amorphous hydrophilic regions each comprise a backbone chain segment and one or more pendant polyether groups grafted to the backbone chain segment.

2. The outsole of claim 1, wherein the ratio of the one or more amorphous hydrophilic regions to the to the one or more crystalline regions ranges from 40:1 by weight to 110:1.

3. The outsole of claim 1, wherein the crystalline regions of the hydrogel interact with each other to form physical crosslinks.

4. The outsole of claim 1, wherein the hydrogel is secured to the outsole substrate as a film.

5. The outsole of claim 4, wherein the film has a dry-state film thickness ranging from 0.1 millimeters to 1 millimeter.

6. The outsole of claim 5, wherein the film has a saturated-state film thickness ranging from 0.25 millimeters to 2 millimeters.

7. The outsole of claim 1, wherein at least a portion of the amorphous hydrophilic regions each comprise a polyether segment, a polyester segment, a polyacrylic acid segment, a polylactone segment, or combinations thereof.

8. The outsole of claim 1, wherein the outsole substrate comprises a plurality of traction elements operably secured to the outsole substrate.

9. The outsole of claim 8, wherein each of the plurality of traction elements comprises a terminal edge, and wherein the hydrogel is not present on the terminal edges of any of the plurality of traction elements.

10. The outsole of claim 8, wherein one or more of the traction elements is selected from the group consisting of: a cleat, a stud, a spike, and a lug.

11. The outsole of claim 8, wherein the traction elements are integrally formed with the outsole substrate.

12. The outsole of claim 8, wherein the traction elements are removable traction elements.

13. An outsole for an article of footwear, the outsole comprising:
    an outsole substrate; and
    a hydrogel secured to the outsole substrate and defining an external surface of the outsole, wherein the hydrogel comprises crystalline polyamide regions and amorphous hydrophilic regions, and wherein the amorphous hydrophilic regions are covalently bonded to the crystalline polyamide regions, and are present in the hydrogel at a ratio of at least 20:1 by weight relative to the crystalline polyamide regions.

14. The outsole of claim 13, wherein the ratio of the one or more amorphous hydrophilic regions to the to the one or more crystalline regions ranges from 40:1 by weight to 110:1.

15. The outsole of claim 13, wherein at least a portion of the amorphous hydrophilic regions each comprise a polyether segment, a polyester segment, a polyacrylic acid segment, a polylactone segment, or combinations thereof.

16. The outsole of claim 13, wherein the hydrogel is secured to the outsole substrate as a film.

17. The outsole of claim 16, wherein the film has a dry-state film thickness ranging from 0.1 millimeters to 1 millimeter.

18. The outsole of claim 17, wherein the film has a saturated-state film thickness ranging from 0.25 millimeters to 2 millimeters.

19. The outsole of claim 13, wherein the outsole substrate comprises a plurality of traction elements operably secured to the outsole substrate.

20. The outsole of claim 19, wherein each of the plurality of traction elements comprises a terminal edge, and wherein the hydrogel is not present on the terminal edges of any of the plurality of traction elements.

21. The outsole of claim 19, wherein one or more of the traction elements is selected from the group consisting of: a cleat, a stud, a spike, and a lug.

22. The outsole of claim 19, wherein the traction elements are integrally formed with the outsole substrate.

23. The outsole of claim 19, wherein the traction elements are removable traction elements.

24. The outsole of claim 13, wherein the hydrogel comprises a crosslinked polymeric network.

25. An article of footwear, the article comprising:
an outsole backing member;
a plurality of traction elements operably secured to the outsole backing member;
an upper secured to the outsole backing member; and,
a film secured to the outsole backing member and defining an external surface of the outsole, wherein the film comprises a hydrogel having crystalline regions and amorphous hydrophilic regions, and wherein the amorphous hydrophilic regions are covalently bonded to the crystalline regions, and the amorphous hydrophilic regions are present in the hydrogel at a ratio of at least 20:1 by weight relative to the crystalline regions.

26. The article of claim 25, wherein at least a portion of the amorphous hydrophilic regions each comprise a polyether.

27. The article of claim 25, wherein the crystalline regions are derived from monomers comprising one or more multifunctional isocyanates and one or more chain extenders.

28. The article of claim 25, wherein the crystalline regions comprise polyamide chains.

29. The article of claim 25, wherein the hydrogel is substantially free of aromatic groups.

30. The article of claim 25, wherein the film exhibits a swell thickness increase at 1 hour greater than 50%, as characterized by the Swelling Capacity Test with the Footwear Sampling Procedure.

31. The article of footwear of claim 25, wherein each of the plurality of traction elements comprises a terminal edge, and wherein the hydrogel is not present on the terminal edges of any of the plurality of traction elements.

32. The article of footwear of claim 25, wherein one or more of the traction elements is selected from the group consisting of: a cleat, a stud, a spike, and a lug.

33. The article of footwear of claim 25, wherein the traction elements are integrally formed with the outsole backing member.

34. The article of footwear of claim 25, wherein the traction elements are removable traction elements.

35. The article of footwear of claim 25, wherein the hydrogel comprises a crosslinked polymeric network.

36. An outsole for an article of footwear, the outsole comprising:
an outsole substrate comprising a plurality of traction elements operably secured to the outsole substrate; and
a hydrogel secured to the outsole substrate and defining an external surface of the outsole, wherein the hydrogel comprises crystalline regions and amorphous hydrophilic regions, and wherein the amorphous hydrophilic regions are covalently bonded to the crystalline regions with carbamate linkages, and the amorphous hydrophilic regions are present in the hydrogel at a ratio of at least 20:1 by weight relative to the crystalline regions.

37. The outsole of claim 36, wherein each of the plurality of traction elements comprises a terminal edge, and wherein the hydrogel is not present on the terminal edges of any of the plurality of traction elements.

38. The outsole of claim 36, wherein one or more of the traction elements is selected from the group consisting of: a cleat, a stud, a spike, and a lug.

39. The outsole of claim 36, wherein the traction elements are integrally formed with the outsole substrate.

40. The outsole of claim 36, wherein the traction elements are removable traction elements.

41. The outsole of claim 40, wherein the hydrogel comprises a crosslinked polymeric network.

42. The outsole of claim 41, wherein the ratio of the amorphous hydrophilic regions to the crystalline regions ranges from 40:1 by weight to 110:1.

43. The outsole of claim 36 wherein at least a portion of the amorphous hydrophilic regions each comprise a backbone chain segment and one or more pendant polyether groups grafted to the backbone chain segment.

44. The outsole of claim 36, wherein the crystalline regions of the hydrogel interact with each other to form physical crosslinks.

45. The outsole of claim 36, wherein the hydrogel is secured to the outsole substrate as a film.

46. The outsole of claim 45, wherein the film has a dry-state film thickness ranging from 0.1 millimeters to 1 millimeter.

47. The outsole of claim 46, wherein the film has a saturated-state film thickness ranging from 0.25 millimeters to 2 millimeters.

48. The outsole of claim 36, wherein the hydrogel comprises a crosslinked polymeric network.

* * * * *